US005422467A

United States Patent [19]

Graef et al.

[11] Patent Number: 5,422,467

[45] Date of Patent: Jun. 6, 1995

[54] ARTICLE DEPOSITING APPARATUS

[75] Inventors: Harry T. Graef, Bolivar; Michael J. Harty, North Canton, both of Ohio

[73] Assignee: InterBold, N. Canton, Ohio

[21] Appl. No.: 4,829

[22] Filed: Jan. 15, 1993

[51] Int. Cl.[6] .............. G06F 15/30

[52] U.S. Cl. .............. 235/379; 235/475; 235/485; 271/3.1; 209/569; 209/657; 198/435; 198/358; 902/12

[58] Field of Search .............. 235/379, 381, 480, 475, 235/485, 380; 902/18, 9, 6, 7, 12; 109/24.1; 193/35 G; 271/3, 3.1, 180, 227, 235, 246, 250, 225, 296, 902

[56] References Cited

U.S. PATENT DOCUMENTS

| | | | |
|---|---|---|---|
| 3,358,831 | 12/1967 | Cothrell | 198/435 X |
| 3,580,141 | 5/1971 | Beckum | 198/358 X |
| 3,836,980 | 9/1974 | Grosswiller, Jr. et al. | 109/24.1 |
| 3,866,235 | 2/1975 | Maynard et al. | 346/22 |
| 3,897,901 | 8/1975 | Grosswiller, Jr. et al. | 232/44 |
| 3,973,237 | 8/1976 | Sawaguchi et al. | 235/379 |
| 3,998,115 | 12/1976 | Cothran et al. | 101/235 |
| 4,067,267 | 1/1978 | McLaughlin et al. | 109/24.1 |
| 4,082,945 | 4/1978 | van de Goor et al. | 235/379 |
| 4,085,687 | 4/1978 | Beck et al. | 109/24.1 |
| 4,308,804 | 1/1982 | Guibord et al. | 235/379 |
| 4,435,243 | 3/1984 | Azeez et al. | 156/361 |
| 4,436,182 | 3/1984 | Simonotti et al. | 235/379 |
| 4,447,714 | 5/1984 | Lundblad | 235/379 |
| 4,533,824 | 8/1985 | Watanabe | 235/379 |
| 4,579,228 | 4/1986 | Case | 209/563 |
| 4,608,485 | 8/1986 | Miura | 235/379 |
| 4,617,457 | 10/1986 | Granzow et al. | 235/379 |
| 4,626,672 | 12/1986 | Sapitowicz et al. | 235/480 |
| 4,696,426 | 9/1987 | Decker et al. | 109/24.1 |
| 4,703,162 | 10/1987 | Holland-Letz et al. | 235/379 |
| 4,747,058 | 5/1988 | Ho | 235/379 X |
| 4,747,354 | 5/1988 | Fee et al. | 109/24.1 |
| 4,838,480 | 6/1989 | Takahashi et al. | 109/24.1 |
| 4,843,219 | 6/1989 | Franchi | 235/379 |
| 4,864,114 | 9/1989 | Briane et al. | 235/480 |
| 4,874,931 | 10/1989 | Oka et'al. | 235/379 |
| 4,939,351 | 7/1990 | Alaux et al. | 235/379 |
| 4,989,520 | 2/1991 | Hain | 109/24.1 |
| 5,136,144 | 8/1992 | Swinton et al. | 235/379 |
| 5,186,334 | 2/1993 | Fukudome et al. | 235/379 X |
| 5,250,793 | 10/1993 | Nagashima et al. | 235/379 X |

FOREIGN PATENT DOCUMENTS

| | | |
|---|---|---|
| 0247361 | 12/1987 | European Pat. Off. . |
| 0430679A2 | 5/1991 | European Pat. Off. . |
| 1005672 | 9/1965 | United Kingdom . |

*Primary Examiner*—John Shepperd
*Assistant Examiner*—Michael G. Lee
*Attorney, Agent, or Firm*—D. Peter Hochberg; Mark Kusner; Michael Jaffe

[57] ABSTRACT

A deposit processing module comprising a first transport having a first end for receiving envelopes and single document deposits and a second end from which the deposits are discharged, and a second transport operatively positioned for receiving and returning single document deposits to and from the first transport. A printing device is provided for printing deposit information on the deposits, a magnetic charge/read head is provided for charging and reading magnetic information on the single document deposits and an imager is provided for imaging one side of the single document deposits. A gate mechanism associated with the second end of the first transport is movable between a first position wherein envelopes and single document deposits may be discharged from the module and a second position wherein single document deposits may be transported between the first transport to the second transport.

47 Claims, 32 Drawing Sheets

ARTICLE DEPOSITING APPARATUS

FIELD OF THE INVENTION

The present invention relates generally to an article depositing apparatus, and more particularly to an apparatus for receiving, processing and sorting envelopes and single document deposits. The invention is particularly suitable for an unmanned operation of accepting a deposit or receiving payments into a bank or like establishment, in conjunction with conventionally known automatic teller machines (ATM) and will be described with particular reference thereto. It is understood, however, that the present invention has other broader applications, and may be used to receive utility bills, notes, or other single sheet documents in other business situations.

BACKGROUND OF THE INVENTION

Automatic teller machines (ATM's) are widely used by banks and like establishments to provide unmanned cash dispensing to customers. Business transactions with ATM's are typically initiated by a customer using actuating keys on the ATM after the customer's identification has been established by means of a magnetic card having a customer's identification number and other pertinent information encoded thereon. ATM's have become extremely popular with banking and other financial institutions and their customers as a quick and convenient method of dispensing cash.

However, for depositing money into a bank, or for paying utilities or like bills at a bank, it is generally necessary for such transactions to be handled by a bank teller during normal business hours. The present invention overcomes this and other problems and provides an article depositing apparatus for the acceptance of both envelopes and single document deposits, which machine can align and duplex single document deposits, sort deposits by kind, apply identification information to each deposit, magnetically scan and read single document deposits, obtain an image of one or both sides of a single document deposit, and the machine being compact and suitable for use with conventional ATM's.

SUMMARY OF THE INVENTION

According to the present invention there is provided a deposit processing module comprising a first transport having a first end for receiving envelopes and single document deposits and a second end from which the deposits are discharged, and a second transport operatively positioned for receiving and returning single document deposits to and from the first transport. Print means are provided for printing information onto each deposit, magnetic charge/read means are provided for charging and reading magnetic information and coded on the deposits and an imager is provided to obtain an image of one or both sides of the deposits. A gate mechanism associated with the second end of the first transport is movable between a first position wherein envelopes and single document deposits may be discharged from the module and a second position wherein single document deposits may be transferred between the first transport and the second transport.

In accordance with another aspect of the present invention, there is provided a deposit processing device for receiving envelope deposits and single document deposits. The deposit processing device includes a deposit processing module having a deposit receiving end and a deposit discharge end. A first transport path extends from the deposit receiving end to the deposit discharge end and is dimensioned to receive envelope deposits or single document deposits. Printer means are disposed along the first transport path for printing information onto said envelope deposit or the single document deposit. A second transport path is provided adjacent the first transport path dimensioned to receive single document deposits. Magnetic scanning means are disposed along the second transport path for scanning a single document deposit for coded information thereon. Imager means are disposed along the second transport path for obtaining an image of a single deposit thereon. Conveyor means are provided for conveying envelope deposits and single document deposits along the first transport path and for conveying single document deposits along the second transport path. Gate means operatively connects the first transport path with the second transport path to permit single document deposits to be conveyed therebetween. The deposit processing device further includes a deposit storage module adjacent the deposit discharge end of the deposit processing module having a plurality of storage locations including at least one envelope storage location and at least one single document storage location. Means for moving the deposit processing module relative to the deposit storage module are provided to position the discharge end of the document processing module adjacent one of the-storage locations together with means for duplexing single document deposits to permit scanning and imaging of both sides of a single document deposit.

In accordance with another aspect of the present invention, there is provided a deposit processing module comprising a first transport having a first end for receiving envelope deposits and single document deposits and a second end from which the deposits are discharged. Printing means are disposed along the first transport for printing deposit information on the deposits. A second transport having an end positioned adjacent the second end of the first transport is provided for receiving and returning single document deposits to and from the first transport. A magnetic charge/read head is disposed along the second transport for charging and reading magnetic information on the single document deposits and an imager is disposed along the second transport for imaging one side of the single document deposit. A gate mechanism is associated with the second end of the first transport, the gate mechanism being movable between a first position wherein envelope deposits and single document deposits may be discharged from the processing module from the second end of the first transport and a second position wherein single document deposits may be transported between the first transport and the second transport.

In accordance with yet another aspect of the present invention, there is provided a depository for receiving envelopes, checks, utility bills, or other sheet notes comprising a deposit storage module having a plurality of deposit storage locations therein and a deposit receiving module. The deposit receiving module includes a printer for printing deposit information on a deposit, a magnetic charge and read head for magnetically charging and reading coded information on a deposit and an imager for copying the surface of a deposit. The deposit receiving module has a receiving end for receiving deposits and a discharge end for discharging the deposits to the deposit storage module. Means are provided for pivoting the receiving module about a fixed axis among a number of positions corresponding to the deposit storage locations.

In accordance with a still further aspect of the present invention, there is provided a deposit processing module comprised of an elongated platen having opposite facing elongated planar surfaces and an endless belt encircling the platen having a first belt run extending along one of the opposite facing elongated surfaces and a second belt run extending along the other of the opposite facing surface. Reversible drive means are provided for conveying the belt around the platen. A first plate means is disposed adjacent one of the opposite facing elongated surfaces in operative engagement with the first belt run to define a first transport. A second plate means is disposed adjacent the other of the opposite facing elongated planar surfaces in operative engagement with the second belt run to define a second transport. A gate member is provided at one end of the platen and being movable relative thereto, the gate member having a contoured surface positionable adjacent the belt for conveying deposits between the first transport and the second transport.

In accordance with a still further aspect of the present invention, there is provided a deposit processing module having a deposit receiving end, a deposit discharge end, a first deposit transport path extending between the deposit receiving end and the deposit discharge end and a second deposit transport path having one end positioned adjacent the deposit discharge end. Printer means are provided for printing information onto a deposit, magnetic scanning means are provided for scanning a deposit for coded information thereon, and imager means are provided for obtaining an image of a deposit, the printer means, magnetic scanning means and the imager means being positioned along the first and second transport paths. Reversible conveyor means are provided for conveying a deposit along the first and second transport paths. A gate member is movable to a position wherein the first deposit transport path is connected to the second deposit transport path and means for pivoting the device about a fixed axis are provided to move the deposit discharge end to a plurality of locations.

It is an object of the present invention to provide a deposit processing device for receiving envelopes and single document deposits.

It is another object of the present invention to provide a deposit processing device as described above which can sort like documents and envelopes.

Another object of the present invention is to provide a deposit processing device as described above which can apply transaction identification information onto the deposit in a configurable location.

Another object of the present invention is to provide a deposit processing device as described above which can magnetically charge and scan a deposit for magnetically coded information thereon.

Another object of the present invention is to provide a deposit processing device as described above which can scan a deposit and record the image on one or both sides thereof.

A still further object of the present invention is to provide a deposit processing device as described above which can duplex a single document deposit.

A still further object of the present invention is to provide a deposit processing device as described above which includes means for justifying a deposit along a registration edge.

A still further object of the present invention is to provide a document processing device as described above which includes first and second linear transports which are generally parallel to each other and which together are angularly pivotable about a fixed axis.

A still further objection of the present invention is to provide a deposit processing device as described above which is capable of sorting and storing deposits into a plurality of storage locations.

A still further objection of the present invention is to provide a deposit processing device as described above which is capable of receiving deposits in other than a single orientation.

A still further objection of the present invention is to provide a deposit processing device as described above which is compact in size and is separable to expose internal components for ease of serviceability.

These and other objects and advantages will become apparent from the following description of a preferred embodiment taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof and wherein.

DETAILED DESCRIPTION OF THE PREFERRED EMBODIMENT

Figure 1:
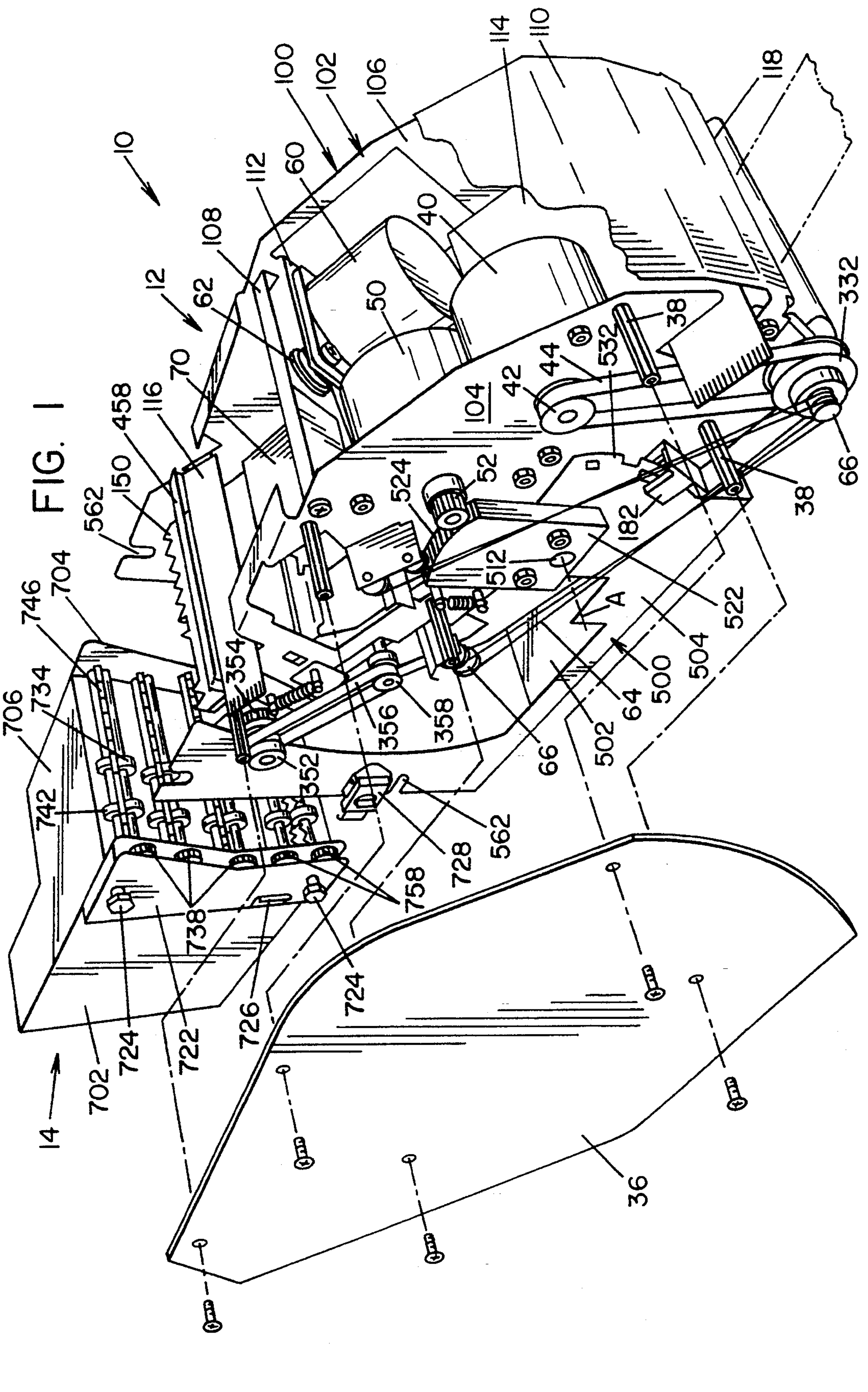
FIG. 1 is an exploded perspective view of a deposit processing device illustrating a preferred embodiment of the present invention and showing a document processing module, a document storage module, and a main printed circuit board.

Referring now to the drawings wherein the showing is for the purpose of illustrating a preferred embodiment of the invention only, and not for the purpose of limiting same, the drawings show a compact, deposit processing apparatus 10 according to the present invention. Apparatus 10 is adapted to receive deposits such as envelopes containing currency or the like, and single document deposits, such as checks, utility bills, or other single sheet documents. In this respect, as used hereinafter, the term "deposit" shall generally refer to both envelopes and single sheet documents, the specific type of deposit being identified later in the specification when necessary to explain the operation of apparatus 10. Apparatus 10 is preferably for use in conjunction with a conventional automatic teller machine (ATM), wherein access to the ATM is by means of a conventional magnetic identification card. As will be appreciated from a further reading of the specification, however, apparatus 10 has other uses and applications and may find advantageous application in situations not involving ATMS or ATMS requiring credit card access.

Apparatus 10 would typically be situated adjacent a housing facia 22 within a housing (not shown). Housing facia 22 includes a plate 24 having a deposit entry slot 26 which is accessible to a customer formed therein. In the drawings (see FIGS. 3 and 4), apparatus 10 is shown resting upon a support surface 28 which is schematically illustrated. An envelope storage bin 30 is positioned to one side and below apparatus 10 to receive and store envelope deposits which have been processed therethrough. Apparatus 10 is primarily comprised of a deposit processing module 12, and a deposit storage module 14 which is attachable thereto.

Figure 3:
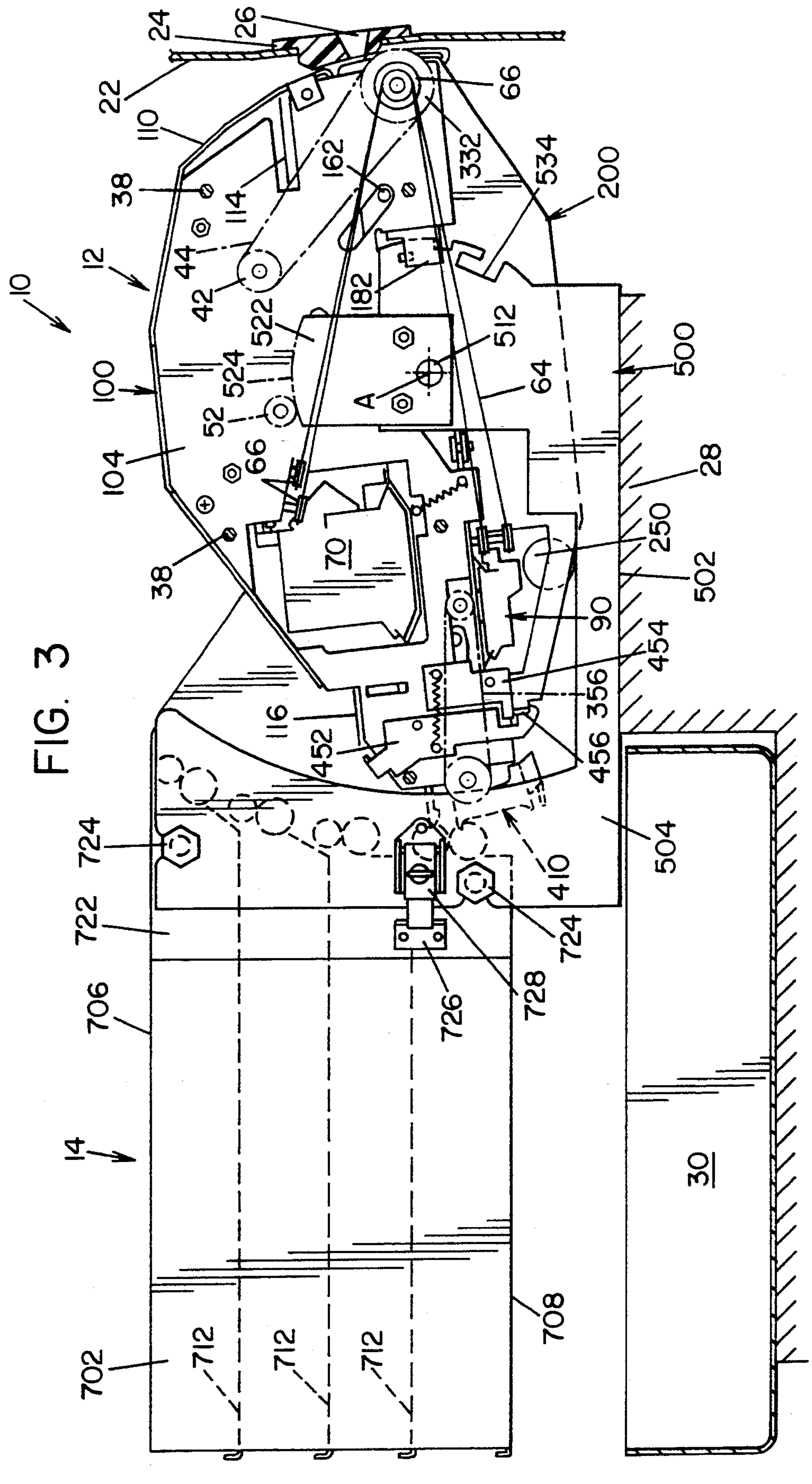
FIG. 3 is a schematic side elevational view of the deposit processing device shown in FIG. 1 showing one side of the device.

Referring to FIG. 3, deposit processing module 12 is adapted to receive deposits through deposit receiving slot 26 and after processing same, to discharge the deposits into deposit storage module 14 or the envelope storage bin 30. Hereinafter, the end of deposit processing module 12 adjacent the housing facia shall be referred to as "the receiving end" or "front end" of the module, and the portion of the module adjacent deposit storage module 14 shall be referred to as the "discharge end" or "back end" of the module. Apparatus 10 is positioned so that the receiving end thereof is adjacent deposit entry slot 26.

Broadly stated, deposit processing module 12 is generally comprised of three (3) sections or components, each of which is pivotally attached at one end to permit separation from each other for servicing as will be described in greater detail below. More specifically, deposit processing module 12 is generally comprised of an upper module section 100, a lower module section 200, and a transport and gate assembly 300 which is positioned therebetween.

Figure 2:
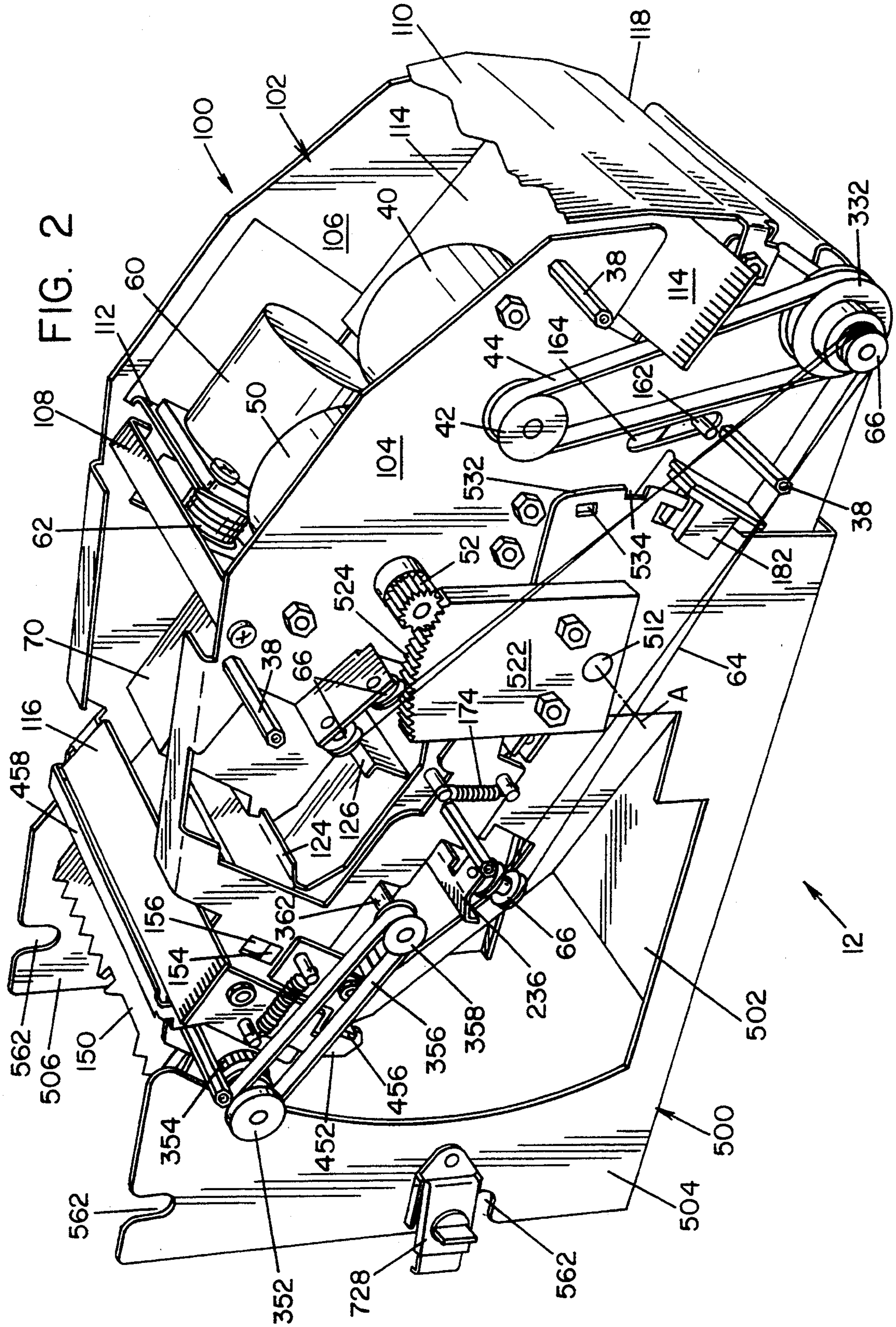
FIG. 2 is an enlarged perspective view of the deposit processing module shown in FIG. 1.

As shown in FIG. 2, upper module 100 is generally comprised of a support housing 102 having two spaced-apart, parallel sidewalls 104, 106. A spacer bar 108 and a cover plate 110 extend between sidewalls 104, 106. Sidewalls 104, 106 are formed to provide mounting surfaces for a transport motor 40, a pivot motor 50, and a shuttle motor 60. Transport motor 40 and pivot motor 50 are mounted to sidewall 104 with their respective drive shafts extending therethrough. Shuttle motor 60 is mounted on an inward extending panel 112 cut from sidewall 106. Adjacent to motors 40, 50 and 60, a printed circuit board 114 is provided and mounted on inward extending tabs (not shown) formed in the sidewalls 104, 106. A smaller printed circuit board 116 is provided at the discharge end of upper module section 100.

Figure 9:
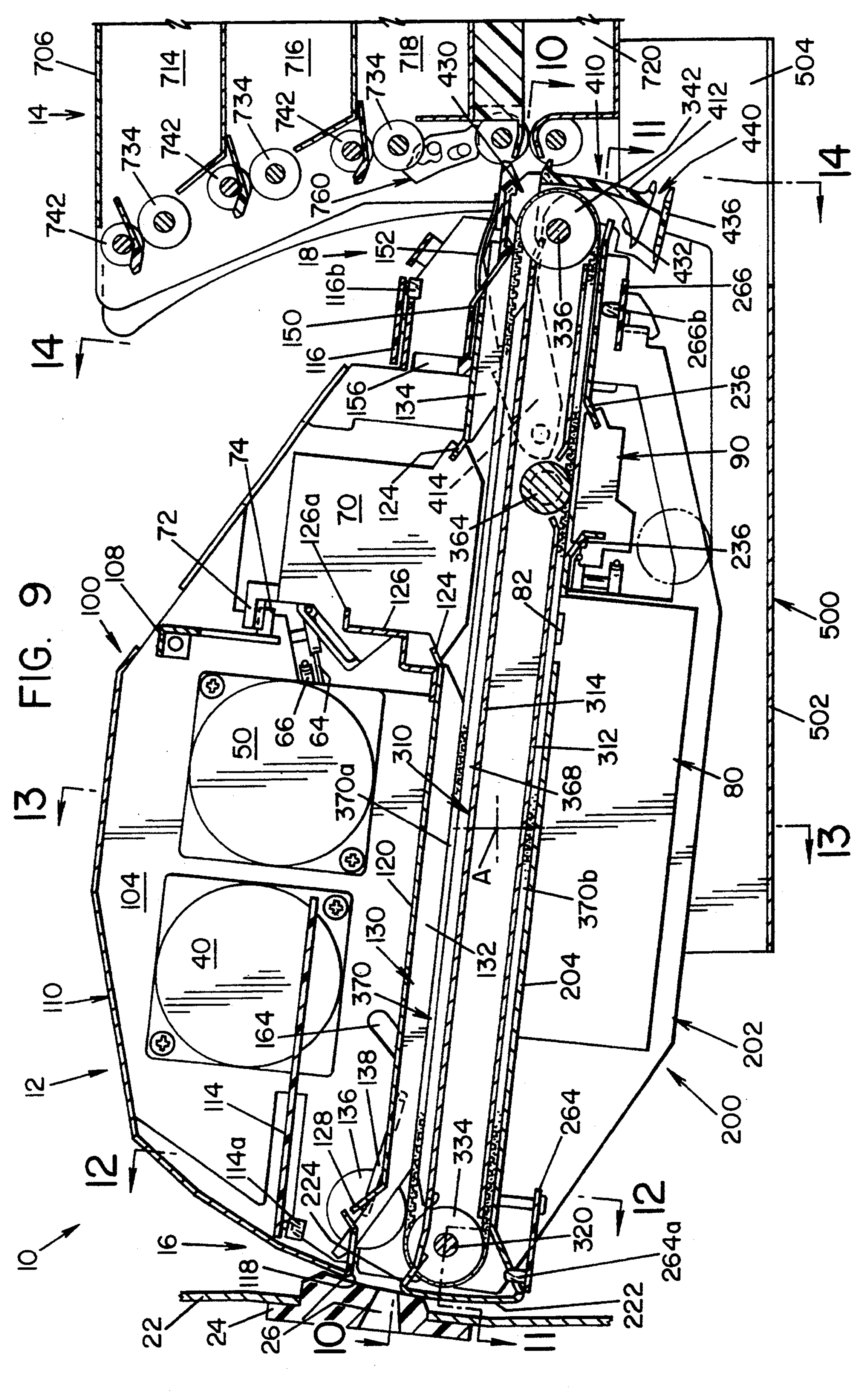
FIG. 9 is a longitudinal sectional view taken along line 9—9 of FIG. 8.

Printed circuit board 114, 116 each include end portions which project beyond in sidewall 104, as best seen in FIGS. 1 and 2. Cover 110 (best illustrated in FIG. 9) is mounted to the sidewalls 104, 106 to enclose motors 40, 50, 60 and printed circuit board 114. The lower end 118 of cover plate 110 adjacent the receiving end of deposit processing module 12 is inturned toward the center thereof, as best seen in FIG. 9.

Figure 8:
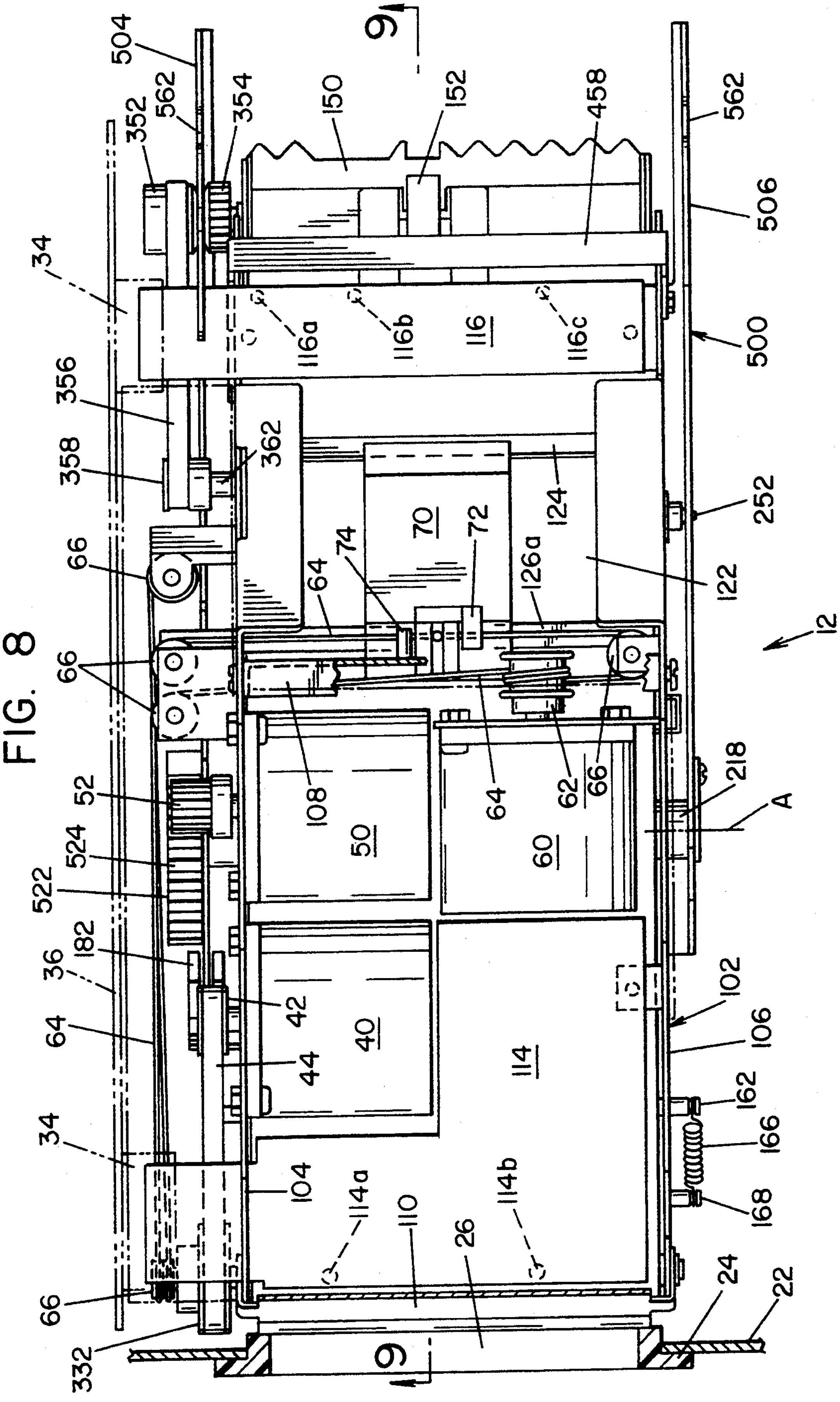
FIG. 8 is a top, plan view of the deposit processing module when positioned as shown in FIG. 7.
Figure 13:
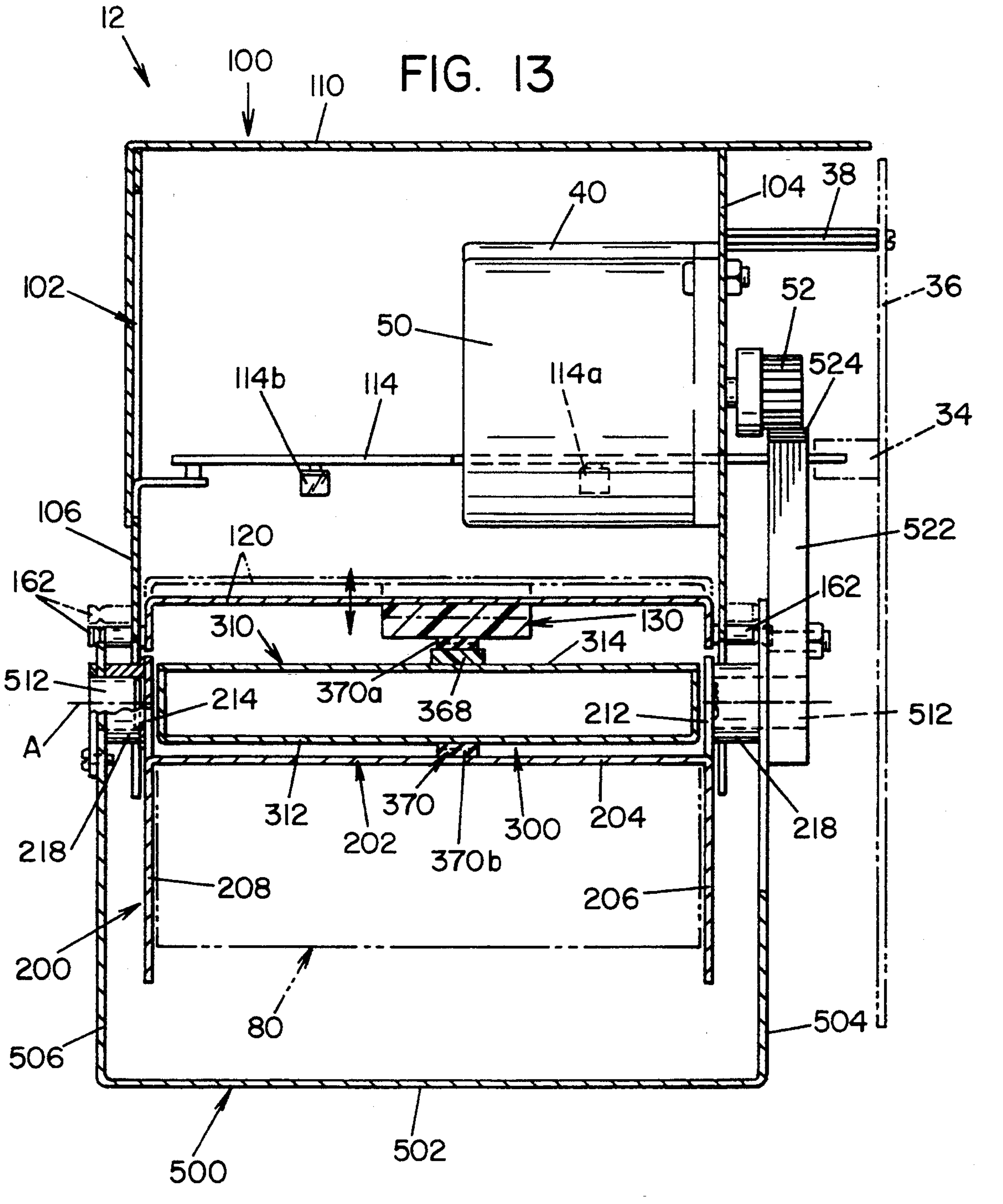
FIG. 13 is a sectional view taken along line 13—13 of FIG. 9.

Forming part of upper module section 100 is a floating plate 120. Floating plate 120 is generally U-shaped (as best seen in FIG. 13) and is dimensioned to be received between sidewalls 104, 106 of housing 102 of upper module section 100. In the embodiment shown, floating plate 120 is formed of a single metal sheet having the ends and sides bent to a desired configuration. In this respect, several components comprising the present invention, primarily the structural housings and support members, are preferably formed from single metal plates into complex shapes by cutting and bending such plates by conventionally known forming techniques. It is believed that the forming of such components is within the ability of those skilled in the art of metal forming and that the shapes of the components and how they may be formed is discernible from the drawings of the present invention. For this reason, and because the specific shapes of the structural components in and of themselves are not a primary aspect of the present invention, they shall not be described in great detail. A transverse slot 122, shown in FIG. 8, is formed in floating plate 120 to receive a printer shuttle 70. In this respect, portions of floating plate 120 along the sides of slot 122 are bent upward to define rails 124 which act as guides and mounting surfaces for printer shuttle 70. An auxiliary mounting bracket 126, shown in FIG. 9, is attached to the upper surface of floating plate 120 to provide an additional guide surface for primer shuttle 70 and to confine printer shuttle 70 within the slot 122. In this respect, the upper end of the auxiliary mounting bracket defines a generally L-shaped rail 126*a* along which printer shuttle may slide.

The receiving end of the floating plate 120, i.e. the end of the floating plate adjacent the deposit receiving slot 26, has an upturned leading edge 128 which is formed to mesh with the inturned lower end 118 of cover plate 110. A centrally located, non-continuous rail 130 extends along the length of floating plate 120. Rail 130 is generally comprised of two (2) rail sections 132, 134 which are disposed on either side of slot 122. Rail sections 132, 134 project downward from the lower surface of floating plate 120, and are dimensioned to extend slightly below the lower surface of printer shuttle 70. The receiving end of rail 130 is upturned and dimensioned to extend into slots (not shown) in the inturned end 118 of cover plate 110. An idle guide roller 136 extends through a slot (not shown) in the leading edge of rail section 132. Guide roller 136 is mounted on a roller strut 138, shown in FIG. 12, which is mounted to rail section 132 and is pivotable relative thereto.

Figure 6:
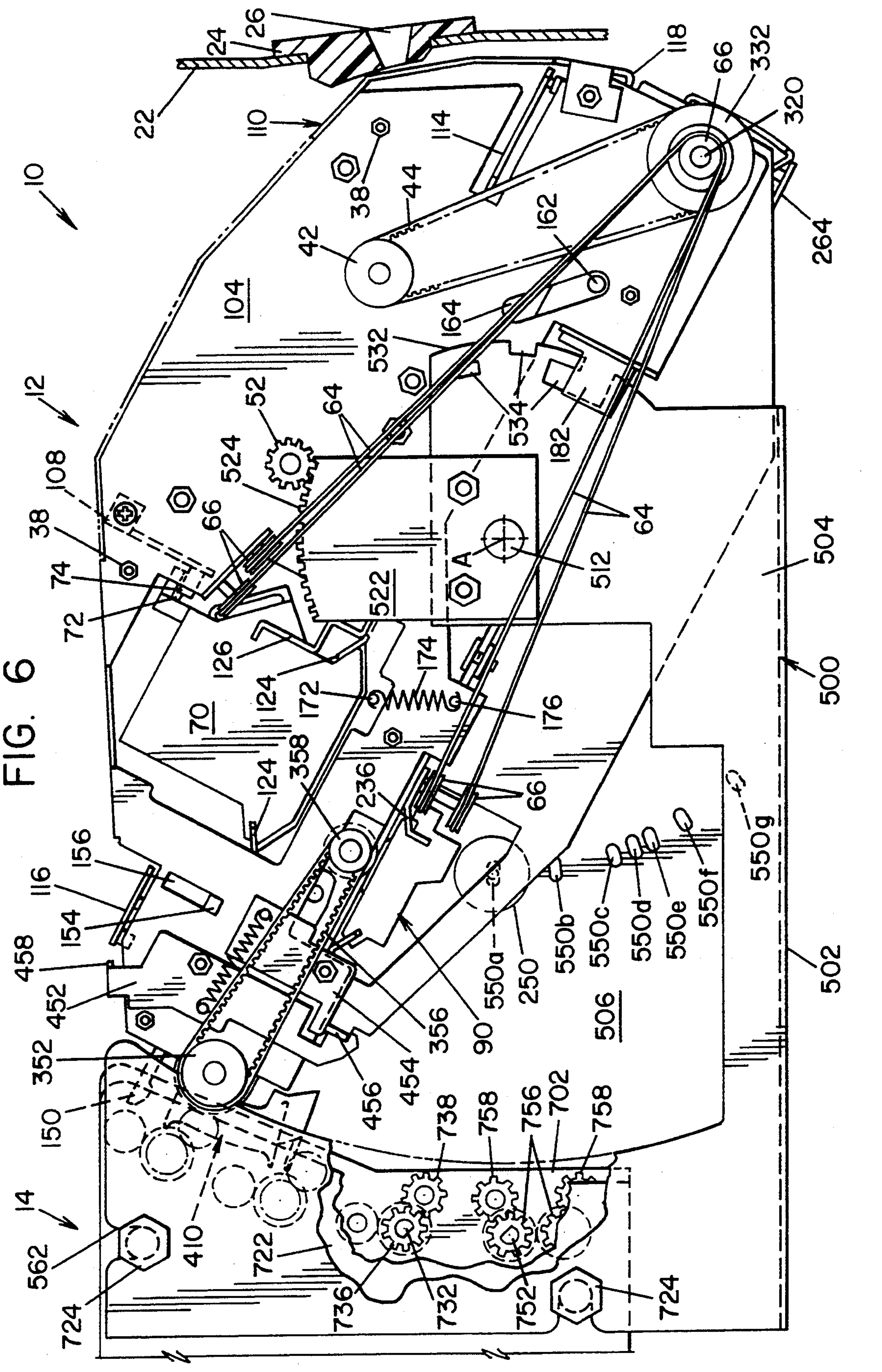
FIG. 6 is an enlarged, partially broken away side elevational view of the deposit processing module and a portion of the deposit storage module showing the deposit processing module oriented to a top storage bin position.
Figure 15:
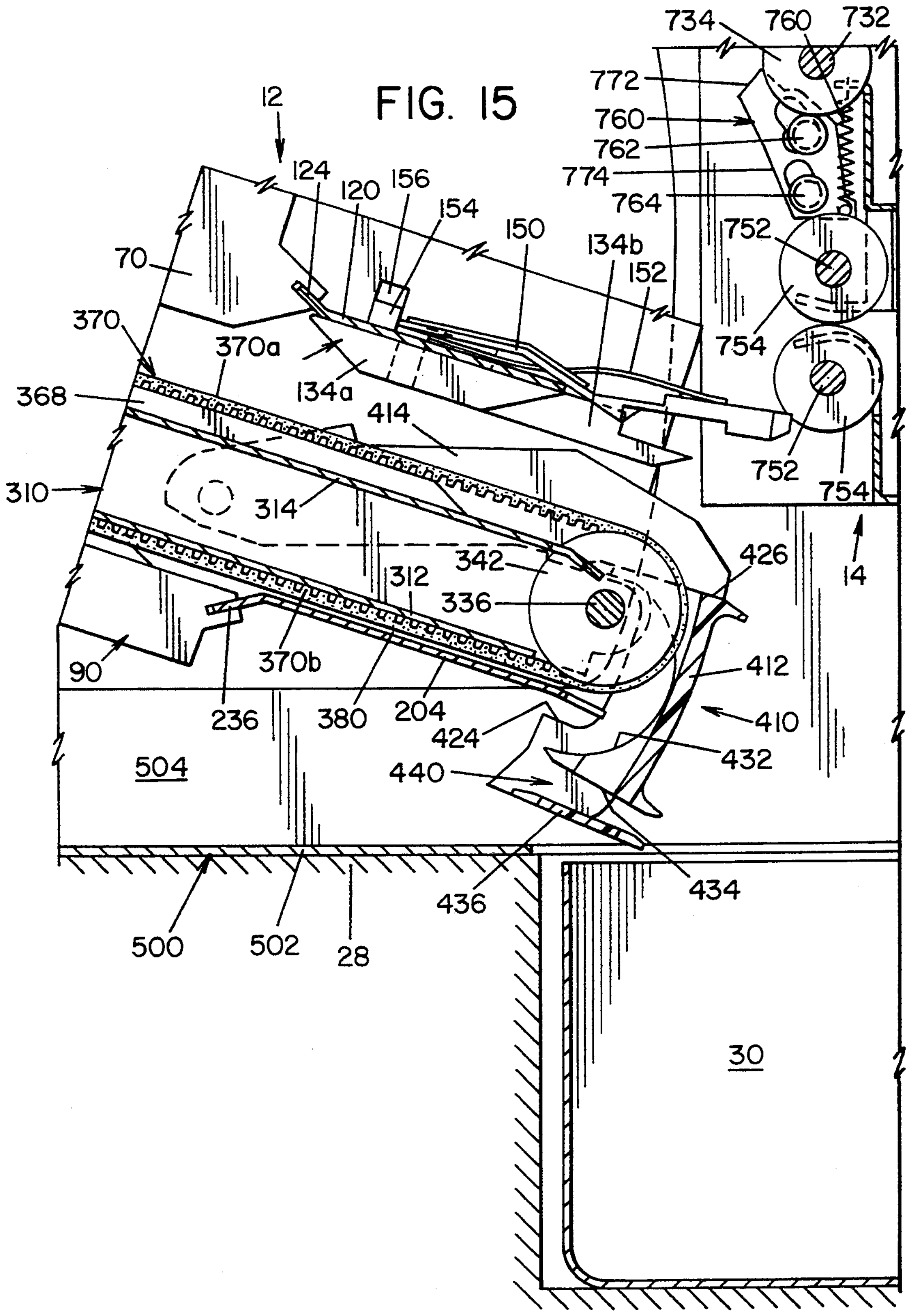
FIG. 15 is an enlarged view showing the gate mechanism.
Figure 24:
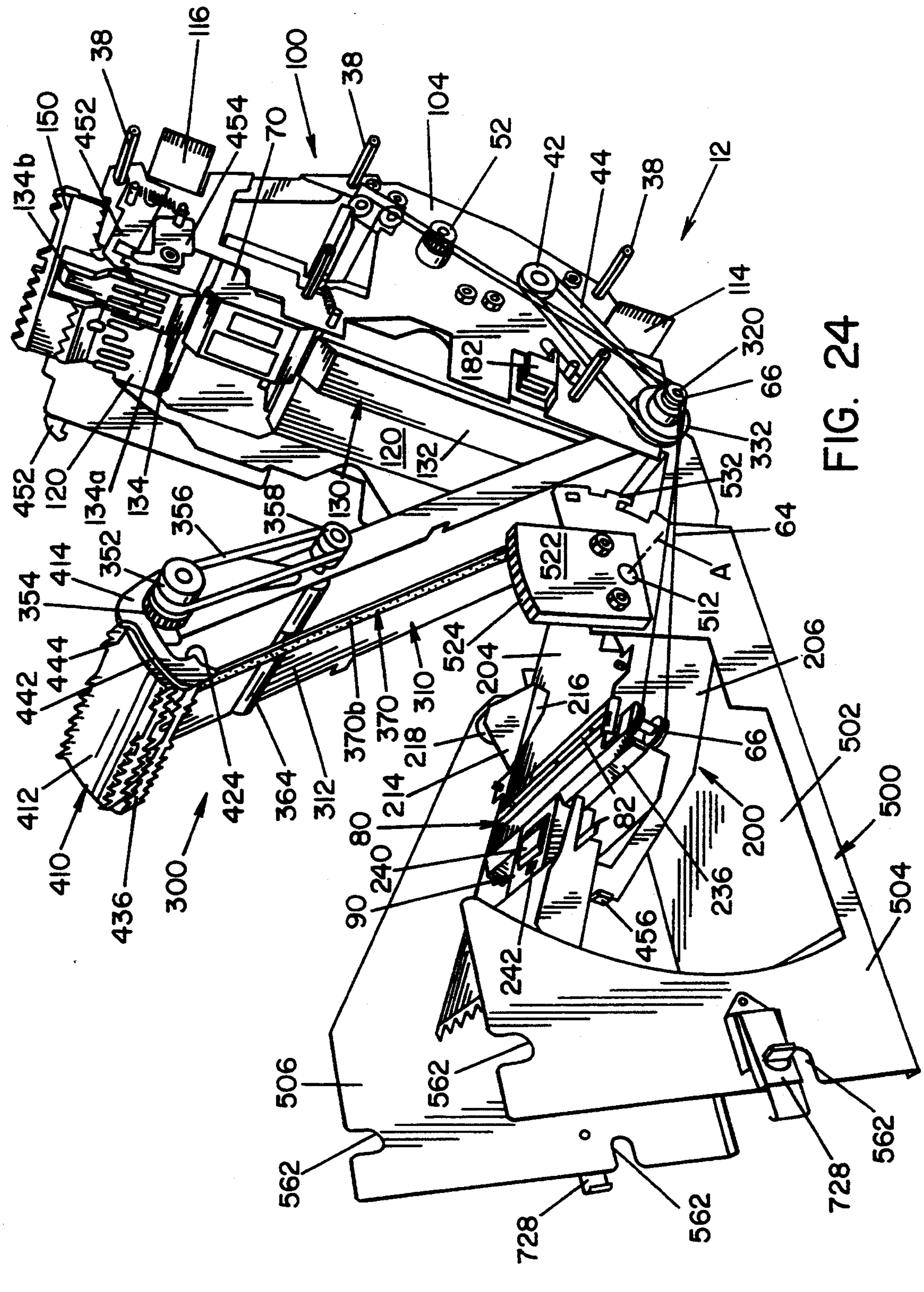
FIG. 24 is a perspective view of the deposit processing module showing the module opened for service.

Referring now to FIGS. 15 and 24, rail section 134 at the discharge end of floating plate 120 is best shown. Rail section 134 is comprised of a first portion 134*a* which is fixedly secured to floating plate 120 and a second portion 134*b* which is formed to be slidably received by portion 134*a*. Rail portion 134*b* is attached to a flexible deflector 150 which is provided at the discharge end of floating plate 120. Deflector 150 is preferably of a molded plastic construction and is shaped to be positioned on the upper surface of floating plate 120 and extend downward over the end thereof. A flat coiled leaf spring 152 secured to floating plate 120 biases the overextending end of deflector 150 downward to the position shown in FIG. 9. A rectangular pin 154 extends laterally outward from each side of deflector through rectangular slots 156 formed in sidewalls 104, 106 of housing 102, as shown in FIGS. 2 and 6. In this respect, deflector 150 is movable within support housing 102 on rectangular pins 154 sliding in slots 156 of sidewalls 104, 106. As shown in FIG. 9, deflector 150 is attached to rail portion 134*b* such that the free end of floating plate 120 is confined therebetween and slidable relative thereto.

Figure 7:
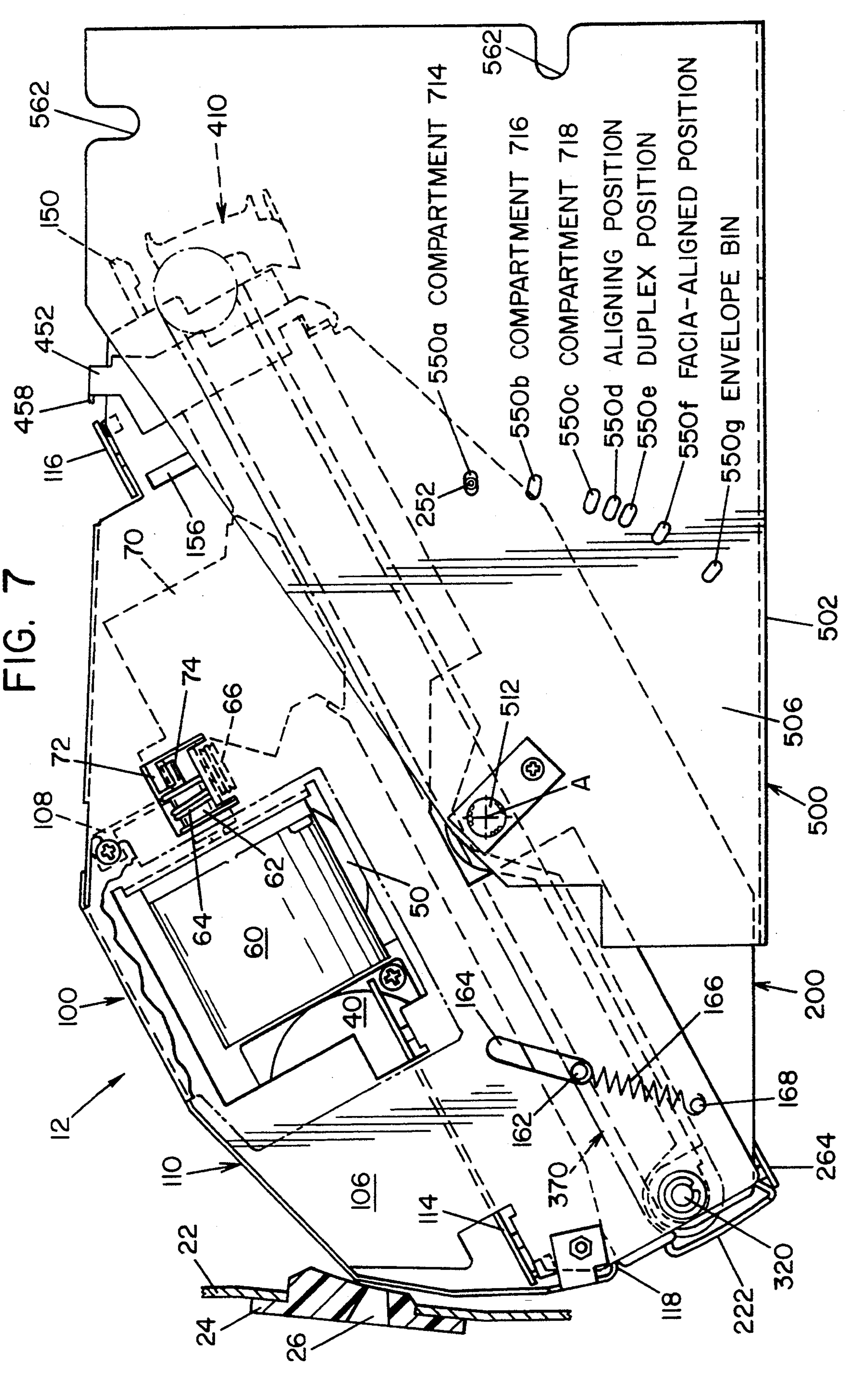
FIG. 7 is a side elevational view of the deposit processing module and deposit storage module showing an opposite view of that shown in FIG. 6.

As a result, the discharge end of floating plate 120 is reciprocally movable, to a limited extent, toward deposit storage module 14, i.e. to the right in FIG. 9, in addition to being movable in a vertical direction (i.e. by movement of rectangular pins 154 in slots 156). The receiving end of floating plate 120 is likewise movable relative to housing 102. In this respect, the receiving end of floating plate 120 is mounted to housing 102 by means of pins 162 projecting outward from the sides thereof which pins 162 extend through inclined slots 164 in sidewalls 104, 106 of housing 102, as best seen in FIG. 7. Pins 162 which extend through sidewalls 104, 106 are attached by a helical spring 166 to pins 168 which are fixedly mounted to the outer surfaces of sidewalls 104, 106. In a similar respect, a pin 172 extends from the side of floating plate 120 past sidewall 104 and is connected by helical spring 174 to a pin 176 extending from sidewall 104, as best seen in FIG. 6. Springs 166, 176 bias floating plate 120 downward to a normal position, as generally shown in FIG. 9.

Referring more specifically to printer shuttle 70, a conventionally known print head is mounted within printer shuttle 70 for marking deposits with transaction code and/or customer information. Printer shuttle 70 is formed to include a plurality of aligned slots to operatively receive rails 124, 126*a*. In this respect, printer shuttle 70 is adapted to be freely movable along rails 124, 126*a*. Referring to FIG. 6, the upper part of printer shuttle 70 includes an outward extending cam surface 72 which is positioned to engage a pin 74 mounted to a plate on housing 102. Pin 74 engages cam surface 72 when printer shuttle 70 is in a predetermined position within slot 122. In this respect, cam surface 72 and pin 74 are dimensioned to cause the printer shuttle 70 and floating plate 120 to move upward relative to the lower module section 200 and transport and gate assembly 300 of the document processing module 12 as will be described in greater detail below during the discussion of the operation of the present invention.

Figure 10:
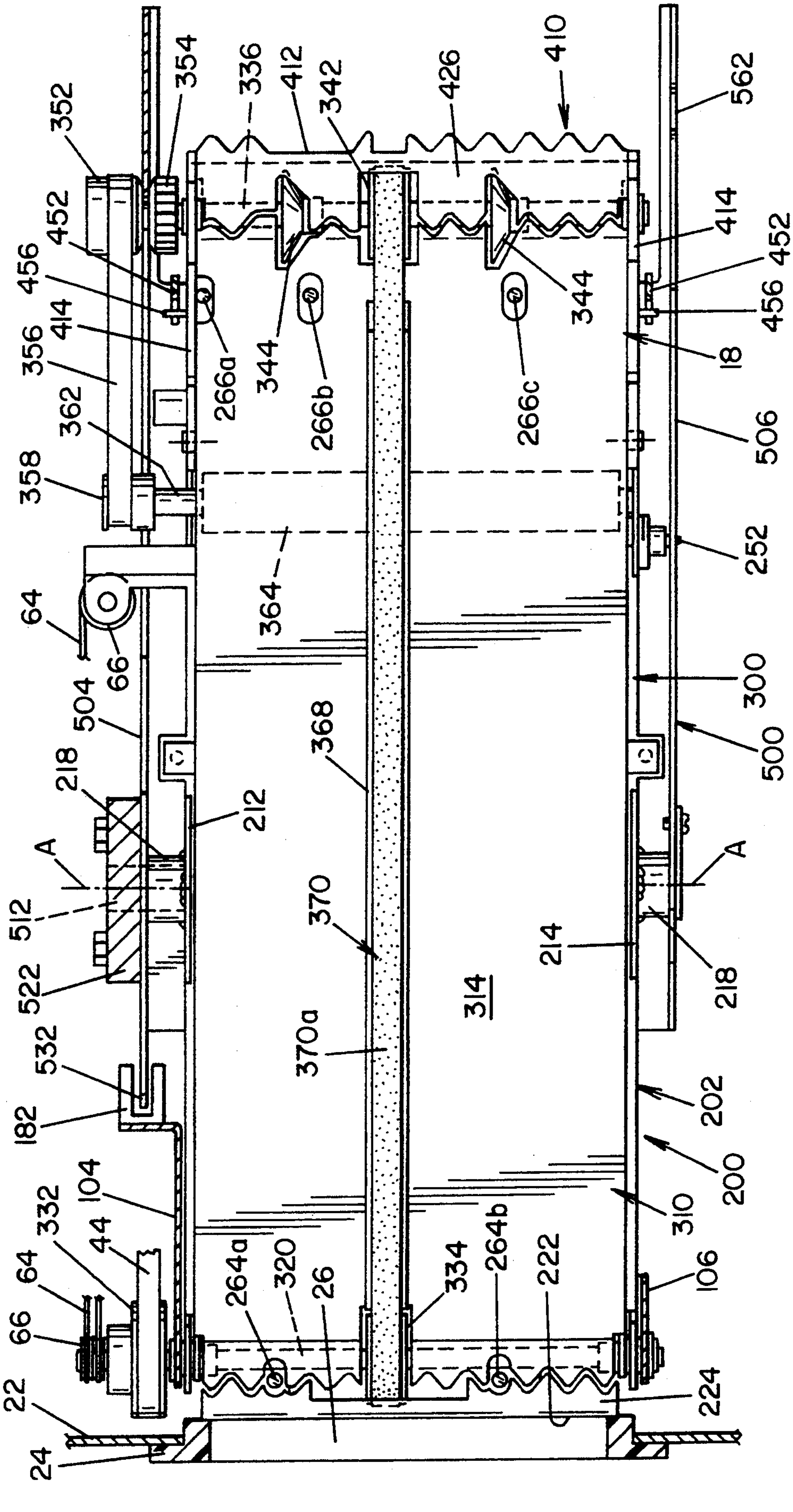
FIG. 10 is a plan view taken along line 10—10 of FIG. 9 showing portions of an upper transport.
Figure 11:
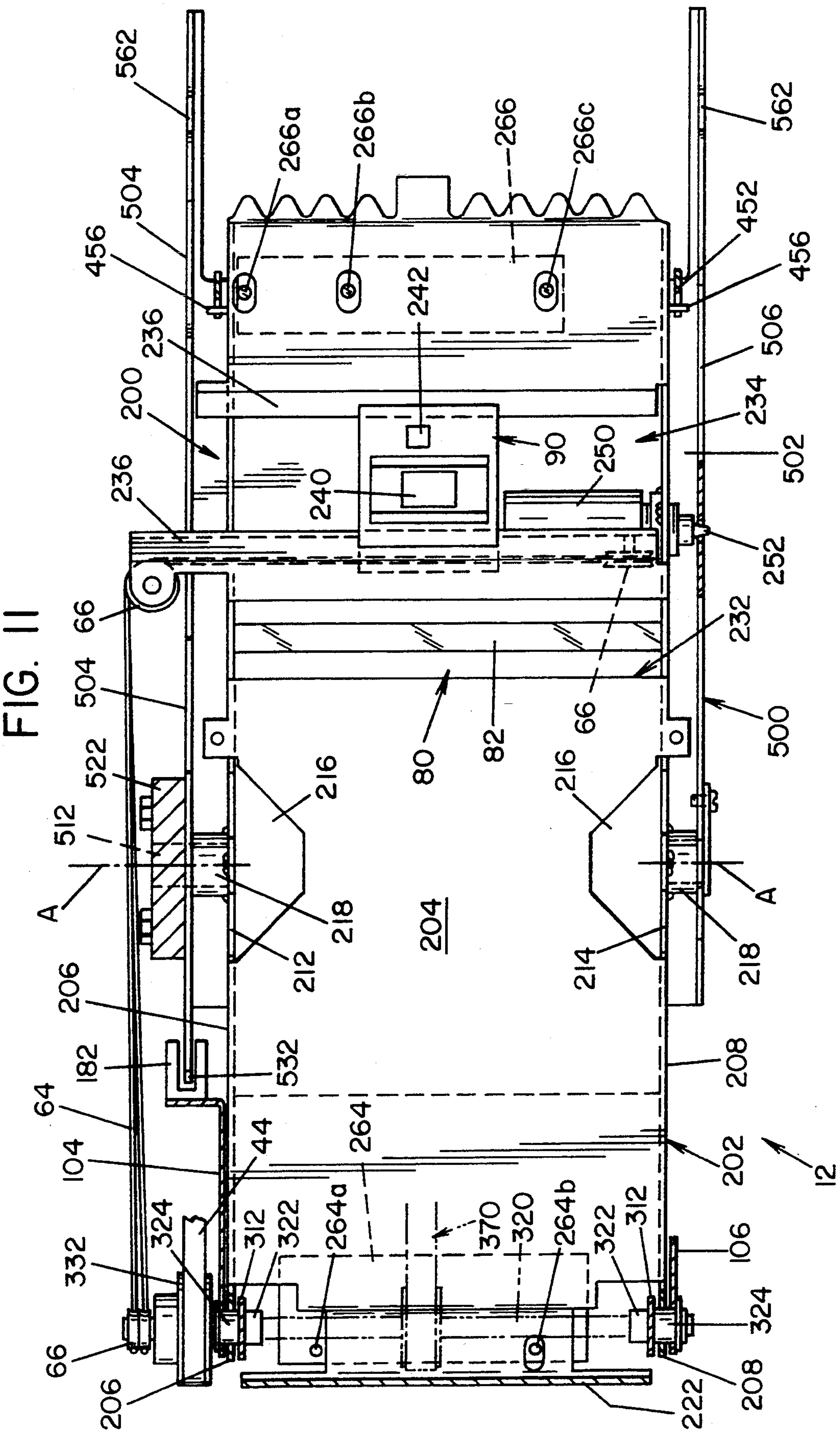
FIG. 11 is a plan view taken along line 11—11 of FIG. 9 showing portions of a lower transport.

Referring now to FIGS. 9, 11 and 13, lower module section 200 of document processing module 12 may be best seen. Lower module section 200 includes a generally U-shaped housing 202 comprised of a flat plate 204 and two (2) downward extending sidewalls 206, 208. A pair of flanges 212, 214, which are in planar alignment with sidewalls 206, 208, extend upward from the plate 204. In the embodiment shown, flanges 212, 214 are notched out from plate 204 and result in voids 216 being formed therein. Each flange 212, 214 includes an outward extending hub 218 which is in axial alignment with the other. The receiving end of plate 204 is formed into a triangular shape, best seen in FIG. 9, having a barrier portion 222 and a guide portion 224. Guide portion 224 of the plate 204 includes serrated edges to mesh with other module components (best seen in FIG. 10) as will be discussed later. In this respect, the discharge end of the plate 204 is also serrated (as best seen in FIG. 11) and formed to operatively interact with other module components.

Two (2) generally parallel transfer slots 232, 234, best seen in FIG. 11, are formed into plate 204 and extend transverse to the longitudinal axis thereof. Slot 232 is dimensioned to a portion of a scanning imager 80. Scanning imager 80 is disposed below the plate 204 and between the sidewalls thereof with a scanning window 82 extending into the slot 232 and being flush with the upper surface of the plate 204.

Slot 234 is provided to receive a magnetic ink character recognition (MICR) shuttle 90. To this end, portions of the plate 204 defining slot 234 are formed as spaced-apart rails 236 on which MICR shuttle 90 is mounted and can slide. Rails 236 are dimensioned such that the MICR shuttle 90 is flush with the upper surface of the plate 204. As best seen in FIG. 11, rails 236 are formed to extend beyond the sidewall 206 of the housing 202 to enable the MICR shuttle 90 to move sufficiently towards sidewall 206 such that the operative components of the MICR can magnetically charge or read information from a deposit position to that side of the plate.

MICR shuttle 90 is comprised of a housing having slots dimensioned to receive the rails 236. The operative portion of the MICR head is designated 240 in the drawings. Adjacent the MICR head on MICR shuttle 90 a sensor 242 is provided. In the embodiment shown, sensor 242 is a retro-reflective sensor which is capable of detecting objects (i.e. sheet documents) passing thereover. Below MICR shuttle 90, a solenoid 250, best seen in FIG. 11, is mounted below plate 204. Solenoid 250 includes a reciprocally movable pin 252 and a sensor 254 (shown schematically in FIG. 25) to monitor movement of pin 252. Primed circuit boards 264, 266, which will be described in greater detail below, are mounted below plate 204 adjacent the distal ends thereof as seen in the drawings.

Referring now to FIGS. 9–14, transport and gate assembly 300 are best shown. The transport and gate assembly 300 is generally comprised of an elongated, hollow, box-like platen 310 and a gate 410 which is pivotably mounted to the discharge end of platen 310. In the embodiment shown, platen 310 is formed from a generally U-shaped bottom member 312 and a flat top member 314 which are secured to each other (by means not shown) to form a structure having a rectangular, box-like cross-Section as best seen in FIG. 13. The distal ends of platen 310 are serrated to operatively mesh with the components located adjacent the ends thereof. Specifically, the receiving end of platen 310 meshes with the serrations formed on guide portion 224 of plate 204, as shown in FIG. 10 and the discharge end of the platen 310 meshes with serrations formed on gate 410, which is best seen in FIG. 10.

Figure 12:
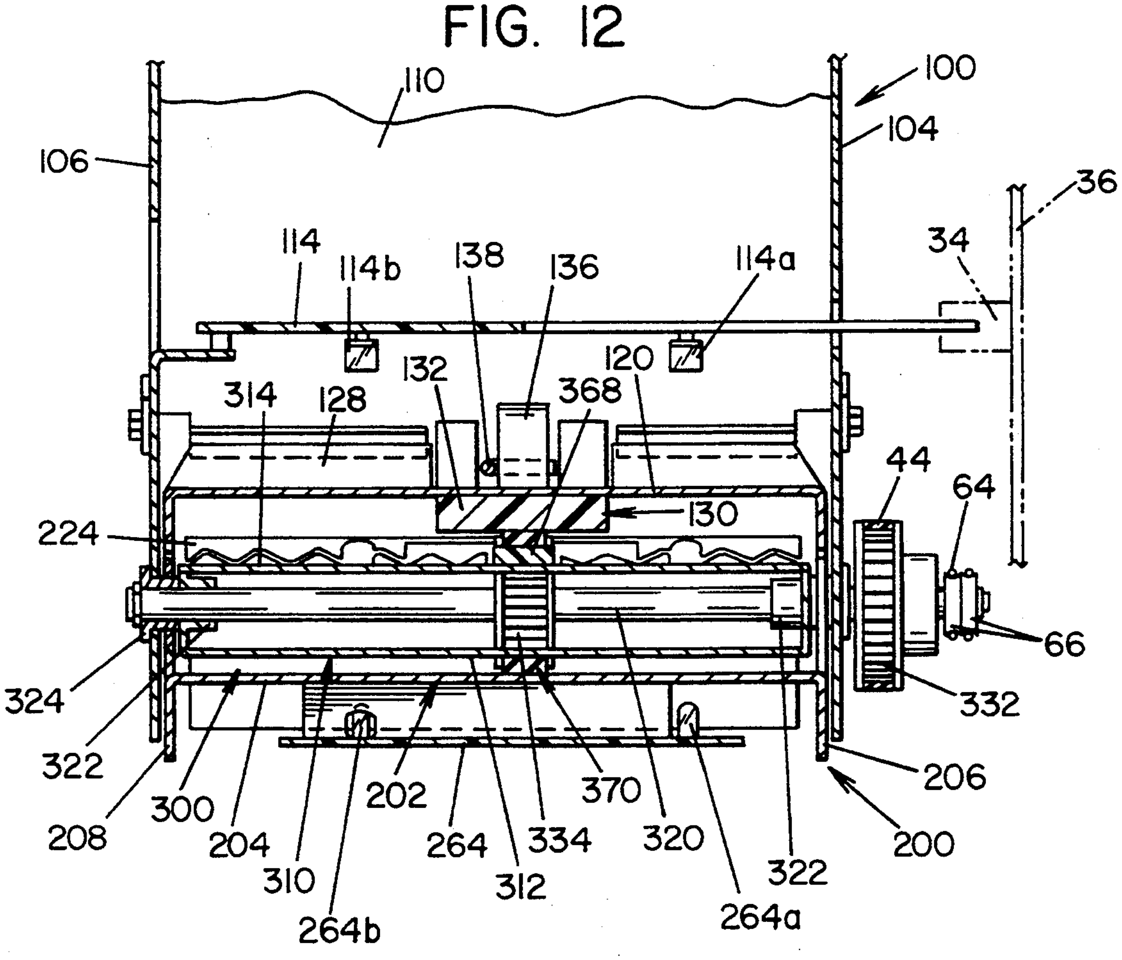
FIG. 12 is a sectional view taken along line 12—12 of FIG. 9.

According to the present invention, a drive shaft 320 extends through the receiving end of the platen 310. As is best seen in FIG. 12, shaft 320 extends through bushings 322 mounted through the sides of the U-shaped bottom member 312 so as to enable platen 310 to be freely pivotally movable on drive shaft 320. Drive shaft 320 extends beyond the sides of platen 310 and includes a pair of outer bushings 324 which extend through the sidewalls 104, 106, 206, 208 of housing 102 of the upper module section 100 and the housing 202 of the lower module section 200. In this respect, the upper module section 100 and the lower module section 200 and the platen 310 are all pivotally mounted onto drive shaft 320, with the drive shaft 320 being freely rotatable relative to each.

At one end of shaft 320, a tooth drive gear 332 is fixedly secured. A second tooth gear 334 is fixedly mounted near the middle of drive shaft 320. Gear 334 extends through slots formed in the upper and the lower surfaces of platen 310.

Figure 14:
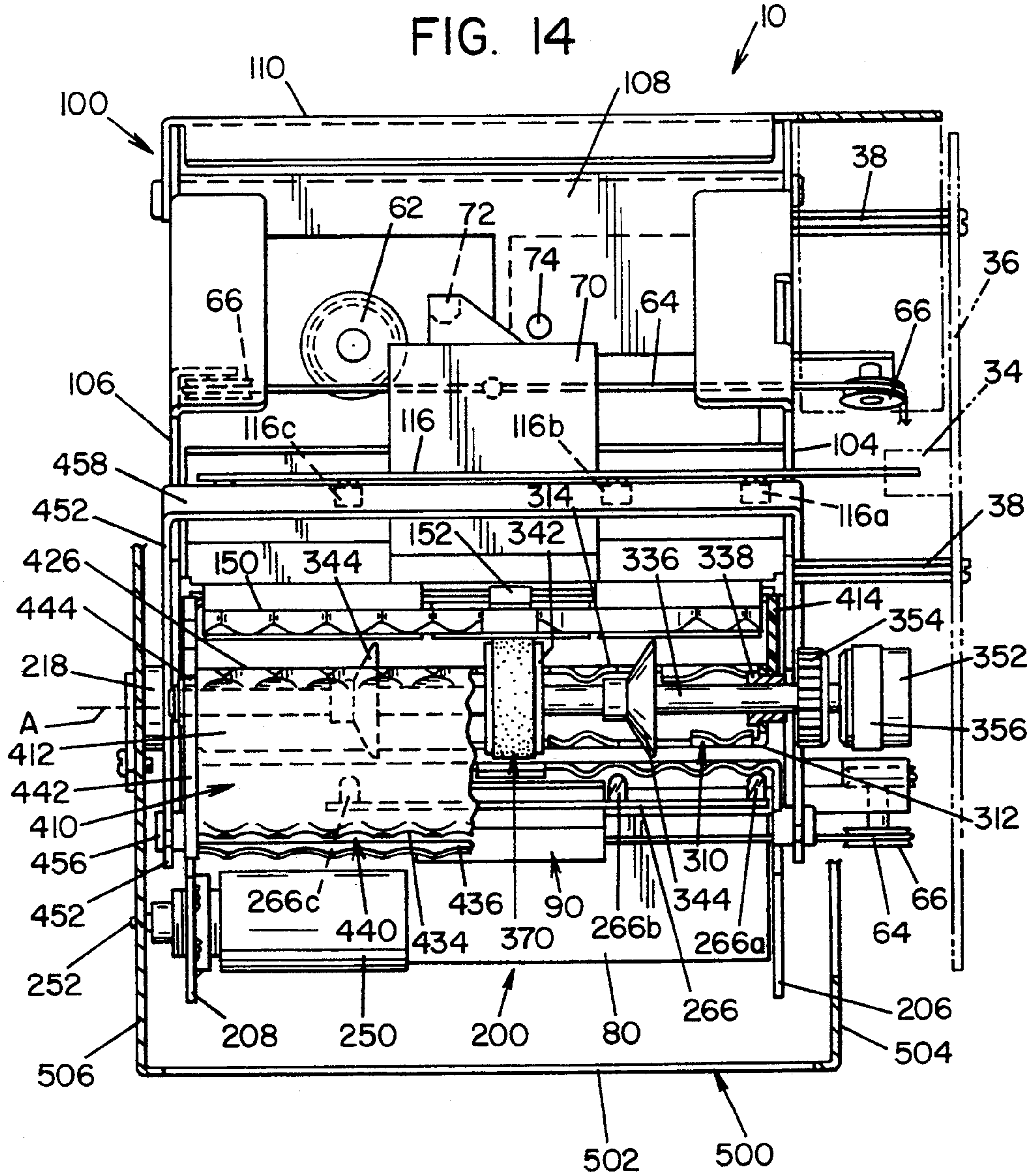
FIG. 14 is an end view taken along line 14—14 of FIG. 9.

Referring now to the discharge end of platen 310, a second shaft 336 is provided, as shown in FIG. 14. Shaft 336 extends through bushings 338 in the sides of U-shaped member 312 to facilitate free rotation of shaft 336 relative to platen 310. A tooth gear 342 is fixedly mounted to shaft 336 near the middle thereof to be in alignment with gear 334 on drive shaft 320. A pair of conical rollers 344 are mounted on shaft 336 for rotation therewith and are positioned on opposite sides of gear 342. A pair of gears 352, 354 are mounted on one end of shaft 336. As shown in FIG. 10, a timing belt 356 connects gear 352 to a gear 358 on a shaft 362 which extends through platen 310. A roller 364, which spans the width of platen 310, is mounted to shaft 362 for rotation therewith, as shown in FIG. 9. Shaft 362 and roller 364 are positioned to be above the track of MICR shuttle 90. Roller 364 extends slightly below the lower surface of platen 310 through a slot formed therein.

Figure 16:
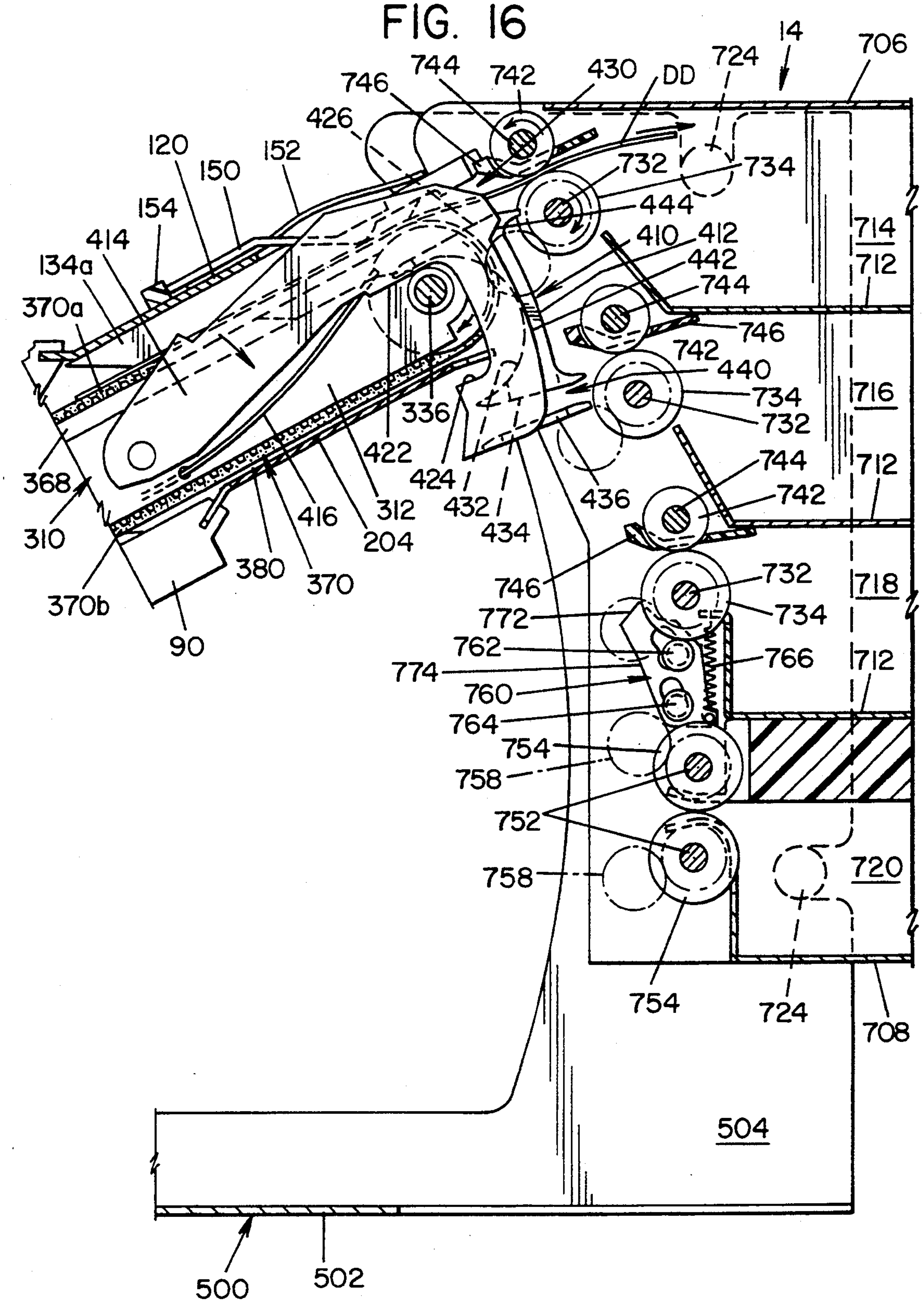
FIG. 16 is a fragmentary, further enlarged view of FIG. 9 showing the gate mechanism in a first position.

As best seen in FIG. 10, a rail 368, which is aligned with and extends between the gears 334, 342 on the drive shaft 320 and shaft 336, projects from the upper surface of platen 310. Rail 368 is provided to support a continuous transport belt 370 which encircles platen 310 lengthwise. In this respect, transport belt 370 is mounted on gears 334, 342 of shafts 320, 336 respectively. Transport belt 370 has a first belt run **370*a* across rail 368 on the upper surface of platen 310 and a second belt run 370*b* along the lower surface of platen 310. Importantly, according to the present invention, shaft 336 and roller 364 are positioned within platen 310 such that a gap 380 is formed between belt run 370*b* and the upper surface of plate 204, as best seen in FIGS. 15 and 16. Gap 380 extends generally from the discharge end 18 of platen 310 to under MICR shuttle 90. Beyond MICR shuttle 90 to the receiving end 16 of platen 310, belt run 370*b* generally engages the upper surface of plate 204**.

Referring now to FIGS. 9, 10 and 15–17, gate 410 is best illustrated. Gate 410 includes a barrier portion 412 which extends across the front of platen 310, as shown in FIG. 10, and a pair of flat arms 414 which extend along the sides of the platen 310. Arms 414 are pivotally mounted to platen 310 on pins for pivotable rotation relative thereto. In the embodiment shown, arms 414 are generally J-shaped and are secured to barrier portion 412 by fasteners (not shown). Arms 414 project upward above the upper surface 310 of the platen and are joined to barrier portion 412 such that arms 414 extend thereabove. A tempered metal rod 416 extends from the sides of platen 310 up over the upper surface of barrier portion 412 and acts as a spring to bias gate 410 in a downward direction. In this respect, arms 414 are formed to include a lower edge 422, shown in FIG. 16, which acts as a stop against shaft 336 to limit gate 410 in its downward direction to neutral position as shown in FIG. 16. Arms 414 likewise include a second surface 424 which limits the upward movement of gate 410 through engagement with shaft 336, as shown in FIG. 18. Barrier portion 412 has a generally flat upper surface 426 and is dimensioned such that upper surface 426 is aligned with the upper surface of platen 310 when the gate 410 is in the neutral (home) position. As best seen in FIG. 10, the ends of upper surface 426 are serrated to mesh with the edges of platen 310 and portions of deposit storage module 14. In addition, notches are formed in gate 410 to enable it to move without contacting the conical rollers 344 or transport belt 370, as shown in the drawings.

When the gate 410 is in its neutral position, as shown in FIGS. 9 and 16, an upper discharge slot 430 is defined between the upper surface 425 of the gate 410 and the lower surface of deflector 150.

Referring now to FIG. 15, barrier portion 412 includes an arcuate inner surface 432 facing and encompassing the end of platen 310. Arcuate surfaces 432 merges with a fiat lower surface 434. A generally fiat plate 436 is provided below barrier portion 412. In the embodiment shown, flat plate 436 is formed as part of arms 414. Plate 436 is spaced from lower surface 434 of barrier portion 412 and defines a lower discharge slot 440 therewith. The ends of lower surface 434 and of plate 436 are likewise serrated to mesh with the ends of platen 310 as well as components on deposit storage module 14. As best seen in FIG. 16, a curved, outward facing surface 442 is formed on the sidearm. Surface 442 faces towards the deposit storage module 14 and is recessed slightly below the outer facing surface of barrier portion 412. An inclined abutment surface 444 is formed at the upper portion of barrier portion 412 and merges with curved surface 442.

As set forth above, upper module section 100, lower module section 200, and the transport and gate assembly 300 which have heretofore been described separately, are pivotally mounted to drive shaft 320, which is best seen in FIG. 24. Upper module section 100, the lower module section 200, and the transport and gate assembly 300 are adapted to be joined together in operative engagement with each other. To this end, pairs of latch elements 452, 454 (best seen in FIG. 6) are mounted on each side of housing 102 of the upper module section 100 to lock onto tabs 456 extending outward from the sides of the housing 202 of the lower module section 200. A release bar 458 spans sidewalls 104, 106 of housing 102 of upper module section 100 to connect the latch elements 452 on each side thereof.

When united, upper module section 100 and platen 310 define a first transport therebetween, and lower section 200 and platen 310 define a second transport therebetween, which is best seen in FIG. 9. More specifically, a first transport is defined between floating plate 120 and the upper surface of the platen 310. In this respect, transport belt 370 is operatively disposed against rail 130 on floating plate 120 (i.e. envelopes and deposits) to capture documents therebetween and to transport the deposits along rail section 132, 134 on floating plate 120 between the receiving end and the discharge end of document processing module 12. The second transport is defined by the lower surface of platen 310 and plate 204 of housing 202 of the lower module section 200.

Figure 4:
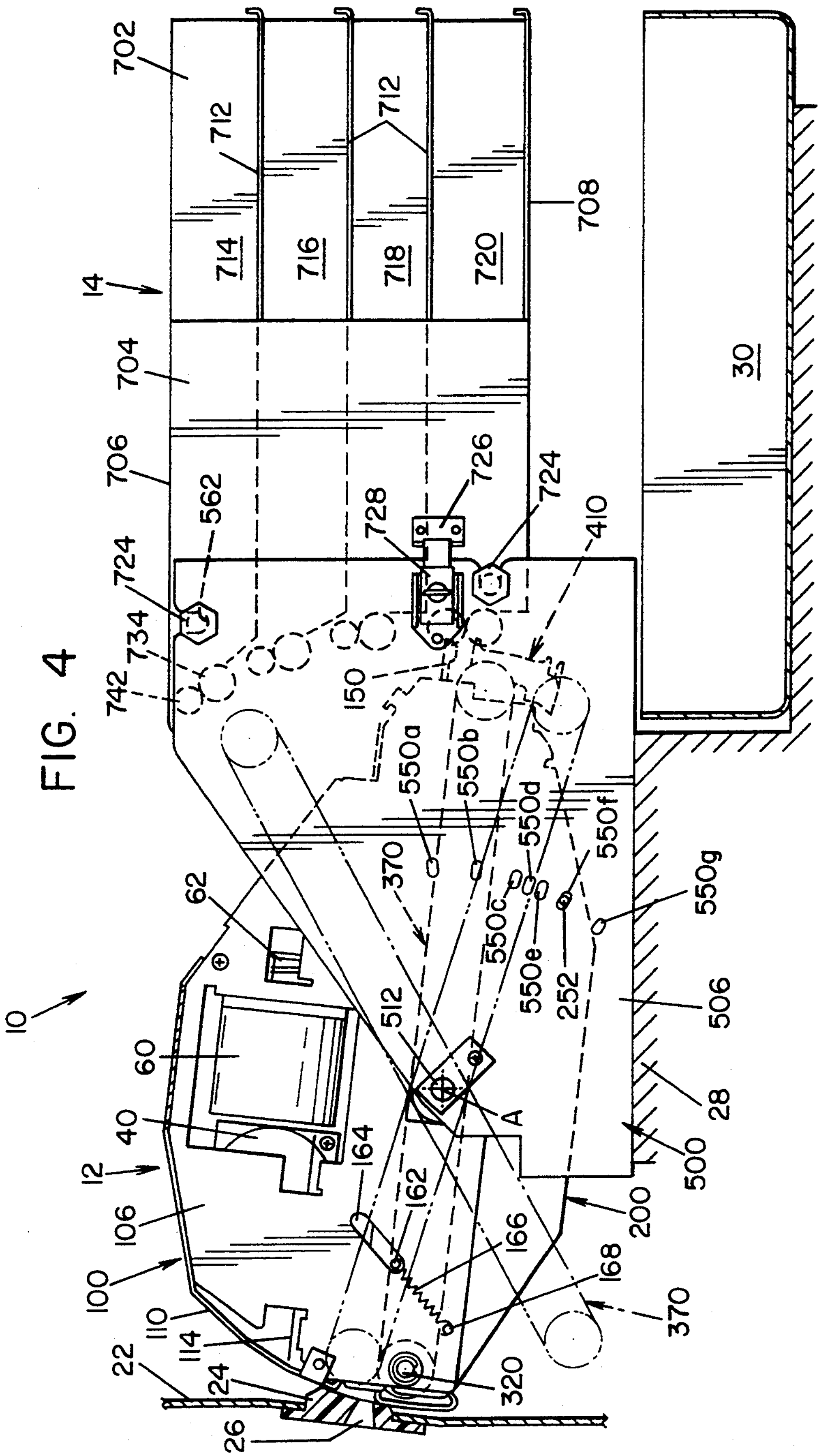
FIG. 4 is a schematic side elevational view of the deposit processing device shown in FIG. 1 showing the other side of the device.

In accordance with the present invention, document processing module 12 is pivotally mounted to a support frame 500, best seen in FIGS. 4, 6, 7 as 13. As shown in FIG. 13, support frame 500 is generally U-shaped and includes a bottom wall 502 and two (2) sidewalls 504, 506 which are generally parallel to each other and spaced apart to receive the document processing module 12 therebetween. Document processing module 12 is pivotally mounted to support frame 500 by means of pins 512 extending through sidewalls 504, 506 into hubs 218 on housing 202 of bottom module section 200. In the embodiment shown, a major portion of sidewall 504 is cut away to permit components of document processing module 12, such as the end shafts 336, 362 to extend therethrough, which is best seen in FIG. 2. As shown in FIG. 6, a gear block 522 having an arcuate rack gear 524 formed along the upper edge thereof is mounted to sidewall 504. Rack gear 524 is positioned to operatively engage a pinion gear 52 on the shaft of pivot motor 50. Adjacent gear block 522, sidewall 504 is formed to have a curved edge 532 having a plurality of notches and windows 534 formed therethrough.

Sidewall 506 of the U-shaped support frame 500 includes a plurality of apertures, designated **550*a*, 550*b*, 550*c*, 550*d*, 550*e*, 550*f*, and 550*g* which are arranged in an arcuate pattern, as best seen in FIG. 7. Apertures 550*a*, 550*b*, 550*c*, 550*d*, 550*e*, 550*f* and 550*g* are positioned to receive pin 252 of solenoid 250 so as to lock deposit processing module 12 in one of a plurality of specific positions relative to deposit storage module 14, as will be described in greater detail below. Sidewalls 504, 506 each include locating notches 562 which are provided to locate and attach document storage module 14 to the document processing module 12**.

Figure 20:
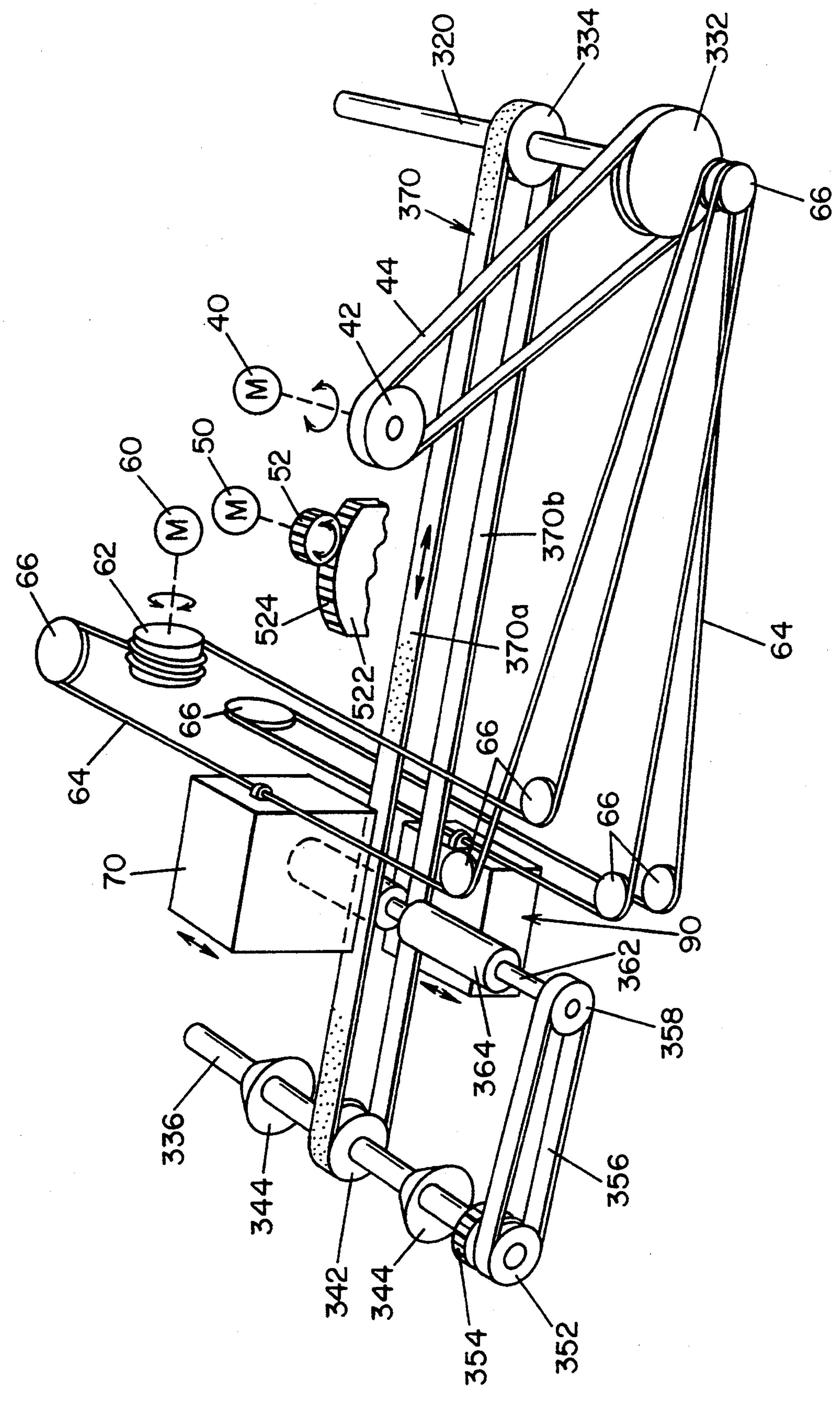
FIG. 20 is a schematic, perspective view showing motor drive arrangement for moving components of the document processing module.

Referring now to FIG. 20, a schematic view of the motor drive assemblies for the respective components of the document processing module 12 is shown. In FIG. 20, the transport motor 40, and pivot motor 50 and shuttle motor 60 are all schematically illustrated. According to the present invention, each motor is preferably a reversible stepping motor wherein the relative rotational position of it may be monitored, and thus the position of components driven thereby may be monitored. As indicated above, transport motor 40 is mounted to sidewall 104 of upper module section 100 with its drive shaft extending therethrough. A gear 42 is mounted to the shaft of transport motor 40 to drive a timing belt 44 which connects gear 42 to gear 332 on drive shaft 320. In this respect, transport motor 40 is operable to rotate drive shaft 320 which in turn rotates shaft 336 by means of transport belt 370. Shaft 336 in turn drives shaft 362, and roller 364 thereon, by means of timing belt 356. Thus, transport belt 370, conical rollers 344 and roller 364 are simultaneously driven in the same direction by transport motor 40.

As described above, pivot motor 50 is operable to drive pinion gear 52 across rack 524 on plate 522, which in turn is operable to cause deposit processing module 12 to pivot about axis A on pins 512 and to angularly orient deposit processing module 12 to one of the several positions **550*a*, 550*b*, 550*c*, 550*d*, 550*e*, 550*f*, 550*g***.

Shuttle motor 60 is provided to reciprocally move printer shuttle 70 and MICR shuttle 90 across the width of platen 310. To this end, a drum 62 is mounted on the shaft of motor 60. The ends of a cable 64 are mounted to drum 62 and wound around drum 62 to enable cable 64 to be wound or unwound in each direction depending upon the rotation of shuttle motor 60. As shown in FIG. 20, cable 64 is wrapped over a system of pulleys, designated 66 in the drawings. Pulleys 66 are positioned to define form a continuous cable circuit, portions of which are adjacent, and run parallel to, the direction of movement of printer shuttle 70 and MICR shuttle 90. Idler pulleys 66 are mounted to drive shaft 320 to direct the cable therearound. Printer shuttle 70 and MICR shuttle 90 fixedly attached to cable 64 so as to move therewith.

To monitor the operation of deposit processing module 12, as well as the position and configuration of deposits, a plurality of sensors are provided. According to the present invention, the sensors, and the circuitry associated therewith, have been arranged to facilitate ease of mounting and simple access thereto for maintenance purposes. In this respect, as set forth above, document processing module 12 includes a plurality of printed circuit boards 114, 116, 264, 266. As best seen in FIG. 9, the printed circuit boards 114, 264 are disposed at the receiving end of document processing module 12, and circuit board 114 being above and circuit board 264 being below platen 310. Circuit board 264 includes a pair of light emitters, designated 264*a*, 264*b* in the drawings, as best shown in FIG. 11. As best shown in FIG. 9, openings in plate 204, platen 310 and inturned portion of cover 110 permit a light beam to be directed from emitters 264*a*, 264*b* through the upper and lower transports towards a pair of light receivers 114*a*, 114*b* on opposing printed circuit board 114. In this respect, emitters 264*a*, 264*b* and receivers 114*a*, 114*b* are positioned to operatively align relative to each other, and each emitter and its respective receivers form an optical sensor.

In like respects, at the discharge end of the deposit processing module 12, three (3) light emitters 266*a*, 266*b*, 266*c* are provided on the lower circuit board 266 to direct individual beams of light through openings in plate 204, platen 310 and floating plate 120 toward light receivers 116*a*, 116*b*, 116*c* on the circuit board 116. As shown in the drawings, emitters 264*a*, 264b, 266*a*, 266*b* and their respective receivers 114*a*, 114*b*, 116*a*, 116*b* are generally centrally disposed with respect to the center line of platen 310. Light emitter 266*a* and its related receiver 116*a* (not shown) is generally disposed along one edge of platen 310, as best seen in FIG. 11.

Figure 25:
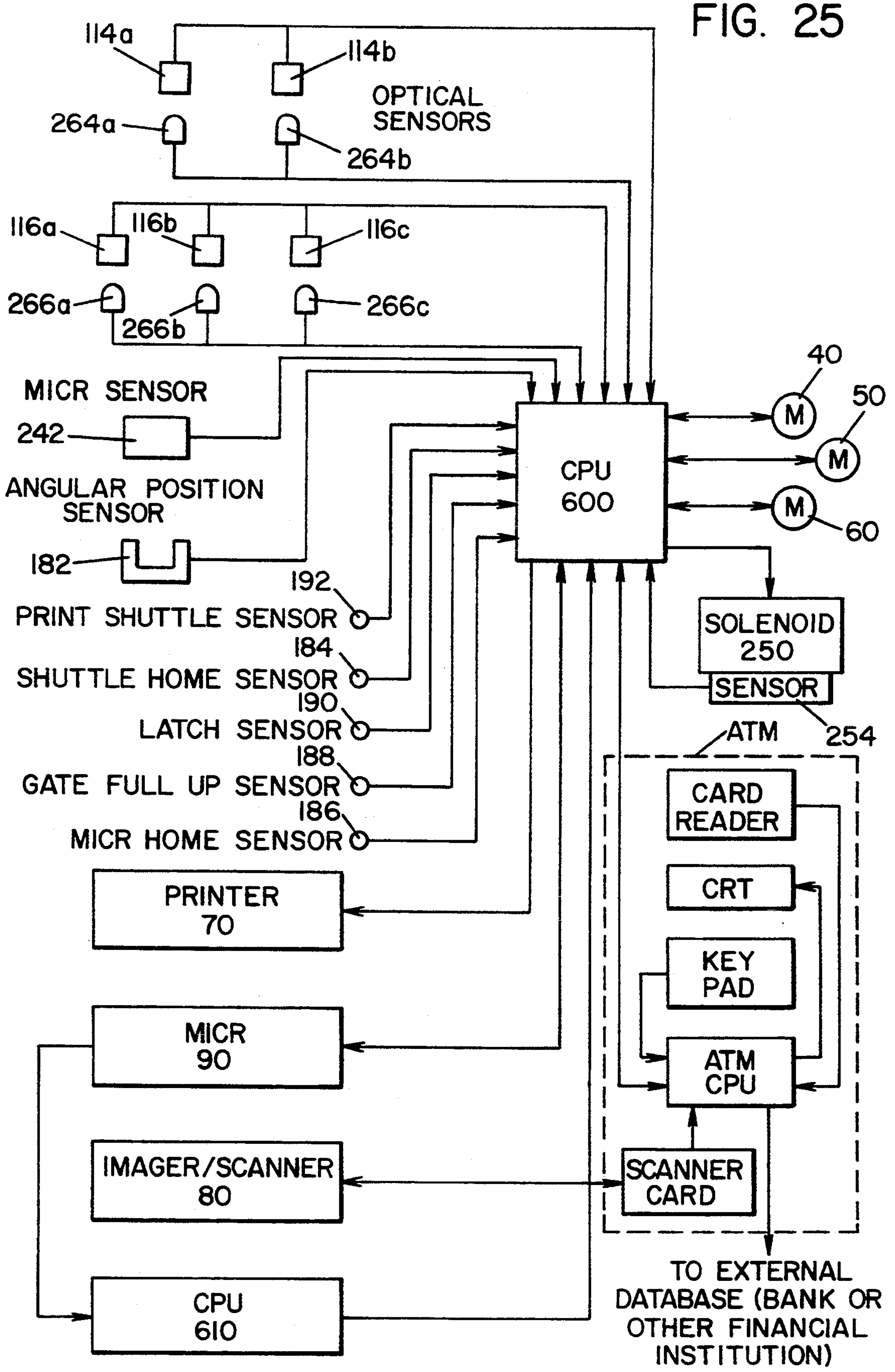
FIG. 25 is a block diagrammic representation of the electronic control system for the document processing device shown.

In addition to the above-identified emitters and receivers, additional sensors are provided to monitor the relative position of selected components of deposit processing module 12. A generally U-shaped module rotation sensor 182, best seen in FIGS. 6 and 11, is provided to receive curved edge 532 of sidewall 504. Sensor 182 is operable to monitor the angular position of deposit processing module 12 by sensing the position of windows 534 with respect thereto. Conventionally known retro-reflective switches, shown schematically and designated 184 and 186 in FIG. 25, are also preferably provided to sense a home position for print shuttle 70 and for MICR shuttle 90, the home position being adjacent sidewall 104 of housing 102. A sensor 188 is also preferably provided to sense a "gate up" position, i.e. when gate 410 is in its uppermost position. An additional sensor, designated 190 in FIG. 25, may also be provided to indicate when latch elements 452, 454 are properly secured to ensure proper alignment and mating of the upper and lower module sections 100, 200 and transport and gate assembly 300. Still further, a sensor, designated 192 in FIG. 25 is also preferably provided on print shuttle 70 to sense the edge of a deposit for the purpose of locating print shuttle 70 relative to the deposit when information is to be printed thereon.

As indicated above, light emitters 264*a*, 264*b*, 266*a*, 266*b*, 266*c* and light receivers 114*a*, 114*b*, 116*a*, 116*b*, 116*c* are mounted on printed circuit board 264, 266, 114 and 116, together with circuitry associated therewith. Circuit boards 114, 116, 264, 266 are connected to each other and to operatively engage components such as motors 40, 50, 60, printer shuttle 70, scanner imager 80 and MICR shuttle 90 by flex circuits (not shown) which can flex and bend as deposit processing module 12, and various components thereof, move and operate. A portion of the circuit boards 114, 116 extends beyond sidewall 104 of the document processing module 12, as best seen in FIG. 1. These extending portions of circuit boards 114, 116 include circuit lead lines to be received within female connectors 34 on a master circuit board 36. Master circuit board 36 is adapted to be mounted on spacer posts 38 extending outward from the document processing module 12, as best seen in FIG. 14, wherein the master circuit board 36 and a female connector 34 are shown in phantom.

Referring now to FIG. 25, a block diagrammic representation of the internal control system for the document processing module 12 is shown. The physical operation of deposit processing module 12 are basically controlled by a central processing unit 600 which is programmed to control operations of the various components of deposit processing module 12 by means of a program stored therein. Central processing unit 600 is connected to light emitters and receivers, and to motors 40, 50, 60. Information received from stepping motors 40, 50, 60 and optical sensors enables central processing unit 600 to monitor the relative position of the components, as well as to identify and monitor deposits placed therein. Central processing unit 600 is connected to the printer within printer shuttle 70 to provide instructions and information to be printed on a deposit. Scanner imager 80 is connected to the control processing unit (CPU) of the ATM to receive information in coded form for present transmission to an external database, such as a bank or similar financial institution, or for display to the ATM user on the CRT of the ATM, or for storage within memory of the CPU of the ATM for transmission at a later time. Central processing unit 600 is likewise connected to the MICR read head to receive information typically present on checks or other similar documents in coded text. A separate decoding processing unit 610 is provided to decode and translate information obtained from a deposit to provide information identifiable to central processing unit 600 or to the external database.

Figure 5:
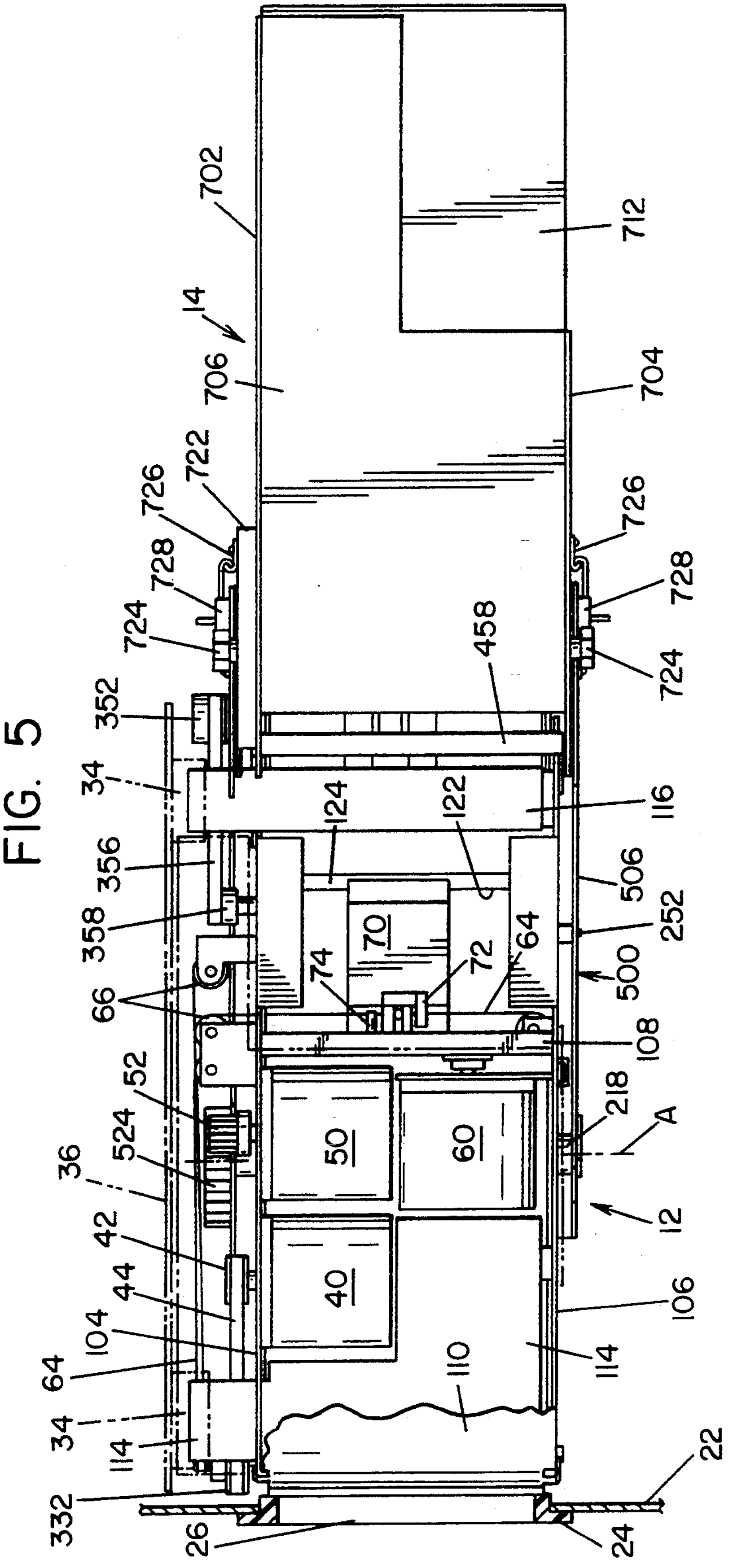
FIG. 5 is a top, plan view of the deposit processing device shown in FIG. 1.

Referring to FIGS. 4 and 5, deposit storage module 14 is a rectangular, box-like structure having two spaced-apart parallel sidewalls 702, 704, a top wall 706, and a bottom wall 708. A plurality of spaced-apart shelves 712 extend between sidewalls 702, 704 to define compartments 714, 716, 718, 720. Sidewall 704, top wall 706 and bottom wall 708 are formed so as to define an open comer for access to compartments 714, 716, 718, 720. A side panel 722 is spaced-apart and mounted to sidewall 702. Mounting lugs 724 extend from sidewall 704 and panel 722 and are positioned so as to be received within mounting notches 562 on support frame 500 of deposit processing module 12. In this respect, mounting lugs 724 are provided to position deposit storage module 14 adjacent to deposit processing module 12. To ensure accurate positioning, and to maintain accurate alignment between the deposit storage module 14 and deposit processing module 12, latch elements 726, 728 are provided to operatively lock and hold deposit storage module 14 in engagement with deposit processing module 12.

Figure 17:
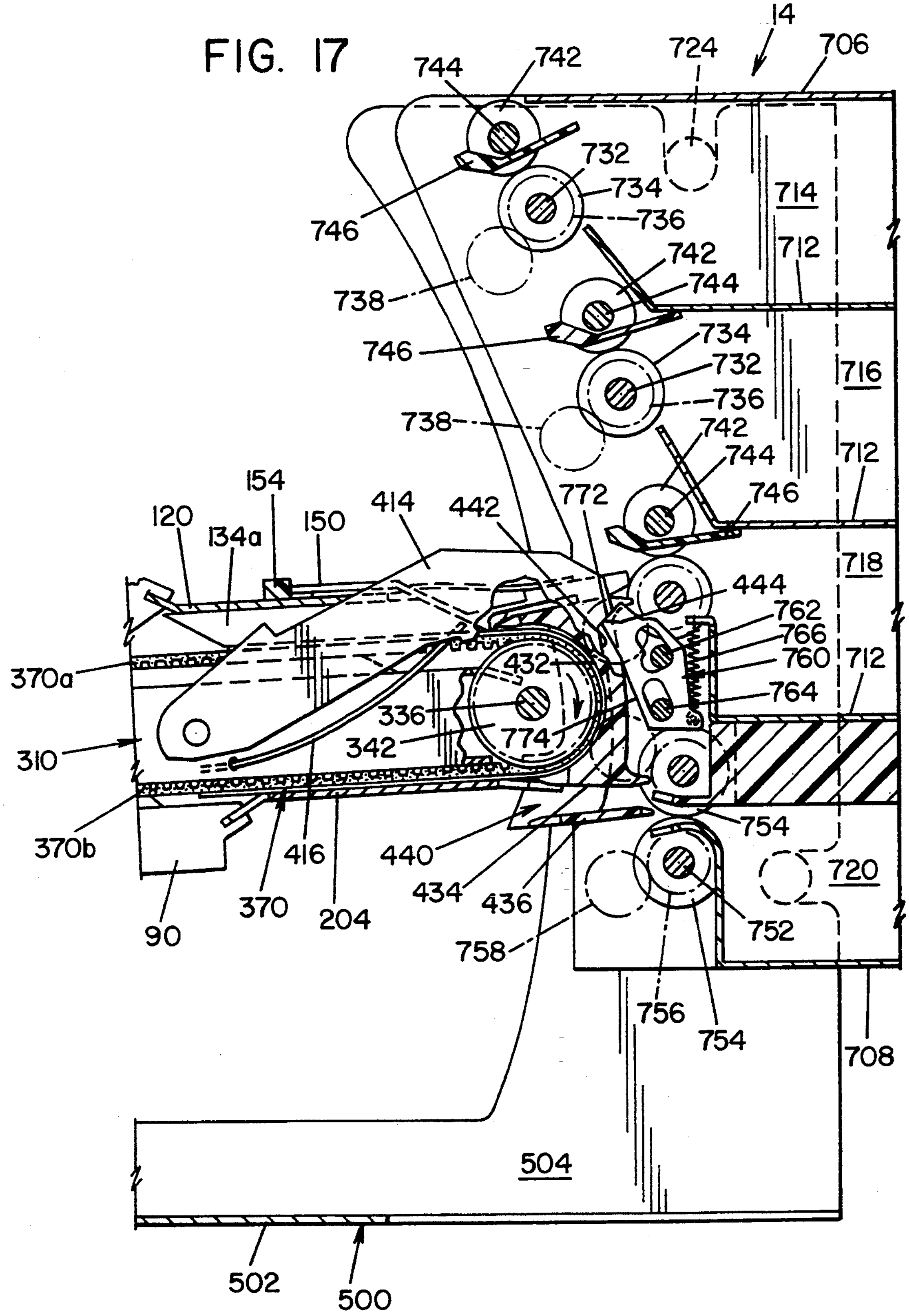
FIG. 17 is an enlarged view showing the gate mechanism in a position for conveying a document between the upper transport and the lower transport.
Figure 18:
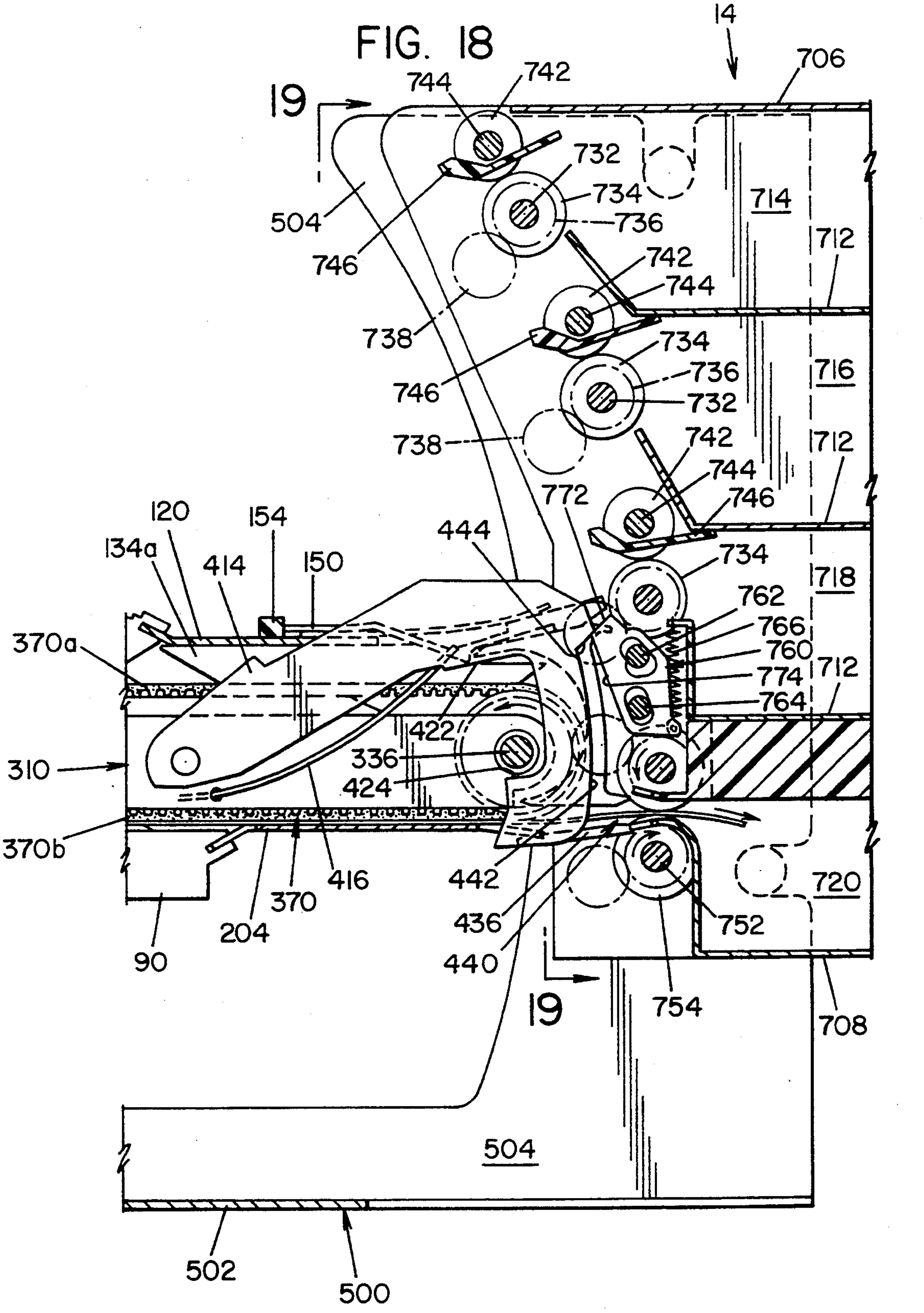
FIG. 18 is a view similar to FIG. 16 showing the document processing module in a gate full "up" position from which a single document may be sent to a select location or be received therefrom.
Figure 19:
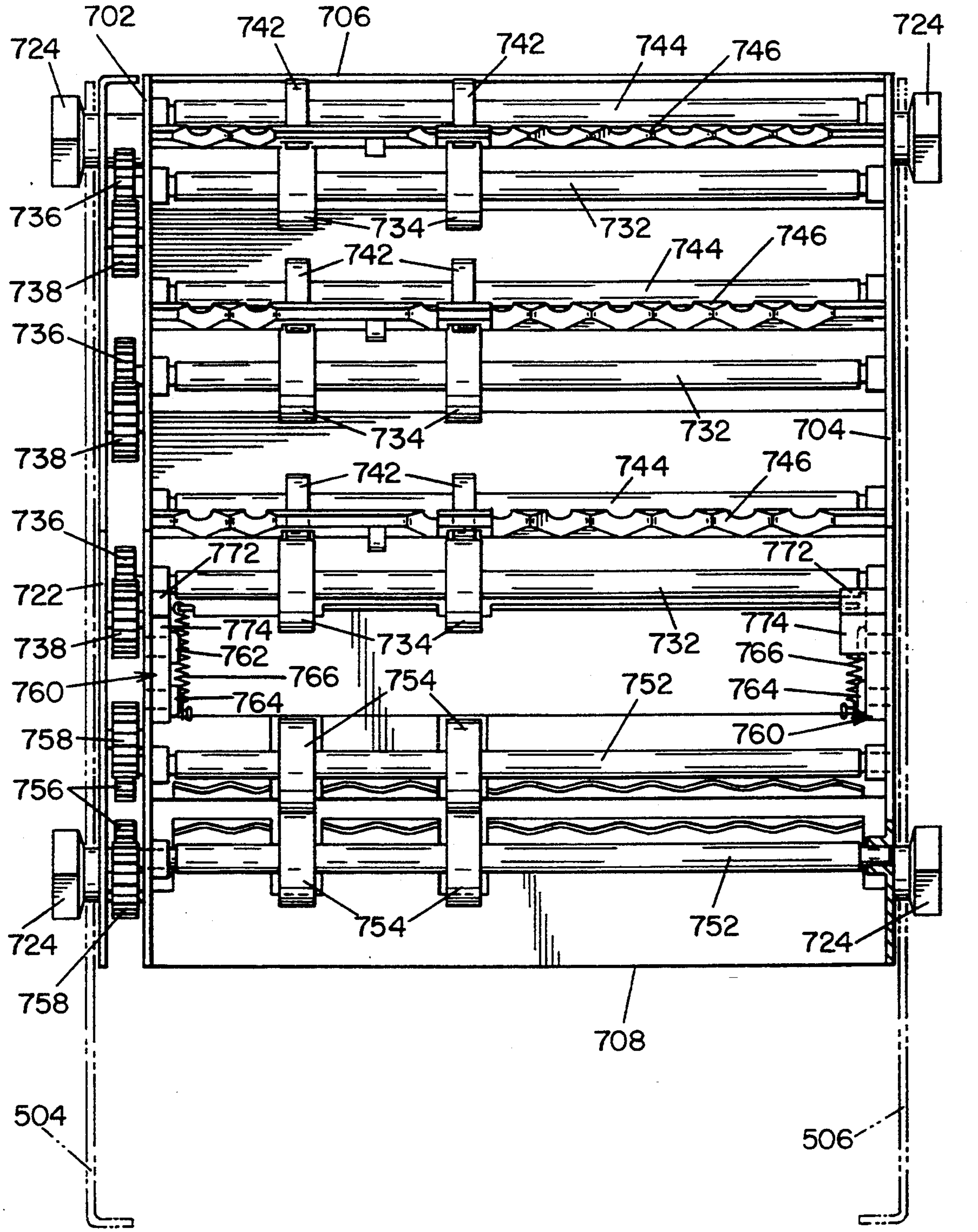
FIG. 19 is an end elevational view taken along line 19—19 of FIG. 18.

In the embodiment shown, compartments 714, 716 and 718 are adapted to receive single document deposits from deposit processing module 12, as shown in FIGS. 16 and 17. At the entrance to each compartments 714, 716, 718, a drive shaft 732 having a plurality of drive rollers 734 thereon is provided. Each drive shaft 732 extends between sidewalls 702, 704 and has one end which projects into the space defined between sidewall 702 and panel 722. A gear 736 is mounted on the end of each drive shaft 732 and meshes with a second intermediate gear 738 which is also confined between panel 722 and sidewall 702. Gears 738 of each compartment 714, 716, 718 are positioned to align and mesh with gear 354 on shaft 336 of platen 310. In this respect, drive shaft 732 and drive rollers 734 at the entrance to compartments 714, 716, 718 are driven by gear 354 on platen 310 when platen 310 is aligned with a specific compartment. Idle rollers 742 mounted on shafts 744 are provided above and in mating engagement with drive rollers 734. Deflectors 746 are provided between drive rollers 734 and idle rollers 742 to direct single document deposits into the associated compartment. The leading edges of the deflectors are serrated to mesh with the leading edges of platen 310.

According to one aspect of the present invention, the lowermost compartment 720 is provided to enable document processing module 12 to duplex, i.e. to invert, single document deposits. To this end, a pair of drive shafts 752 are provided at the entrance to compartment 720. Each drive shaft 752 includes drive rollers 754 which mate with rollers 754 on the opposite drive shaft 752. A drive gear 756 is provided at the end of each shaft 752 and meshes with an intermediate gear 758 which is operable to engage gear 354 on shaft 336 of platen 310.

Referring now to FIGS. 15–18, a pair of similar gate actuators 760 are mounted to the inner surfaces of sidewalls 702, 704. Gate actuators 760 are mounted on a pair of pins 762, 764 which are received in slots formed in each actuator 760. A biasing spring 766, having a predetermined spring force, urges actuators 760 upward to a neutral position as shown in FIG. 15. As shown in the drawings, the upper slot is generally L-shaped, while the lower slot is straight. Each actuator 760 is formed to have a pair of cam surfaces 772, 774 which are dimensioned to operatively engage and interact respectively with surfaces on gate 410 as will be described in greater detail below. In this respect, the slots in gate actuator 760 are configured such that when a downward force sufficient to overcome the biasing force of spring 766 is exerted on the inclined cam surface 772 of actuator 760, actuator 760 is forced downward and back (i.e. away from gate 410). In other words, one slot is inclined relative to the other slot to impart a slight rotation of actuator 760 as it moves downwards. In addition, the L-shaped slot allows actuator 760 to pivot backward about lower pin 764 when an upward force is exerted on lower cam surface 774, as will be described in greater detail below.

OPERATION

Referring now to the operation of the present invention, apparatus 10 is preferably integrated as part of an automatic teller machine (ATM), wherein access to apparatus 10 may be accomplished by using conventionally known magnetically coded cards and utilizing keypads typically provided on the ATM to establish the identity of a customer. Authorization to use apparatus 10 may be obtained from a remote, external database, such as in a bank or other financial institution or from records maintained in memory within the central processing unit of the ATM. Importantly, system and hardware for accessing apparatus 10 in and of itself forms no part of the present invention. Moreover, it will be appreciated after understanding the operation of the present invention, that apparatus 10, need not be part of an automatic teller machine (ATM), but may be used as a stand alone unit for other applications wherein access to the apparatus may be by means other than a magnetically encoded card.

With respect to the operation and use of apparatus 10, deposit processing module 12 is adapted to operate in conjunction with deposit storage module 14. Importantly, according to the present invention, specific operations of deposit processing module 12 are accomplished through interactive engagement between the gate 410 of document processing module 12 and gate actuator 760 on deposit storage module 14. In this respect, according to the present invention, deposit processing module 12 is pivotally movable about axis A to a plurality of positions relative to deposit storage module 14. In the embodiment shown, deposit processing module 12 is movable to seven (7) specifically defined positions relative to deposit storage module 14. In each position, deposit processing module 12 is locked into proper alignment with deposit storage module 14 by means of pin 252 on solenoid 250 which projects into one of locating apertures **550*a*, 550*b*, 550*c*, 550*d*, 550*e*, 550*f*, 550*g* defined in sidewall 506 of support frame 500. In this respect, each aperture 550*a*, 550*b*, 550*c*, 550*d*, 550*e*, 550*f*, 550*g* in support frame 500 represents a specific position of deposit processing module 12. For the purposes of illustrating operation of the present invention, in FIG. 7, each aperture 550*a*, 550*b*, 550*c*, 550*d*, 550*e*, 550*f*, 550*g* has been identified with respect to the function of deposit processing module 12** in such position.

In general, the upper three (3) apertures **550*a*, 550*b*, and 550*c* are positions for depositing single document deposits into compartments 714, 716, 718 of deposit storage module 14, aperture 550*a* also being a "home position" for deposit processing module 12. Aperture 550*d* represents a single document deposit "aligning position" and a position wherein single document deposit is conveyed between the upper transport and the lower transport. Aperture 550*e* represents a gate full "up" position and a position wherein single document deposits are conveyed from the lower transport to pinch rollers 754 and visa versa. Aperture 550*f* represents a "facia-aligned position". This position also allows document deposits to be sent or received from pinch rollers 754 to the upper transport. Aperture 550*g* represents an "envelope deposit position". FIG. 4 generally shows deposit processing module 12 in the "facia-aligned position" for receiving a deposit, but also shows the range of movement of deposit processing module 12 by illustrating (in phantom) the positions of transport belt 370, (i.e. platen 310) would assume when document processing module 12** is in its extreme, uppermost and lowermost positions.

As discussed previously, apparatus 10 is adapted to receive envelope deposits which may contain currency or other documents of value, or single document deposits, such as checks, utility bills, or other notes of value. With the present invention, envelope deposits are handled differently than single document deposits. Accordingly, hereinafter "envelope deposits" shall be referred to as such and designated "ED" in the drawings, and deposits such as a check, utility bills, or some other single note of value shall be referred to as a "single document deposit" and designated "DD" in the drawings.

Referring now to the processing of a deposit, an authorization signal to allow access to apparatus 10 is conveyed to central processing unit 600 from an external source. As indicated above, such signal may be received from an automatic teller machine (ATM), a bank, or other financial institution or some other source.

Once central processing unit 600 has received instructions to accept receipt of a deposit, central processing unit 600 instructs pivot motor 50 to pivot deposit processing module 12 about axis "A" to move same to the facia-aligned position, a position illustrated in FIG. 4. More specifically, pivotal movement of deposit processing module 12 is accomplished by pinion gear 52 being driven over arcuate rack gear 524. The relative position of deposit processing module 12 is monitored by central processing unit 600 based upon information received from stepping motor 50 and from information received from angular position sensor 182. With such information, central processing unit 600 may determine the relative location of deposit processing module 12 relative to deposit receiving slot 26 in housing facia 22, as well as the relative position of deposit processing module 12 relative to deposit storage module 14. When deposit processing module 12 has pivoted to the "facia-aligned position", pivot motor 50 is stopped and solenoid 250 is actuated such that pin 252 thereon extends through aperture *550f* in support housing 500. In this respect, deposit processing module is thus locked and aligned into a deposit receiving position, wherein the upper transport is aligned with deposit receiving slot 26 through housing facia 22.

With deposit processing module 12 in the "facia-aligned" position, central processing unit 600 initiates transport motor 40, to initiate movement of transport belt 370 in a direction to draw a deposit into the upper transport.

According to the present invention, deposit processing module 12 is capable of identifying the type of deposit inserted therein, i.e. envelope deposit ED or single document deposit DD, by means of the optical sensors provided at the receiving end of deposit processing module 12. In this respect, as the leading end of the deposit enters the upper transport, it passes between light emitters *264a, 264b* and light receivers *114a, 114b*. According to the present invention, emitters *264a, 264b* and receivers *114a, 114b*, are positioned and have operational characteristics wherein they are capable of providing to central processing unit 600 information as to the length, width and opacity (which provides an indication of thickness) of the inserted deposit, with which central processing unit 600 can identify whether the deposit is an envelope or single document based upon such information.

If an envelope deposit ED is detected, transport motor 40 proceeds to transport drive belt 370 to convey the envelope deposit ED to a position under printer shuttle 70. Envelope deposit ED is drawn along rail 130 of floating plate 120 through frictional engagement with transport belt 370. Importantly, because transport belt 370 and rail 130 on floating plate 120 project above their respective surfaces, the upper transport has ample clearance on either side of transport belt 370 (i.e. between floating plate 120 and platen 310) to facilitate the passage of envelope deposits ED which have lumps or enlargements to one side of drive belt 370. More importantly, because upper plate 120 effectively "floats" relative to housing 102 of upper module section 100, and may move away from transport belt 370, the upper transport can accommodate the passage of relatively thick envelope deposits ED. Importantly, floating plate 120 not only moves upward away from transport belt 370 to receive thick deposits, it also shifts in the direction of movement of the thick deposit. In this respect, slots 164, through which pegs 162 extend, are slanted to allow floating plate 120 to shift upward and in the direction of movement of the deposit. Such movement is facilitated because the dispensing end of floating plate 120 may slide between deflector 150 and rail section *134a*.

Central processing unit 600 is programmed to position the envelope deposit below printer shuttle 70 by controlling transport motor 40. Positioning envelope deposit ED below printer shuttle 70 can be accomplished by using the optical sensors, i.e. light emitters *266a, 266b, 266c* and light receivers *116a, 116b* and *116c* to establish when the leading edge of the envelope deposit has reached the discharge end of deposit processing module 12. With the envelope deposit ED positioned below printer shuttle 70, central processing unit 600 may activate shuttle motor 60 to position print head 70 to a desired location relative to the envelope deposit ED. Shuttle motor 60 is operable to move printer shuttle 70 transverse to the path of envelope deposit ED by wrapping cable 64 onto drum 62. At this point, it should be noted that operation of shuttle motor 60 also moves MICR shuttle 90 along its respective track. In this respect, printer shuttle 70 and MICR shuttle 90 move in tandem across platen 310. A proximity sensor (not shown) adjacent one side of deposit processing module 12 is used to establish a "home position" for both printer shuttle 70 and MICR shuttle 90.

Figures 21A, 21B:
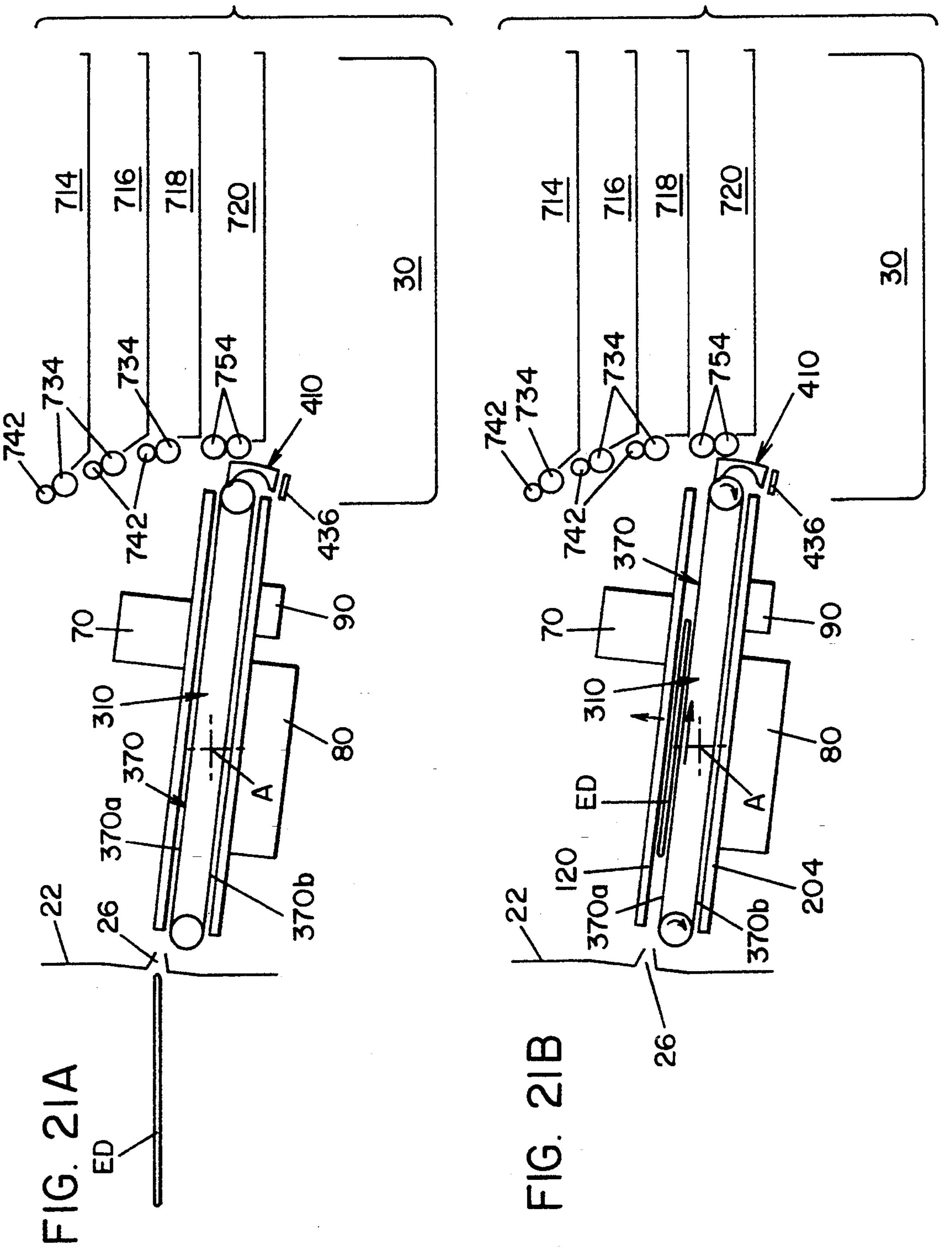
FIGS. 21A-21C are schematic views of the deposit processing device shown in FIG. 1 illustrating successive positions of the deposit processing module when an envelope deposit is processed.
Figure 21C:
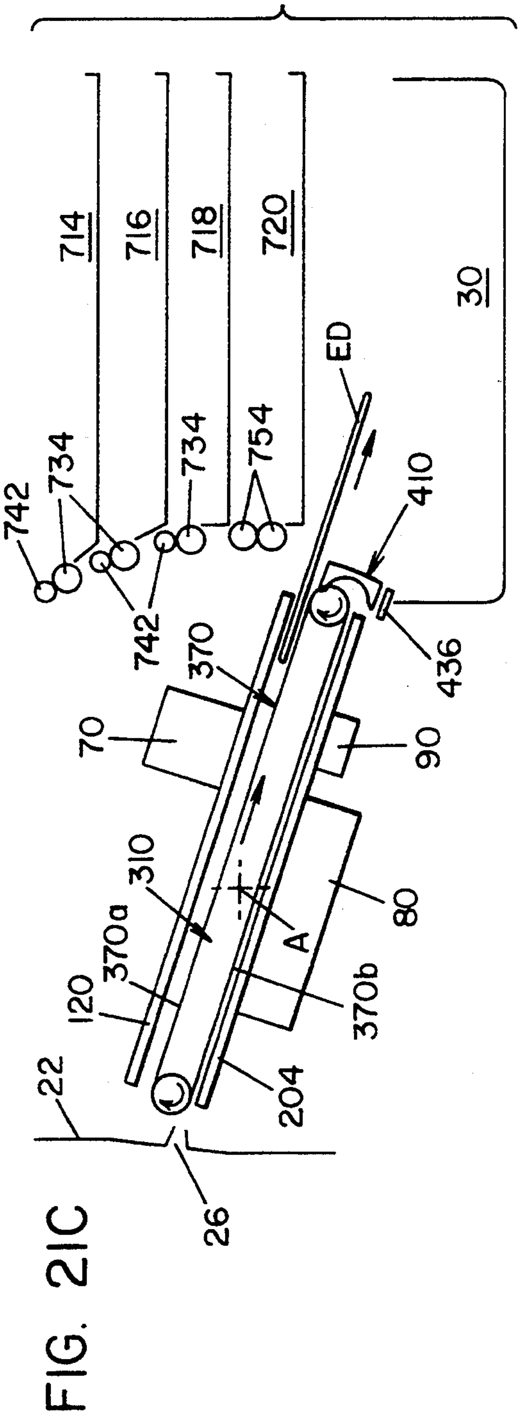

The central processing unit 600 activates pivot motor 50 to rotate deposit processing module 12 to the lowest position, i.e. the envelope deposit position as schematically illustrated in FIG. 21C. In this position, gate member 410 is in its neutral, lowermost position wherein the upper discharge slot 430 of gate 410 is aligned with the first transport. Transport motor 40 is then actuated to drive the envelope deposit ED into envelope storage bin 30 for later retrieval by a bank employee or otherwise authorized individuals who can verify the content of the envelope deposit against the information entered by the user by retrieving the transaction information from memory of central processing unit 600. Information is printed onto envelope deposit ED by passing envelope deposit ED beneath printer shuttle 70 (by means of transport belt 370) and simultaneously activating the print head within printer shuttle 70. The information printed onto envelope deposit ED would typically include a transaction number, the date and/or other coded information relating to the transaction and/or customer. As will be appreciated, the information printed on the envelope deposit ED is likewise maintained in memory or transferred to an external database for later retrieval.

Referring now to FIGS. 22A–22F, the processing of a single document deposit is illustrated. When a single document deposit such as a check or utility bill is inserted into the deposit receiving slot, it is drawn into the upper transport (the document processing module being in the facia aligned position) and conveyed toward the printer head. As the document deposit DD passes between light emitters *264a, 264b* and receivers *114a, 114b* at the receiving end of the transport, the deposit is identified as a single document by means of the optical sensors which, as indicated above, scan the deposit as to its thickness, i.e., its opacity. Once the deposit is identified as a single document deposit DD, the document deposit, when necessary, is "justified" or "aligned", i.e. moved toward the edge of platen 310 near sidewall 104 of housing 102.

According to the present invention, "justification" or "alignment" of the document deposit DD is accomplished by first identifying the amount and direction of misalignment of document deposit DD. This is accomplished utilizing light emitters 266*a,* 266*b* and 266*c* and receivers 116*a,* 116*b* and 116*c.* In this respect, if document deposit DD is misaligned, the leading edge of document deposit DD will be conveyed by transport belt 370 past each corresponding pair of light emitters 266*a,* 266*b* and 266*c* and receivers 116*a,* 116*b* and 116*c* at a different time. By sensing when the sequence and time when each light beam is broken, and knowing the speed the document deposit is being conveyed along the transport path by belt 370, central processing unit 600, by processing a trigonometric calculation can determine the amount and direction of misalignment of document deposit DD. Specifically, it can determine whether the leading edge of document deposit DD is away from side wall 104 (i.e. with the trailing edge being near side wall 104) or whether the trailing edge of document deposit DD is angled away from side wall 104. Once the position of the document is established, "justification" or "alignment" of the document is generally accomplished by repeatedly transporting the misaligned end of document deposit DD, i.e. the end of the document outermost or furthest from side wall 104 over conical rollers 344, shown in FIG. 10, between the upper and lower transport.

Figure 22A:
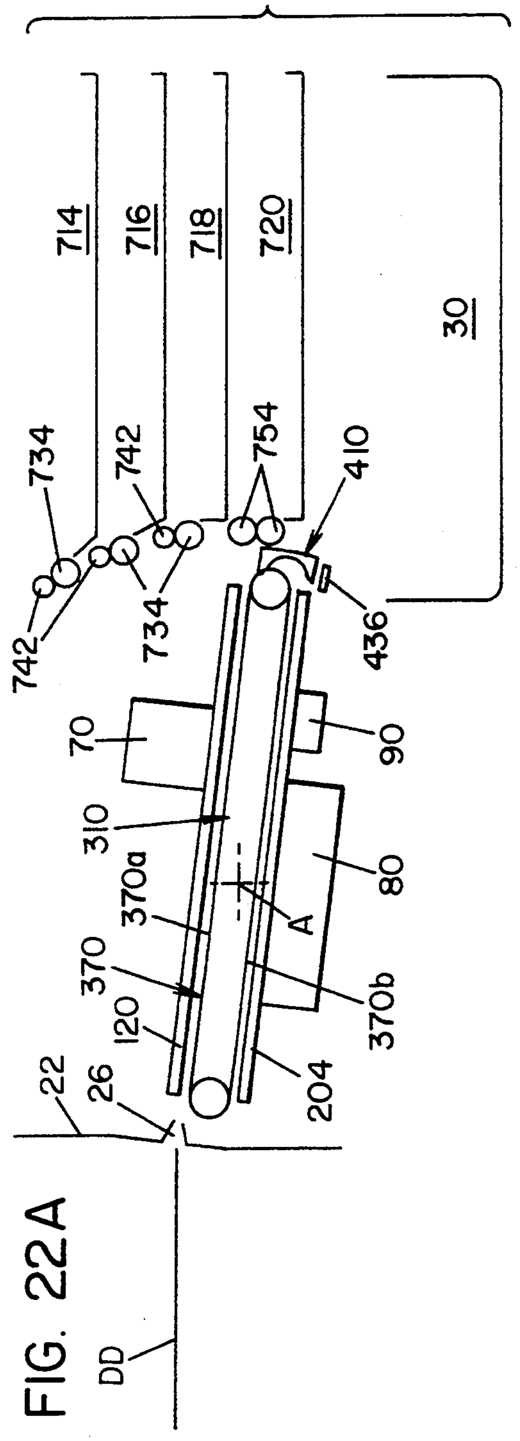
FIGS. 22A-22F are schematic views of the deposit processing device shown in FIG. 1 illustrating successive positions of the deposit processing module when a single document deposit process.
Figure 22B:
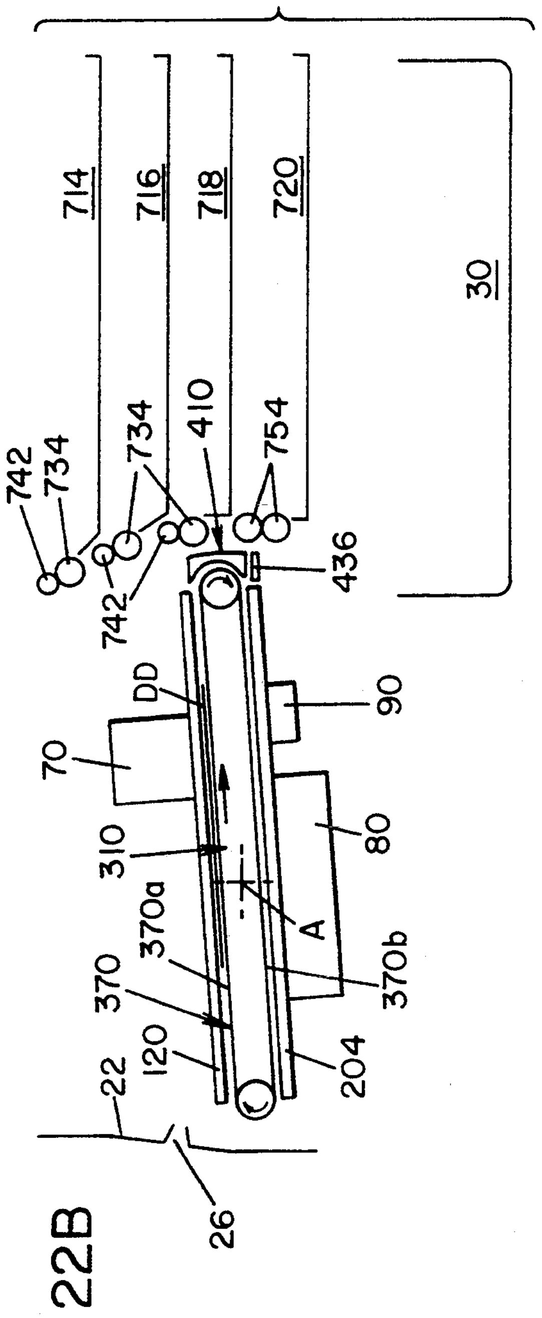
Figure 22C:
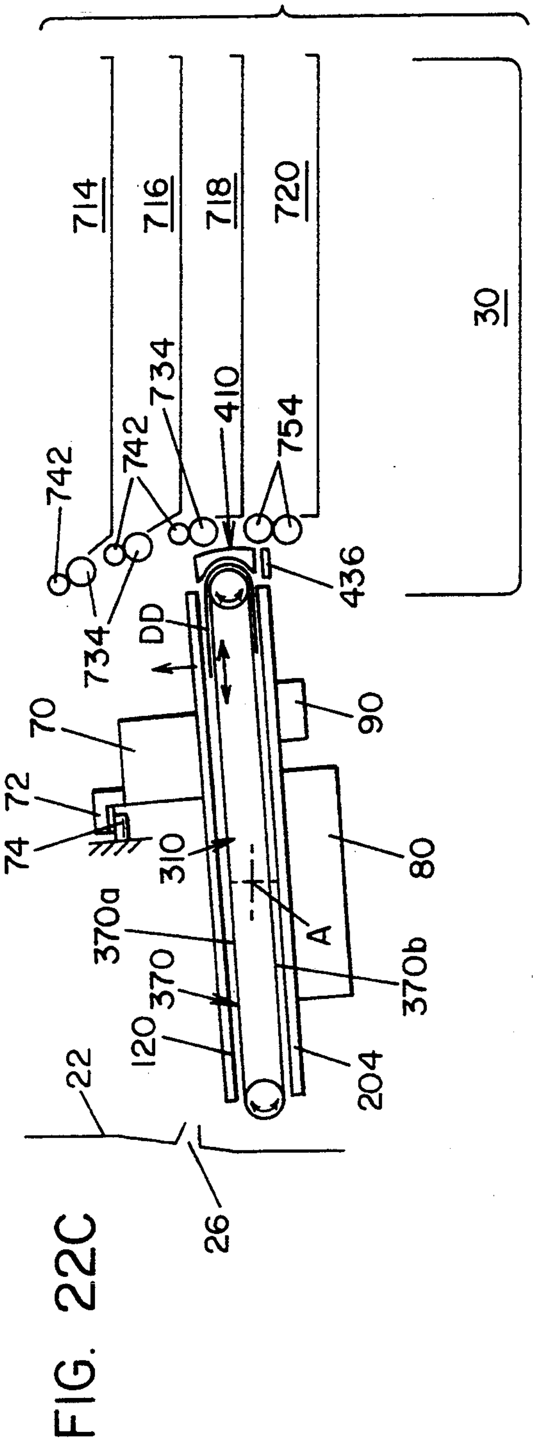
Figure 22D:
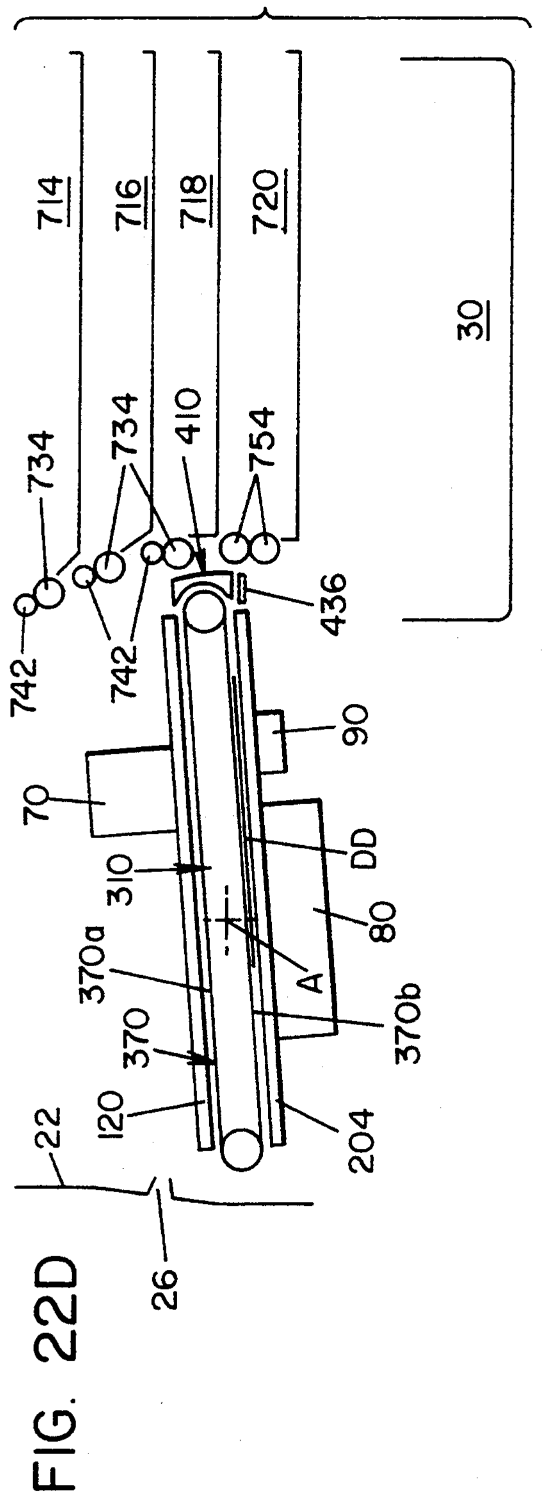

To this end., document processing module 12 is moved to its "aligning position", best seen in FIG. 17 and schematically illustrated in FIG. 22C. As shown in FIG. 17, when document processing module 12 is in its "aligning position", cam surface 772 of gate actuator 760 engages abutting surface 444 of gate 410 and forces gate 410 upward into a position wherein arcuate deflecting surface 432 of gate 410 is aligned with the upper surface of transport belt 370. In this respect, biasing spring 766 on actuator 760 has sufficient spring force to counteract the biasing effect of tempered rods 416 which bias gate 410 to a downward position. Shuttle motor 60 is actuated to move printer shuttle 70 (together with the MICR shuttle 90) to a position where cam surface 72 on shuttle housing 70 rides up onto pin 74 extending from support housing 102 to lift floating plate 120 away from the single document deposit.

Plate 120 is lifted away from belt 370 to reduce the friction drive exerted by belt 370 on document deposit DD. In this respect, in its normal position, i.e. plate 120 resting on transport belt 370, a "high frictional drive" condition exists between the deposits and transport belt 370 to drive deposits along the first transport. With plate 120 lifted away from transport belt 370, a "low frictional drive" condition exists between transport belt 370 and the deposit. A "low frictional drive" is required to enable conical rollers 344 to shift a document deposit DD toward side wall 104. In this respect, conical rollers are designed to exert a relatively small lateral force, in the order of 1 ounce, on document deposit DD. This relatively small lateral force is necessary to avoid forcing and crumbling the document deposit DD into side wall 104. Because the force of conical rollers 344 is so small, the frictional force exerted on document deposit DD by transport belt 370 must be removed to enable the document deposit DD to be moved by conical rollers 344.

If a document deposit DD is misaligned and the leading edge of the document deposit DD is disposed away from side wall 104, document deposit DD is conveyed by transport belt 370 to a position where the leading edge thereof is over conical roller 344.

Transport motor 40 is then repeatedly driven, first in a forward direction and then in a reverse direction, to repeatedly convey the leading edge of single document deposit DD over conical rollers 344. Arcuate surface 432 of gate 410 causes the leading edge to be guided around the end of platen 310 between the respective transports. As the leading edge of the single document deposit DD is reciprocally conveyed over conical rollers 344, the tapered surfaces of such rollers 344 causes the leading edge of the document deposit DD to shift towards one side of platen 310. The optical sensor comprised of light emitter 266*a* and light receiver 116*a* which are positioned along the edge of platen 310, as best seen in FIG. 14, indicate when the single document deposit DD is aligned along the edge of platen 310. The document deposit is considered "aligned" or "registered" along the edge of the platen when eighty percent (80%) of the deposit is determined to be along the edge of platen 310. The inner surface of side arm 414 of gate 410 acts as a step and prevents the edge of the document deposit from shifting past the edge of platen 310.

If a document deposit DD is misaligned and the trailing edge of document deposit DD is oriented away from side wall 104, the document deposit DD is conveyed from upper transport to the lower transport until such trailing edge is over conical roller 344. In this position, the leading edge of the document deposit DD would be captured between MICR shuttle 90 and transport belt 370, and a major portion of the document would be within gap 380 which is defined between transport belt 370 and plate 204. Importantly, gap 380 creates a "low friction drive" condition such that when the trailing edge of document deposit DD is repeatedly driven over conical rollers 344, the trailing edge is forced into alignment by conical rollers 344 in a manner as described above. In this respect, the leading edge of the document deposit DD, which is captured between MICR shuttle 90 and transport belt 370, experiences a "high frictional drive" condition which generally maintains the leading end of the document deposit in its original position as the trailing edge is conveyed into alignment by conical roller 344.

With respect to the aforementioned aligning process, the relative position of the document deposit during alignment is monitored by means of the optical sensors, i.e. emitters 266*a,* 266*b,* 266*c* and receivers 116*a,* 116*b,* 116*c,* provided along the discharge end of the transports together with the sensor 242 mounted to the MICR shuttle 90.

Once the document deposit is aligned along the edge of platen 310, it is then conveyed from the upper transport to the lower transport as illustrated in FIG. 22D, again utilizing arcuate surface 432 of gate 410 as a guide. As the document deposit DD is driven into the second transport, it passes over MICR shuttle 90 wherein the MICR head is energized to magnetize the document deposit wherein any code number thereon would be magnetized. In this respect, documents such as checks or utility bills typically include information set forth thereon in an ANSI standard bar code, wherein the bar code is printed with a magnetizable ink. Information typically found on commercial checks or utility bills would include: (1) institutional information regarding the institution issuing the check or bill, (2) an account number, and (3) a check number, bill number or statement number relating to the particular document.

Larger institutions may also include (4) the amount of the check or bill, as part of the bar code information. As the document deposit passes over the MICR head, it also passes over window 82 of scanner imager 80. As it does so, an image of the downward facing side of the document deposit is obtained and conveyed to central processing unit of the ATM via the scanner card for storage in memory, or is immediately transferred to external memory at the bank or financial institution. In this respect, transport belt 370 conveys the entire document deposit over image scanner 80. When the leading edge of the document deposit has reached the optical sensors at the receiving end of lower transport, transport drive motor 40 is reversed to convey the document deposit back over the MICR head so that the above-identified magnetized, coded information may be removed therefrom. Generally, the coded information is typically provided at specific locations on a certain type of document. Central processing unit 600 is programmed to position the MICR shuttle 90 initially to a location wherein the coded information would be expected on the document deposit. In the event that the coded information is not found where expected, central processing unit 600 causes transport belt 370 to continually reverse itself to pass the document over the MICR shuttle 90, while at the same time, causing shuttle motor 60 to relocate MICR shuttle 90 along its rails to a position wherein the coded information might be found. In other words, central processing unit 600 is programmed to reposition the MICR head to search the document for the coded information. When the appropriate information has been obtained from the document, such information may be immediately transferred to the external memory of the financial institution, stored in memory by the central processing unit of the ATM to be downloaded to an external central database at a later time, or utilized in an immediate transaction with a customer.

Once the appropriate information is obtained from the document deposit, the document deposit is transported by transport belt 370 back to the upper transport as illustrated in FIG. 22E, again using arcuate surface 432 of gate 410 as a guide. As the document deposit is returned to the upper transport, transaction information is printed thereon as it passes beneath print shuttle 70. With the information obtained from the document deposit DD, and utilizing either preset instructions stored in memory, or instructions provided from an external source such as a central computer in a financial institution or the like, central processing unit 600 would select one of the three compartments 714, 716, 718 of deposit storage module 12 into which document deposit DD is to be conveyed.

Figure 22E:
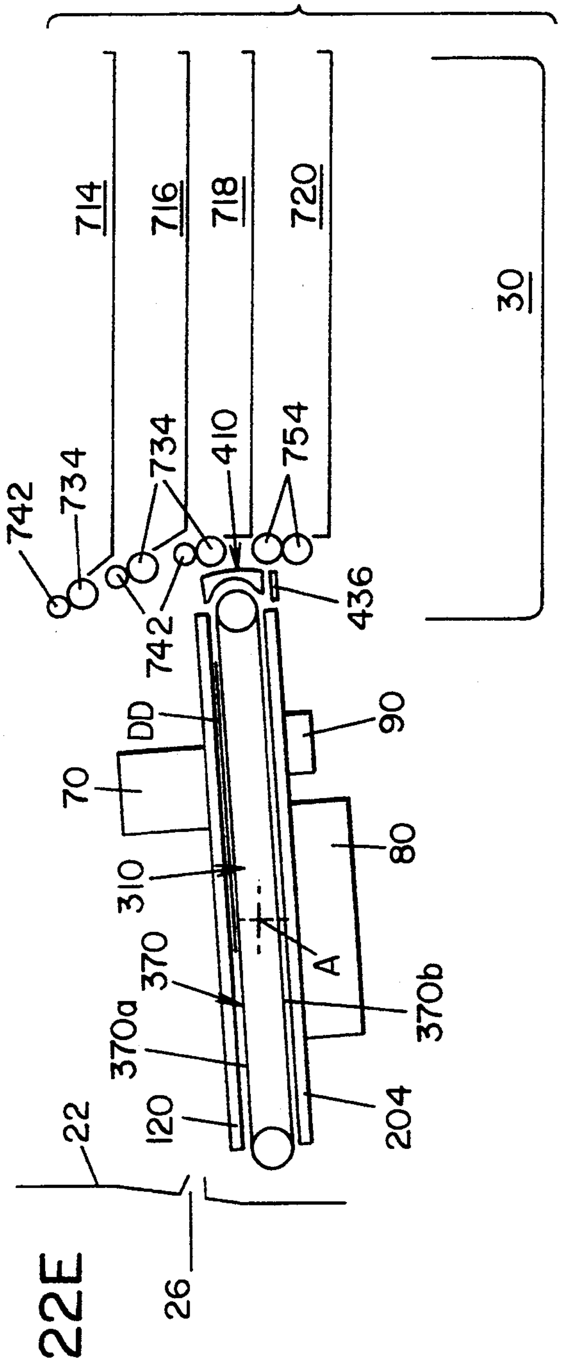
Figure 22F:
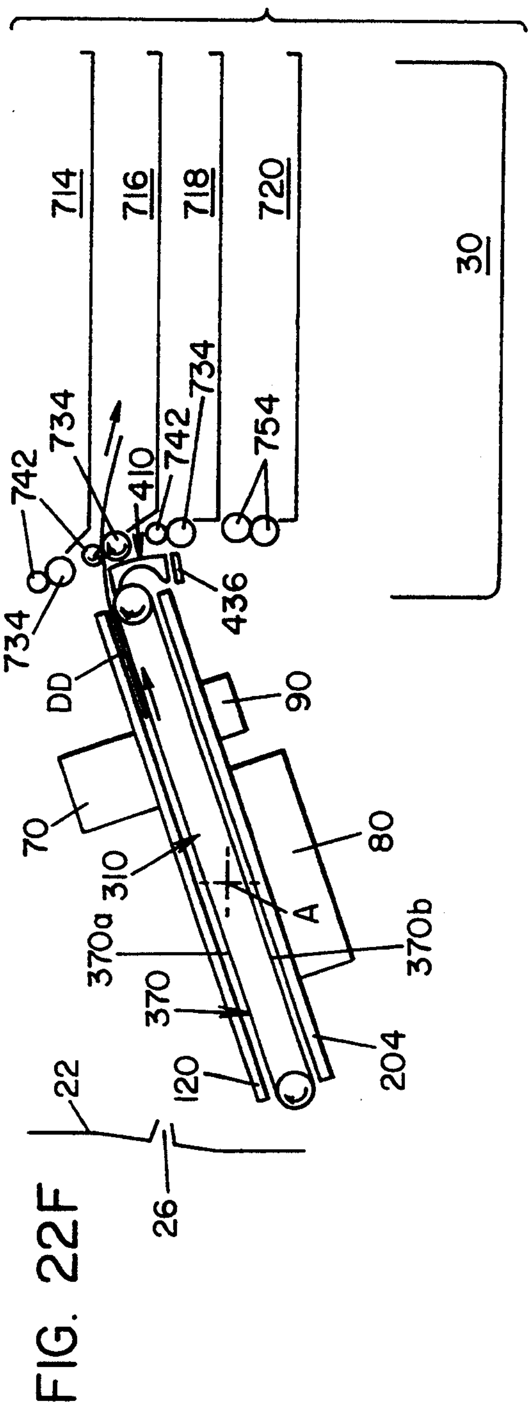

With the desired compartment identified by central processing unit 600, pivot motor 50 is actuated to cause document processing module 12 to be pivoted into alignment with the desired compartment. As document processing module 12 moves from its "deposit aligning position, as shown in FIGS. 17 and 22E, toward one of the three (3) compartments 714, 716, 718, as shown in FIG. 22F (wherein the upper transport is aligned with compartment 716) and FIG. 16 (wherein the upper transport is aligned with compartment 714), gate 410 moves past gate actuator 760. In this respect, the upper end of gate actuator 760 merely pivots about pin 764 out of the way of the lower portion of gate 410 as it moves thereby. Importantly, as gate 410 moves away from, and out of engagement with, gate actuator 760, gate 410 is permitted to return to its normal (down) position wherein the upper .discharge slot 430 of gate 410 is in alignment with the upper transport.

Referring now to FIG. 16, the relative positions of platen 310 and gate 410 of document processing module 12 when in alignment with compartment 714 of deposit storage module 14 are shown. In this position, the upper transport is in alignment with compartment 714 such that a document deposit conveyed from the upper transport would be directed between the drive rollers 734 and idle rollers 742. Importantly, intermediate gear 738 which meshes with gear 736 on drive shaft 732 operatively engages gear 354 on the end of shaft 336 on platen 310. Thus, as transport belt 370 is being driven by transport motor 40 and simultaneously rotates shaft 336 through platen 310 and gear 354 on end thereof which engages and drives gear 738. Gear 738 in turn drives rollers 734. The document deposit is thus caught between rotating drive rollers 734 and idle rollers 742, and conveyed into compartment 714. When the trailing end of the document deposit has passed the optical sensors at the discharge end of platen 310, transport motor 40 continues to operate for a predetermined period of time to ensure that the document is conveyed entirely into compartment 714. In this respect, a document deposit can be conveyed into any of the upper three (3) storage compartments in a similar manner. For example, FIG. 22F schematically illustrates a document deposit being driven into compartment 716. As shown in the drawing, transport belt 370 is driven to convey the document deposit toward the deposit storage module 14 wherein drive roller 734 at the entrance to the compartment with idle rollers 742 catch the leading edge of the document deposit and pull the document deposit into the compartment.

Figure 23A:
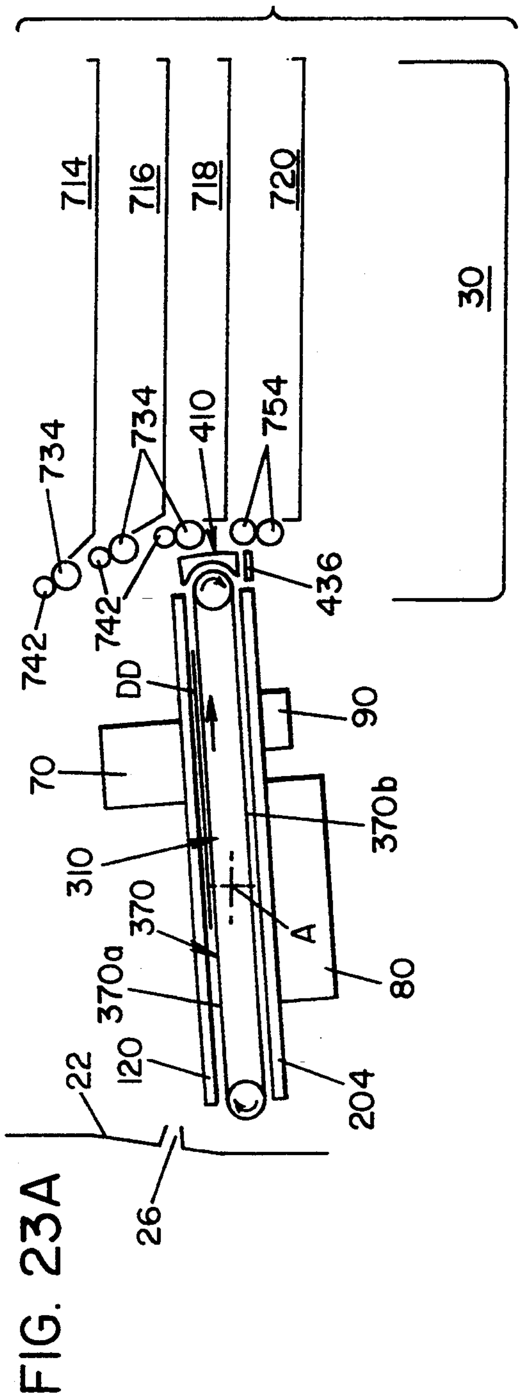
FIGS. 23A-23D are schematic views of the deposit processing device as shown in FIG. 1, showing the successive positions of the deposit processing module when duplexing (i.e., inverting) a single document deposit.
Figure 23B:
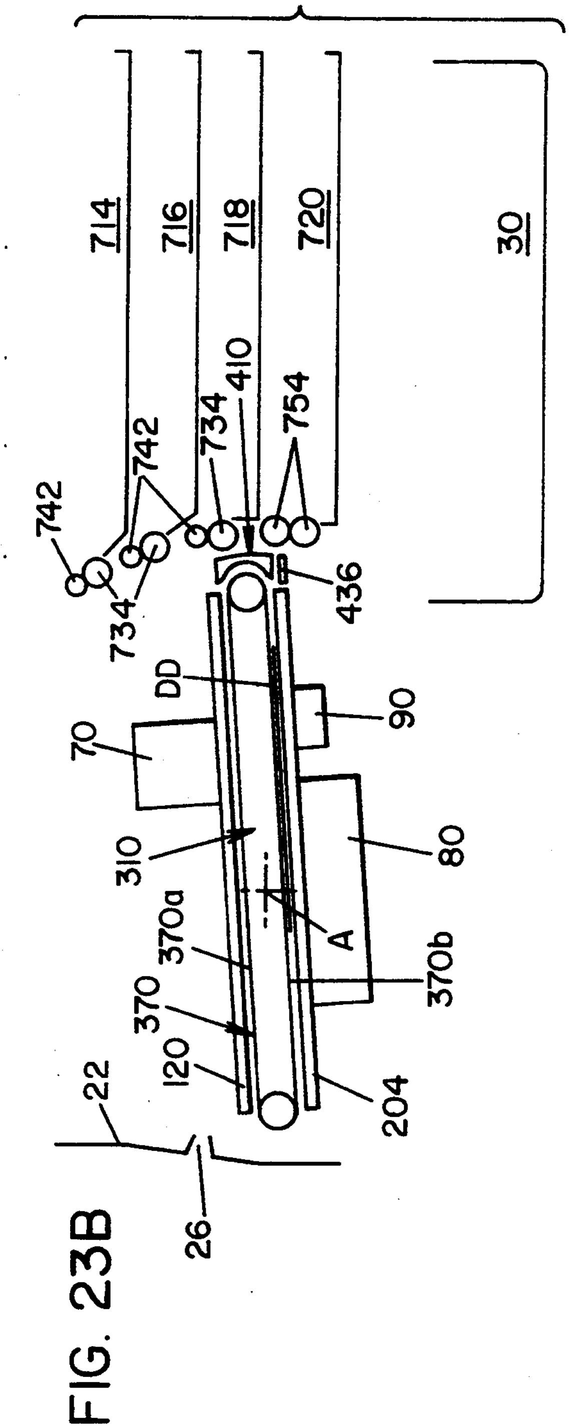

In accordance with another aspect of the present invention, apparatus 10 includes means for "duplexing" or inverting a document deposit therein. Such feature is particularly applicable when a document deposit has been placed into document processing module 12 in an improper orientation, or merely to reorient a document deposit so as to enable both sides of the document deposit to be scanned or imaged by the MICR shuttle 90 or by the image scanner 80. In this respect, FIGS. 23A–23D illustrate a procedure for "duplexing" a document within document processing module 12. In this respect, originally a document deposit would typically be processed discussed above. In this respect, the document deposit would first be "aligned" in a manner as previously described. It would then be conveyed from the upper transport (as shown in FIG. 23A) to the lower transport (as shown in FIG. 23B) to locate and obtain information from a bar code or magnetic code on the document deposit. In the event that the document has been inserted improperly into the document processing module, i.e. upside down, the MICR head would be unable to locate or read the bar code (which would be facing platen 310). If the MICR head is unable to locate or read a bar code, central processing unit 600 would initiate the "duplex" procedure.

Figure 23C:
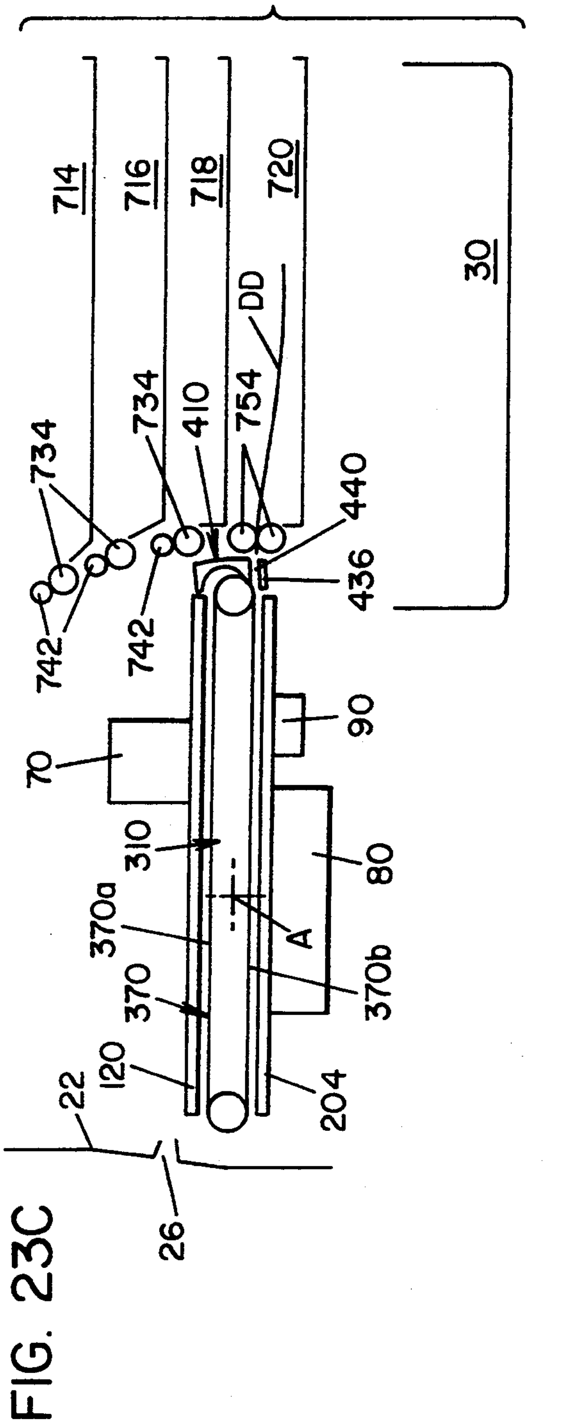

To duplex the document deposit, central processing unit 600 would initiate pivot drive motor 50 to move document processing module 12 from its aligning position as shown in FIG. 17 to its "duplex position" as shown in FIG. 18. In this position, surface 772 of gate actuator 760 has caused gate 410 to move to its uppermost position. In this respect, spring 766 which is attached to gate actuator 760 has a spring force greater than the biasing force exerted by spring rods 416 on gate member 410, and therefore moves gate 410 upward wherein lower discharge slot 440 (i.e. the slot defined by lower surface 434 of gate 410 and lower plate member 436) of gate member 410 is in alignment with compartment 720. In this position, gear 354 at the end of shaft 336 operatively engages intermediate gear 758 associated with upper drive shaft 752. Transport motor 40 is then initiated to cause transport belt 370 to convey the document deposit toward drive rollers 754 at the entrance of compartment 720, as illustrated in FIG. 18. Importantly, the position of the trailing edge of the document deposit is monitored as it is being conveyed from the lower transport into lower compartment 720. In this respect, transport motor 40 is shut off once the document deposit has exited lower discharge slot 440 of gate 410. Importantly, the end of the document deposit is maintained between drive rollers 754 at the entrance to compartment 720 as illustrated in FIG. 23C.

Figure 23D:
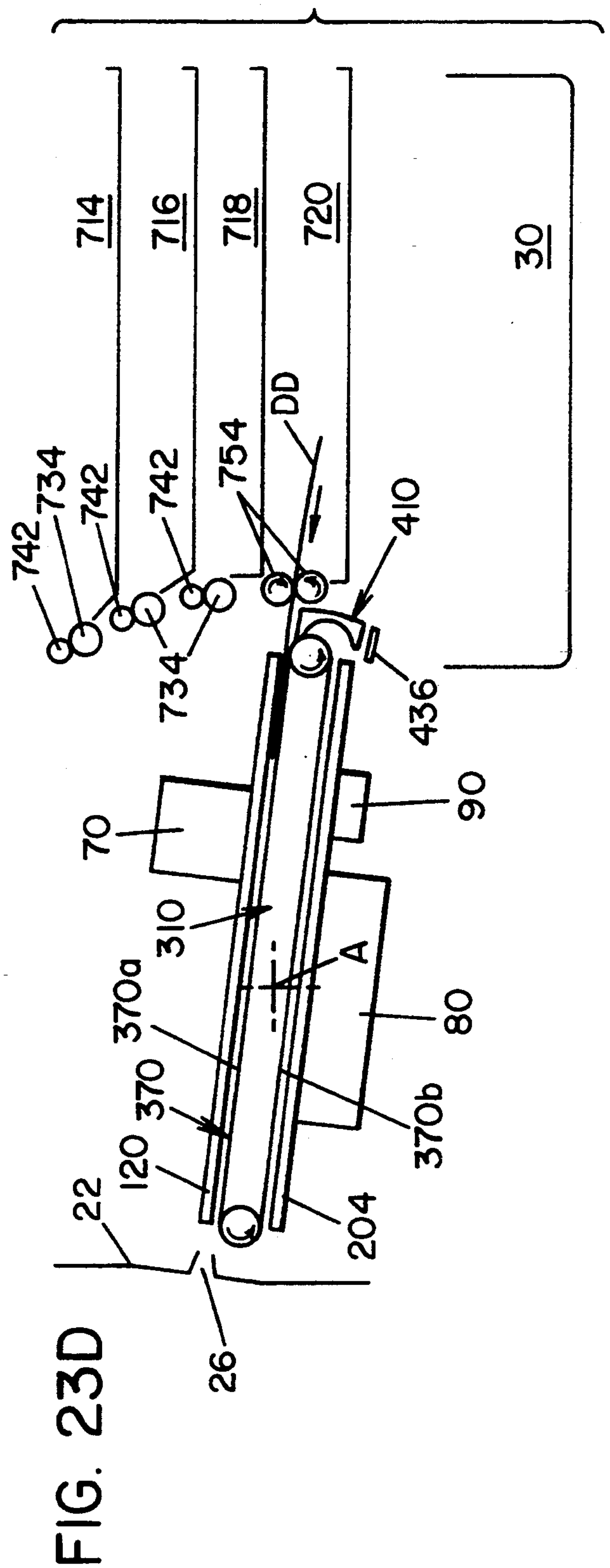

Once the document deposit has cleared the lower transport, central processing unit 600 causes pivot motor 50 to move document processing module 12 from its "duplex position" to the "facia-aligned position", as illustrated in FIG. 9, wherein the upper transport is essentially aligned with lower compartment 720. In this respect, document processing module 12 is moved from its "duplex position" to the "facia-aligned position", gate actuator 760 is forced backward by abutting surface 444 of gate member 410. In this respect, spring 766 which biases gate actuator 760 does not have sufficient strength to resist the overall movement of document processing module 12. Accordingly, as described above, gate actuator 760 moves downward and shifts to the rear to enable gate 410 to move thereby when document processing module 12 moves to a lower position, i.e. the "facia-aligned position" or the "envelope deposit position". In the "facia-aligned position", document processing module 12 is oriented such that drive gear 354 on shaft 336 through platen 310 is in operative engagement with intermediate gear 758 connected to the lower set of drive rollers 754. In this position, transport motor 40 is actuated to cause the document deposit to be conveyed from lower compartment 720 into the upper transport, as schematically illustrated in FIG. 23D.

With the document deposit conveyed back into the upper transport, the optical sensors on the discharge end of document processing module 12 indicate when the trailing end of the document deposit has entered the upper transport. Central processing unit 600 then instructs the document processing module 12 to return to the "aligning position" wherein the document deposit may be transported from the upper transport to the lower transport in a manner as previously discussed. As will be appreciated, as the document deposit is conveyed from the upper transport to the lower transport, the side of the document which was originally facing away from image/scanner 80 and MICR shuttle 90 is now facing image/scanner 80 and MICR shuttle 90. In this position, it may be magnetically charged and read, or imaged in a manner as previously discussed. With the appropriate information obtained and after transaction information is printed thereon, the document deposit is then conveyed to one of the storage compartments 714, 716, 718, as discussed above. The invention as heretofore described, thus provides a single document processing apparatus capable of receiving envelope deposits, as well as document deposits such as checks, utility bills, or other valued notes. More importantly, an apparatus according to the present invention can scan, image and print onto one or both sides of a document deposit and accomplishes such scanning, imaging and printing, utilizing only one magnetic read head, one image/scanner and one print head. In this respect, the ability to duplex a document deposit reduces the necessity of duplicate components.

Moreover, the use of a bi-directional transport as well as a movable MICR head and print head enables the present invention to read account code information off documents inserted to the document processing module in any orientation. In addition, the movable shuttles, particularly the MICR shuttle 90, enable variable print locations on deposited documents to be located and scanned.

With respect to the alignment mechanism, the use of conical shaped rollers and a bi-directional transport enables justification and straightening of documents against the registration edge for searching the location of coded information on deposits. Still further, by justifying the document around a curved path (i.e. between the upper transport and the lower transport) document rigidity is ensured to provide better transport and alignment of all types of sheet material.

Figure 26:
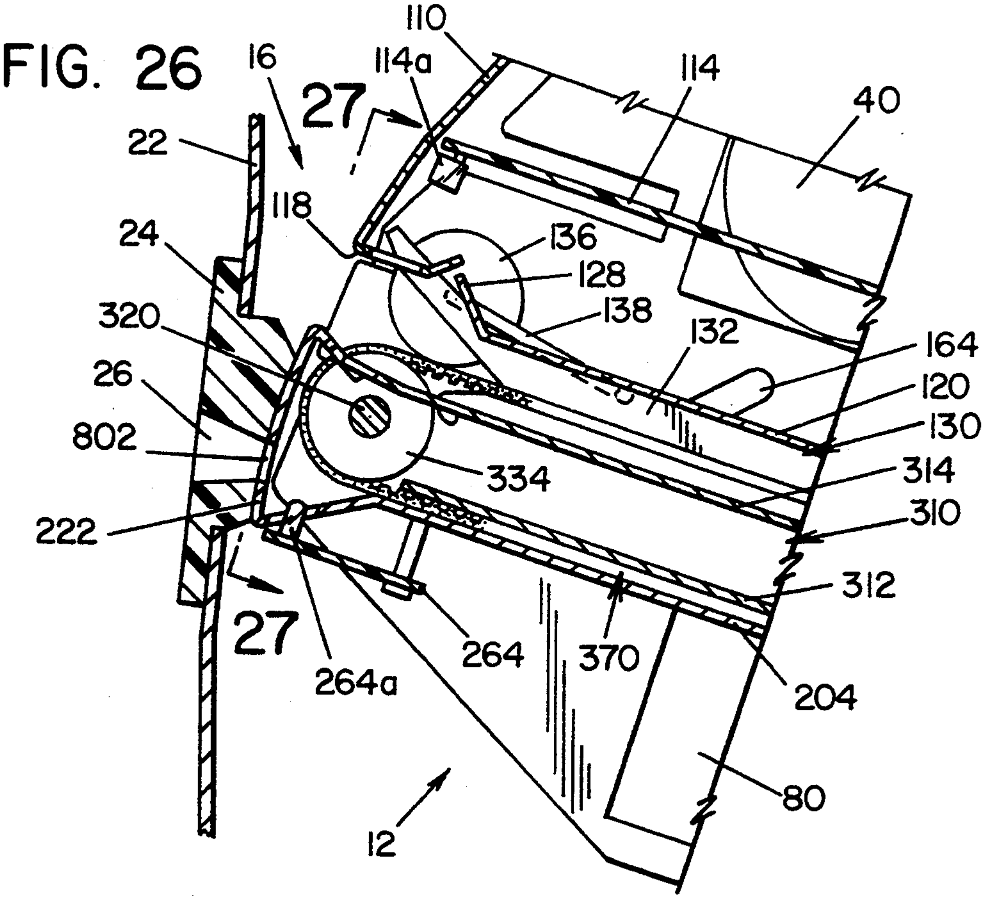
FIG. 26 is a side elevational, sectional view of the receiving end of a document processing module according to the present invention, illustrating a modification to the document processing module to enable it to receive and process rigid or semi-rigid cards.
Figure 27:
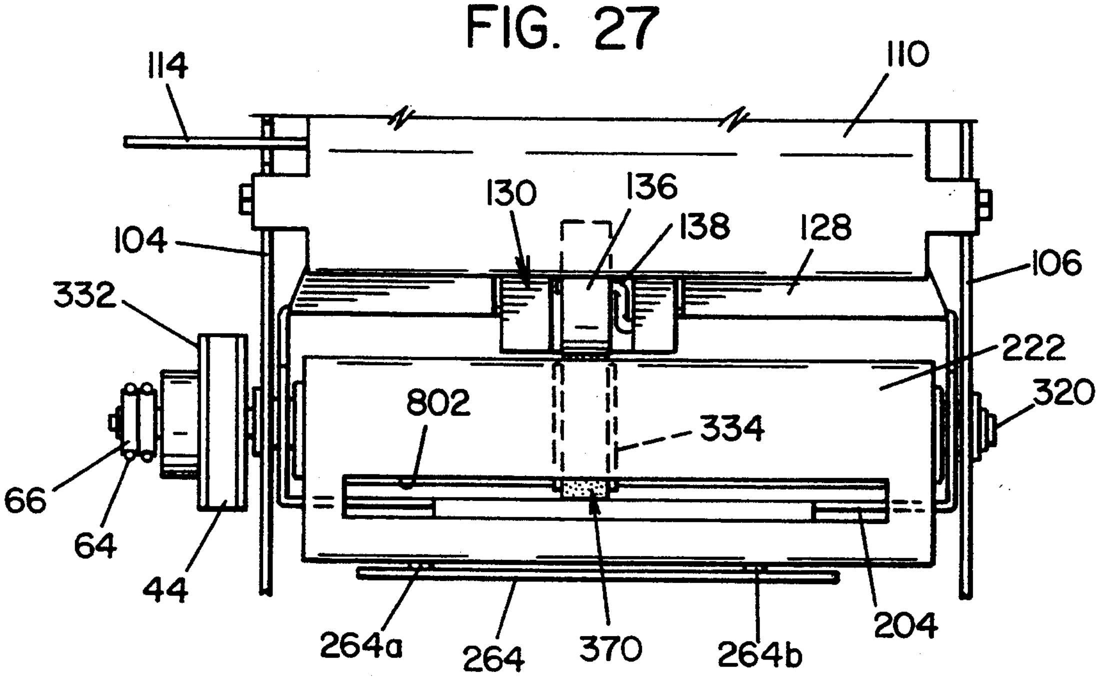
FIG. 27 is a view taken along lines 27—27 of FIG. 26.

More importantly, the present invention accomplishes the foregoing by a relatively simple, compact mechanism. In this respect, a single common belt drive conveys documents through both the upper and lower transport. In addition, the pivotable document processing module enables storage of like documents in specific compartments and bins and simplifies transporting of documents by means of a gate which is movable by means of rotation of the document processing module. In addition to processing sheet document deposits DD and envelope deposits ED, a document processing module 12 according to the present invention is also capable of processing rigid or semi-rigid cards such as a laminated driver's license or a plastic identification card. In this respect, the receiving end of document processing module 12 may be modified to include a rectangular slot 802, as seen in FIGS. 26 and 27. Slot 802 is formed in barrier portion 222 of plate 204 and is positioned to be in registry with the second transport, which is defined by plate 204 and the lower surface of platen 310.

Figure 28A:
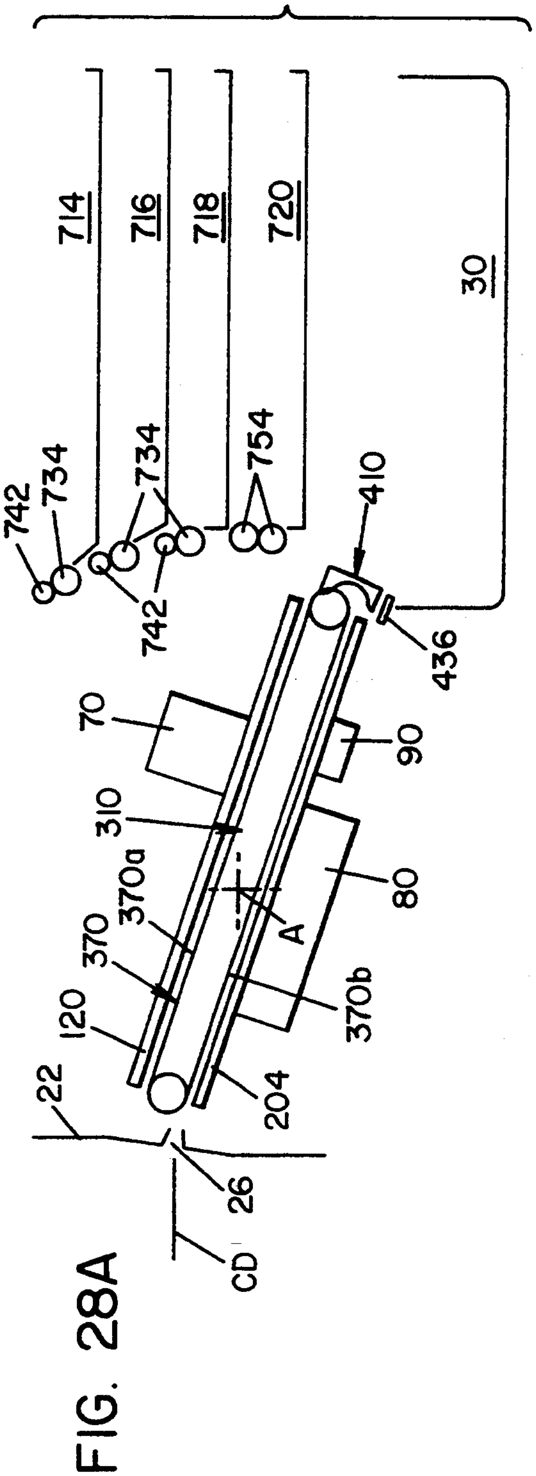
FIGS. 28A and 28B are schematic views of the deposit processing module as shown in FIGS. 26 and 27, showing several positions of the deposit processing module when receiving a rigid or semi-rigid card.
Figure 28B:
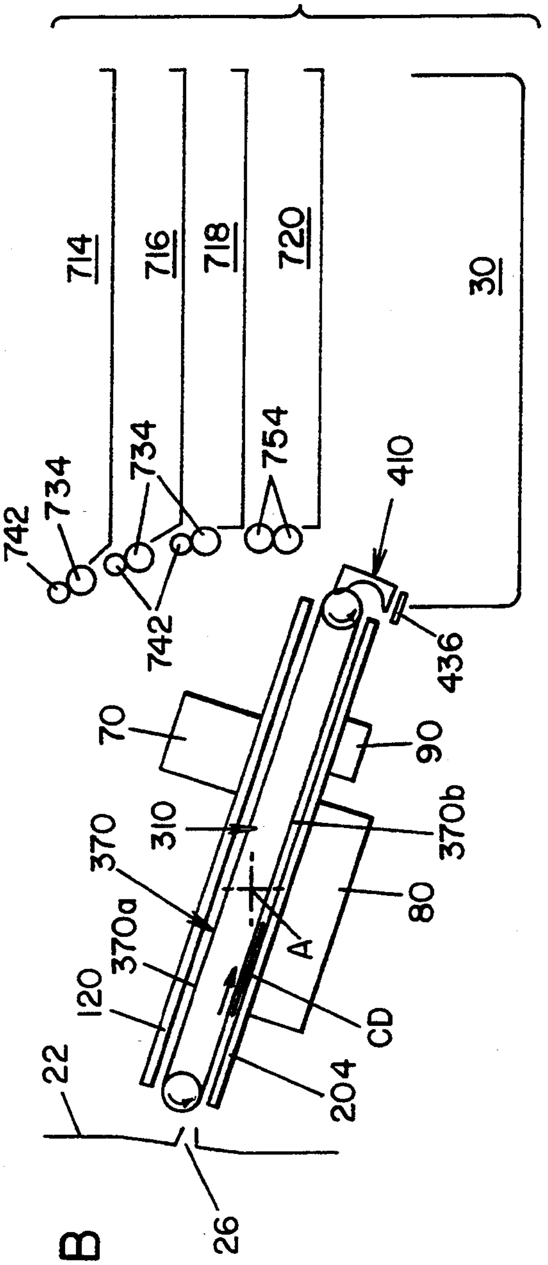

Referring now to FIGS. 28A and 28B, document processing module 12 is shown in its "envelope deposit position." In this position, slot 802 is in registry with deposit entry slot 26 in housing facia 22. A rigid or semi-rigid card, which is designated CD in the drawings, may be inserted into the second transport through slots 26 and 802. Card CD is captured between transport belt 370 and plate 204, and may be conveyed by transport belt 370 over scanner/imager 80, where an image of the card CD may be obtained. In this respect, document processing module 12 may be used to copy and store identification information or authorization information from a rigid or semi-rigid card CD. Upon completion of the imaging, card CD would be returned to the user by reversing drive belt 370. As will be appreciated, card CD could include magnetic information in coded form which could be read by the MICR head. Still further, according to the present invention, card CD may be transferred from the second transport to the upper transport to print thereon, in a manner similar to that described above to transfer sheet document during the duplexing procedure.

In this respect, document processing module 12 would be moved to its "duplex position", as shown in FIG. 18. Transport motor 40 is then initiated to cause transport belt 370 to convey card CD between drive roller 754 at the entrance of compartment 720, the trailing edge of card CD being held between drive roller 754. Document processing module 12 is then moved to its "facia aligned position", as illustrated in FIG. 9, and card CD is conveyed into the first transport, where information may be printed onto the upward facing side of card CD. To return card CD to the customer, the sequence is reversed and card CD is conveyed from the first transport into bin 720 where its trailing edge is held by rollers 754, and then from roller 754 into the second transport from where it may be returned to the customer. This present invention thus provides a document processing device which can receive and return an identification card or authorization card from a customer, and is capable of scanning such card for magnetic information, obtaining an image of such card and printing information onto such card.

Figure 29A:
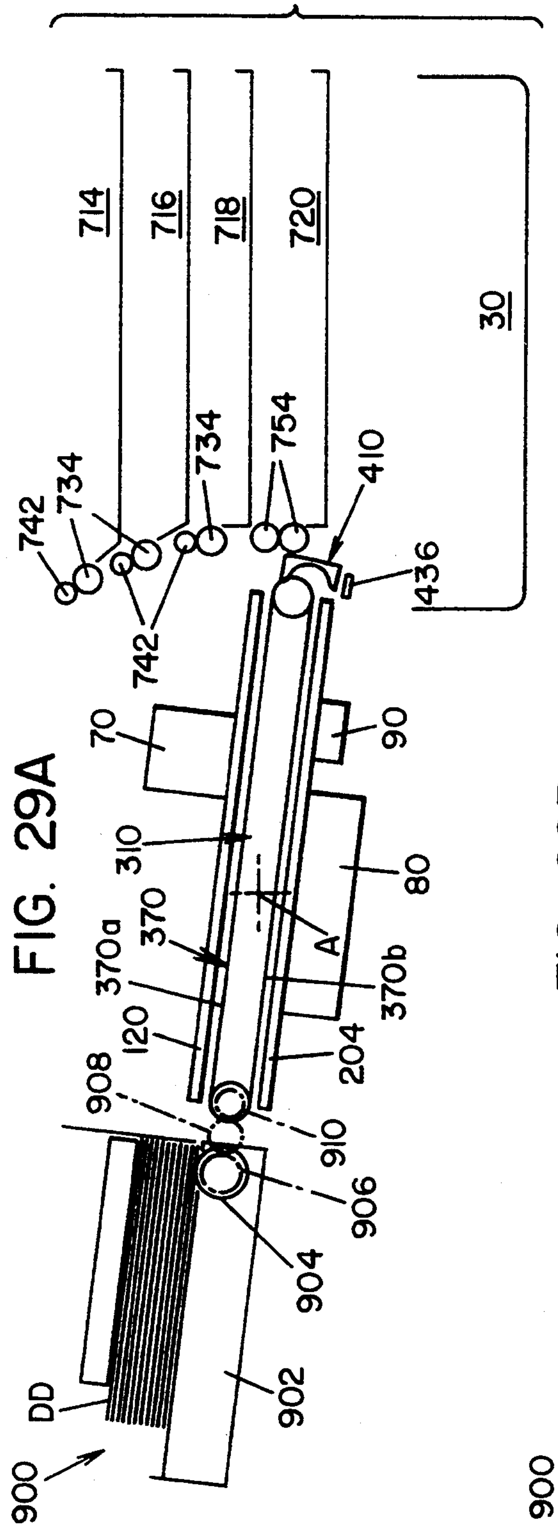
FIGS. 29A and 29B are schematic views of a deposit processing module according to the present invention, together with an automatic document feeder for use therewith.
Figure 29B:
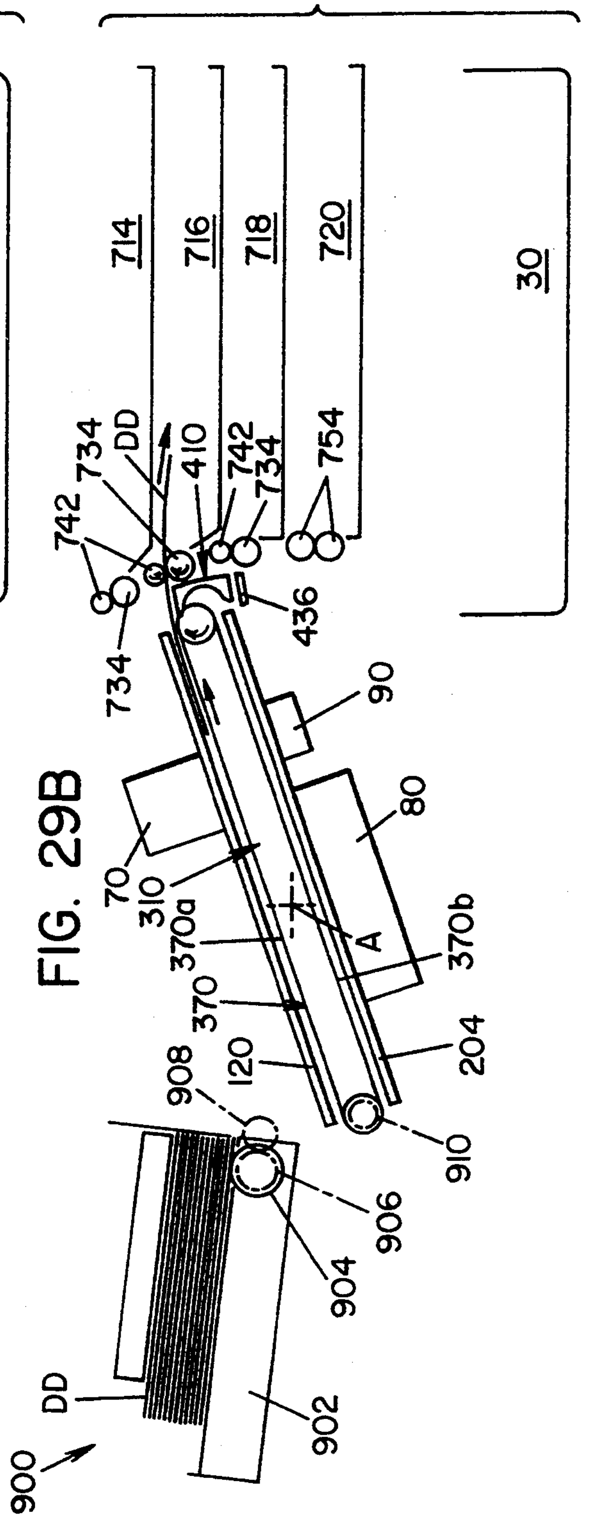

Referring now to FIGS. 29A and 29B, a document feeding mechanism for picking a document from a stack and conveying the individual document to document processing module 12 is schematically shown. In this respect, in some applications it may be desirable to utilize a document processing device according to the present invention to automatically process a stack of like documents. For example, a bank may wish to identify, image and sort checks drawn on accounts maintained at the bank. To this end, an automatic document feeder 900 is shown. Document feeder 900 includes a tray 902 for receiving a stack of documents DD to be processed. A picker roller 904 is provided at the bottom of tray 902 to remove single documents from the bottom of the stack. Roller 904 includes a gear 906, which meshes with an intermediate gear 908. Intermediate gear 908 is positioned to mesh with a gear 910 provided on shaft 320 of document processing module 12.

When document module 12 is in its "facia-aligned position", gear 910 meshes with intermediate gear 908 as shown in FIG. 29A. As transport belt 370 is driven, gear 910 drives intermediate gear 908 which in turn drives gear 906 on picker roller 904. Picker roller 904 conveys a single document into first transport. Once the document is within document processing module 12, document processing module 12 is pivoted to another position such that gear 910 disengages intermediate gear 908. The document may then be processed in any preset manner and conveyed to a storage location as shown in FIG. 29B.

A deposit processing device as described above finds advantageous application with a conventional automated teller machine (ATM) for processing checks and/or utility bills. A conventional ATM would typically include a display monitor having a screen for displaying information to a customer, a card reader for reading information from an identification card, and a keypad for use by a customer for inputting information. A customer with an ATM card would access the ATM by inserting the card into the card reader and then utilizing the keypad to insert a personal identification code. Magnetic information on the ATM card would typically include the customer's name and an account number. Through a menu driven user interface, the customer may use the keypad (or touch designated areas on the screen) to input instructions to the ATM's central processor.

According to the present invention, if a check is to be cashed by a customer, the scanner/imager of the deposit processing module would scan the face of the check in a manner as described above. The scanning process creates digital image data which would be conveyed to the ATM's central processor. According to a predetermined program, one or more select fields of information from the digital image data can be displayed on the monitor screen of the ATM. Specifically, in a check cashing procedure, the field showing the amount of the check is preferably displayed for the convenience of the customer. All or part of the check may then be cashed by the customer, with any remaining balance being credited to the customer's account.

As indicated above, some institutional checks would include the amount of the check within the bar coded information thereon. In such situations, the central processor may compare the amount requested for withdrawal by the customer with the amount of the check and proceed with the currency dispensing if the amount requested by the customer is within the value of the check. In situations where the amount of the check is not within the bar coded information, a computer program may be provided wherein the digital image data information provided to the ATM is analyzed to determine the amount of the check. In this respect, the characters set forth in the "check amount" field would be analyzed to determine the amount of the check. Once the amount of the check is determined, the ATM's central processor again compares the amount requested by the customer with the amount of the check to determine whether sufficient funds exist therein to proceed with the check cashing procedure.

A less complex program may be provided wherein the digital image data is analyzed to determine the number of characters preceding a delimiter character, i.e. the decimal point, in the identified "check amount" field. For example, the processor may determine that two numbers exist before the decimal point in the check amount field. With this information, the computer can recognize that the maximum amount of the check could be $99.99 and the minimum amount of the check would be $10.00. With this range of value, the central processor would analyze the amount requested by the customer. If the amount requested falls within the acceptable range, and if sufficient funds exist within the customer's account to overcome any possible shortfall in the amount of the check, the ATM may authorize cashing of the check for the amount requested by the customer. Thus, the ATM processor could be programmed to analyze general information and compare such information to a customer's account and base an authorization or denial of check cashing based upon programmed criteria.

In addition to the foregoing advantages, the present invention, through its specific design, lends itself to easy maintenance by being pivotally hinged at one end wherein the operative components of the document processing module are accessible. In this respect, FIG. 24 shows how the upper and lower module sections 100, 200 may be separated from each other and from the transport and gate assembly 300.

The present invention thus provides a document processing module which is compact and extremely versatile. As indicated above, the present apparatus is capable of receiving envelope deposits, rigid or semi-rigid cards, and more importantly, may receive document deposits such as checks, utility bills, or other valued notes. Importantly, with respect to single document deposits, the versatility of the present apparatus facilitates receipt of a wide range of varied types of document deposits and the ability of the document processing module to duplex the document facilitates financial transactions heretofore unavailable with existing devices.

The present invention has been described with reference to a preferred embodiment. Other modifications and alterations will occur to those skilled in the art upon a reading and understanding of the present specification. It is intended that all such modifications and alterations be included insofar as they come within the scope of the appended claims or equivalents thereof.

Having thus described the invention, the following is claimed:

1. A deposit processing device for receiving deposits including envelope deposits and single document deposits comprising:
a deposit processing module having a deposit receiving end and a deposit discharge end, said deposit processing module including:
a first transport path extending from said deposit receiving end to said deposit discharge end dimensioned to receive envelope deposits or single document deposits,
printer means disposed along said first transport path for printing information onto said envelope deposit or said single document deposit,
a second transport path adjacent said first transport path dimensioned to receive single document deposits,
magnetic scanning means disposed along said second transport path for scanning a single document deposit for coded information thereon,
imager means disposed along said second transport path for obtaining an image of a single document deposit thereon,
conveyor means for conveying envelope deposits and single document deposits along said first transport path and for conveying single document deposits along said second transport path,
gate means for operatively connecting said first transport path with said second transport path to permit single document deposits to be conveyed therebetween,
a deposit storage module adjacent said deposit discharge end of said deposit processing module having a plurality of storage locations,
means for moving said deposit processing module relative to said deposit storage module to position said discharge end of said document processing module adjacent one of said storage locations, and
means for duplexing single document deposits to permit scanning and imaging of both sides of a single document deposit.

2. A deposit processing device as defined in claim 1 wherein said deposit processing module is pivotally movable about a fixed axis among a plurality of positions relative to said deposit storage module.

3. A deposit processing device as defined in claim 1 wherein said first and second transport paths are flat, linear paths and are generally parallel to each other.

4. A deposit processing device as defined in claim 1 wherein said gate means includes a movable gate member positioned at said discharge end of said first transport, said gate member including an arcuate surface for directing single document deposits between first transport path and said second transport path.

5. A deposit processing device as defined in claim 4 wherein said gate member has:
a first position for conveying deposits between said deposit processing module and said deposit storage module,
a second position for conveying a single document deposit between said first transport path and said second transport path, and
a third position to facilitate duplexing a single document deposit.

6. A deposit processing device as defined in claim 5 wherein said deposit storage module includes an actuator positioned to engage said gate member and move said gate member as said deposit processing module moves relative to said deposit storage module.

7. A deposit processing device as defined in claim 1 wherein said printer means and said magnetic scanner means are movable relative to said first and second transport paths.

8. A deposit processing device as defined in claim 1 further comprising sensing means for sensing the position of deposits along said first and second transport paths.

9. A deposit processing module as defined in claim 1 wherein said deposit processing module includes:
an elongated platen having opposite facing elongated planar surfaces,
an endless belt encircling said platen having a first belt run extending along one of said opposite facing elongated surfaces and a second belt run extending along the other of said opposite facing surface,
reversible drive means for moving said belt around said platen,
first plate means adjacent said one of said opposite facing elongated surfaces in operative engagement with said first belt run to define said first transport path and being operable to move said envelope deposits and single document deposits along said platen, and
second plate means adjacent said other of said opposite facing elongated planar surfaces in operative engagement with said second belt run to define said second transport path and being operable to move single document deposits along said platen.

10. A deposit processing module as defined in claim 9 wherein said first plate means is yieldably mounted relative to said platen.

11. A deposit processing device as defined in claim 1 wherein the printer means are disposed along said first transport path for printing information onto said envelope deposit or said document deposit.

12. A deposit processing module comprising:
a first transport having a first end for receiving envelope deposits and single document deposits and a second end from which said deposits are discharged,
printing means disposed along said first transport for printing deposit information on said deposits,
a second transport having an end positioned adjacent said second end of said first transport for receiving and returning single document deposits to and from said first transport,
at least one reversible drive belt having a portion thereof in communication with said first transport for conveying envelope deposits and single document deposits therealong and having a portion thereof in communication with said second transport for conveying single document deposits therealong, a magnetic charge/read head disposed along said second transport for charging and reading magnetic information on said single document deposits, an imager disposed along said second transport for imaging one side of said single document deposits, and a gate mechanism associated with said second end of said first transport, said gate mechanism having a contoured guide surface which is movable between a first position wherein envelope deposits and single document deposits may be discharged from said processing module from said second end of said first transport and a second position wherein single document deposits may be transported back and forth between said first transport and said second transport by said reversible drive belt.

13. A deposit processing module as defined in claim 12 wherein each of said transports defines a generally flat path, and the paths of said first and second transports are generally parallel to each other.

14. A deposit processing module as defined in claim 12 wherein said module is pivotally movable about a fixed axis between a plurality of angular positions.

15. A deposit processing module comprising:

a first transport having a first end for receiving envelope deposits and single document deposits and a second end from which said deposits are discharged, printing means disposed along said first transport for printing deposit information on said deposits, a second transport having an end positioned adjacent said second end of said first transport for receiving and returning single document deposits to and from said first transport, a magnetic charge/read head disposed along said second transport for charging and reading magnetic information on said single document deposits, an imager disposed along said second transport for imaging one side of said single document deposits, a gate mechanism associated with said second end of said first transport, said gate mechanism being movable between a first position wherein envelope deposits and single document deposits may be discharged from said processing module from said second end of said first transport and a Second position wherein single document deposits may be transported between said first transport and said second transport, and a plurality of deposit storage locations disposed adjacent said second end of said first transport, said deposit processing module is pivotally movable about a fixed axis between said plurality of deposit storage locations.

16. A deposit processing module as defined in claim 15 further comprising aligning means for moving one edge of said single document deposit into registry with a registration edge.

17. A deposit processing module as defined in claim 16 wherein said aligning means is comprised of conical discs which urge said single document deposits in a direction transverse to the path of said transports.

18. A deposit processing module as defined in claim 15 further comprising means for duplexing a single document deposit.

19. A deposit processing module comprising:

a first transport having a first end for receiving envelope deposits and single document deposits and a second end from which said deposits are discharged, printing means disposed along said first transport for printing deposit information on said deposits, a second transport having an end positioned adjacent said second end of said first transport for receiving and returning single document deposits to and from said first transport, a magnetic charge/read head disposed along said second transport for charging and reading magnetic information on said single document deposits, an imager disposed along said second transport for imaging one side of said single document deposits, a gate mechanism associated with said second end of said first transport, said gate mechanism being movable between a first position wherein envelope deposits and single document deposits may be discharged from said processing module from said second end of said first transport and a second position wherein single document deposits may be transported between said first transport and said second transport an elongated platen having opposite facing elongated planar surfaces, an endless belt encircling said platen having a first belt run extending along one of said opposite facing elongated surfaces and a second belt run extending along the other of said opposite facing surface, reversible drive means for moving said belt around said platen, first plate means adjacent said one of said opposite facing elongated surfaces in operative engagement with said first belt run to define said first transport and being operable to move said envelope deposits and single document deposits along said platen, and second plate means adjacent said other of said opposite facing elongated planar surfaces in operative engagement with said second belt run to define said second transport and being operable to move single document deposits along said platen.

20. A deposit processing module as defined in claim 19 wherein said magnetic charge/read head is transversely movable relative to the direction of said belt.

21. A deposit processing module as defined in claim 19 wherein said printer is transversely movable relative to the direction of said belt,

22. A deposit processing module as defined in claim 18 wherein said first plate means is yieldably mounted relative to said platen.

23. A depository for receiving envelopes, checks, utility bills, or other sheet notes comprising:

a deposit storage module having a plurality of deposit storage locations therein, a deposit receiving module having:

a printer for printing deposit information on a deposit, a magnetic charge and read head for magnetically charging and reading coded information on a deposit, an imager for copying the surface of a deposit, a receiving end for receiving deposits, a discharge end for discharging said deposits to said deposit storage module, and means for pivoting said receiving module about a fixed axis among a number of positions corresponding to said deposit storage locations.

24. A deposit processing module comprising:

an elongated platen having opposite facing elongated planar surfaces, a single endless belt encircling said platen having a first belt run extending along one of said opposite facing elongated surfaces and a second belt run extending along the other of said opposite facing surfaces, reversible drive means for conveying said belt around said platen, first plate means adjacent said one of said opposite facing elongated surfaces in operative engagement with said first belt run to define a first transport, second plate means adjacent said other of said opposite facing elongated planar surfaces in operative engagement with said second belt run to define a second transport, and a gate member disposed at one end of said platen and being movable relative thereto, said gate member having a contoured surface positionable adjacent said belt for conveying deposits between said first transport and said second transport.

25. A deposit processing module as defined in claim 24 further comprising:

aligning means at said one end of said platen for shifting a deposit to one side of said platen.

26. A deposit processing module as defined in claim 25 wherein said aligning means are conically shaped rollers formed to shift a deposit to one side as said deposit is conveyed thereover.

27. A deposit processing module as defined in claim 24 wherein said gate member has:

a first position wherein a deposit may be discharged from said deposit processing module from said first transport, a second position wherein a deposit may be conveyed between said first and second transport, and a third position wherein a deposit may be discharged from said deposit processing module from said second transport.

28. A deposit processing module as defined in claim 24 further comprising magnetic scanning means for reading coded information on a deposit, printer means for printing information onto a deposit, and image means for obtaining an image of a deposit.

29. A deposit processing module as defined in claim 24 wherein said printer means is transversely movable relative to the direction of said belt.

30. A deposit processing module as defined in claim 24 wherein said first plate means is yieldably mounted relative to said platen.

31. A deposit processing module as defined in claim 24 further comprising:

a deposit receiving opening at one end of said first transport, a deposit discharge opening at the other end of said first transport, a plurality of deposit storage locations adjacent said deposit discharge opening, and means for pivoting said first transport about a fixed axis to selectively position said deposit discharge opening adjacent one of said deposit storage locations.

32. A deposit processing device for receiving envelope deposits and single document deposits comprising:

a deposit processing module including:

a first transport path dimensioned to receive envelope deposits or single document deposits, printer means disposed along said first transport path for printing information onto said envelope deposit or said single document deposit, a second transport path adjacent said first transport path dimensioned to receive single document deposits therefrom, magnetic scanning means disposed along said second transport path for scanning a single document deposit for coded information thereon, imager means disposed along said second transport path for obtaining an image of a single document deposit thereon, at least one reversible belt loop for conveying envelope deposits and single document deposits along said first transport path and for conveying single document deposits along said second transport path, gate means for operatively connecting said first transport path with said second transport path to permit single document deposits to be conveyed back and forth between said first transport path and said second transport path, and means for duplexing single document deposits to permit scanning and imaging of both sides of a single document deposit.

33. A deposit processing device as defined in claim 32 further comprising means for aligning single document deposits along one side of said first and second transport paths.

34. A deposit processing device as defined in claim 32 wherein said printer means and said magnetic scanning means are movable relative to said path.

35. A deposit processing device as defined in claim 32 wherein said deposit processing module includes:

an elongated platen having opposite facing elongated surfaces, an endless conveyor belt encircling lengthwise said platen, said belt having a first belt run extending along one of said opposite facing elongated surfaces and a second belt run extending along the other of said opposite facing surface, reversible drive means for moving said belt around said platen, first plate means adjacent said one of said opposite facing elongated surfaces in operative engagement with said first belt run to define said first transport and being operable to move said envelope deposits and single document deposits along said platen, second plate means adjacent said other of said opposite facing elongated planar surfaces in operative engagement with said second belt run to define said second transport and being operable to move single document deposits along said platen.

36. A deposit processing module as defined in claim 35 wherein said first plate means is yieldably mounted relative to said platen.

37. A deposit processing device for receiving envelope deposits and single document deposits comprising:

a deposit processing module including:

a first transport path dimensioned to receive envelope deposits or single document deposits, printer means disposed along said first transport path for printing information onto said envelope deposit or said single document deposit, a second transport path adjacent said first transport path dimensioned to receive single document deposits therefrom, magnetic scanning means disposed along said second transport path for scanning a single document deposit for coded information thereon, imager means disposed along said second transport path for obtaining an image of a single document deposit thereon, conveyer means for conveying envelope deposits and single document deposits along said first transport path and for conveying single document deposits along said second transport path, gate means for operatively connecting said first transport path with said second transport path to permit single document deposits to be conveyed therebetween, and means for duplexing single document deposits to permit scanning and imaging of both sides of a single document deposit, wherein said document processing module includes a deposit receiving end for receiving into said deposit processing device envelope deposits and single document deposits and a deposit discharge end for discharging deposits from said deposit processing device; and further comprising means for pivoting said deposit processing module about a fixed axis to move said deposit discharge end.

38. A deposit processing module having:

a deposit receiving end, a deposit discharge end, a first deposit transport path extending between said deposit receiving end and said deposit discharge end, a second deposit transport path having one end positioned adjacent said deposit discharge end, printer means for printing information onto a deposit, magnetic scanning means for scanning a deposit for coded information thereon, imager means for obtaining an image of a deposit, said primer means, magnetic scanning means and said imager means being positioned along said first and second deposit transport paths, reversible conveyor means for conveying a deposit along said first and second deposit transport paths, a gate member movable to a position wherein said first deposit transport path is connected to said second deposit transport path, and means for pivoting said deposit processing module about a fixed axis to move said deposit discharge end to a plurality of locations.

39. A deposit processing module as defined in claim 38 further comprising:

means for duplexing a document, and means for shifting said deposit to one side of said path.

40. A deposit processing module as defined in claim 39 wherein said means for shifting is comprised of a plurality of conical-shaped rollers.

41. A deposit processing module as defined in claim 38 further comprising:

means for moving said printer and said magnetic scanning means relative to said deposit transport path.

42. A deposit processing device for receiving deposits including envelope deposits and single document deposits comprising:

a deposit processing module having a deposit receiving end and a deposit discharge end, said deposit processing module including:

transport path(s) extending from said deposit receiving end to said deposit discharge end dimensioned to receive envelope deposits or single document deposits, printer means disposed along said transport path(s) for printing information onto said envelope deposit or said single document deposit, magnetic scanning means disposed along said transport path(s) for scanning a deposit for coded information thereon, imager means disposed along said transport path(s) for obtaining an image of a deposit thereon, conveyor means for conveying envelope deposits and single document deposits along said transport path(s), gate means for operatively connecting said transport path(s) to permit deposits to be conveyed therebetween, a deposit storage module adjacent said deposit discharge end of said deposit processing module having a plurality of storage locations including at least one envelope storage location and at least one single document storage location, means for moving said deposit processing module relative to said deposit storage module to position said discharge end of said document processing module adjacent one of said storage locations, and means for duplexing deposits to permit scanning and imaging of both sides of a deposit.

43. A deposit processing device as defined in claim 42 wherein there is a first transport path dimensioned to receive envelope deposits or single document deposits and second transport path adjacent said first transport path dimensioned to receive single document deposits.

44. A deposit processing device as defined in claim 42 wherein the magnetic scanning means is disposed along said second transport path for scanning a single document deposit for coded information thereon.

45. A deposit processing device as defined in claim 41 wherein said imager means are disposed along said second transport path for obtaining an image of a single document deposit thereon.

46. A deposit processing device as defined in claim 41 wherein said imager means are disposed along said second transport path for obtaining an image of a single document deposit therein.

47. A deposit processing device as defined in claim 41 wherein said duplexing means are used to duplex single document deposits to permit scanning and imaging of both sides thereof.

* * * * *